US011477041B2

(12) United States Patent
Dutta

(10) Patent No.: US 11,477,041 B2
(45) Date of Patent: Oct. 18, 2022

(54) STATELESS MULTICAST BASED ON LOCAL LABEL SPACES

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/835,994

(22) Filed: Mar. 31, 2020

(65) Prior Publication Data

US 2021/0306167 A1    Sep. 30, 2021

(51) Int. Cl.
*H04L 12/18* (2006.01)
*H04L 45/50* (2022.01)
(Continued)

(52) U.S. Cl.
CPC .............. *H04L 12/18* (2013.01); *H04L 45/50* (2013.01); *H04L 49/201* (2013.01);
(Continued)

(58) Field of Classification Search
CPC ....... H04L 12/18; H04L 45/50; H04L 45/507; H04L 45/52; H04L 45/26; H04L 45/48; H04L 45/04; H04L 49/201; H04L 65/4076
See application file for complete search history.

(56) References Cited

U.S. PATENT DOCUMENTS

| 7,542,470 | B2* | 6/2009 | Gupta | ...................... H04L 45/10 |
| | | | | 370/256 |
| 7,881,279 | B2* | 2/2011 | Ooms | ...................... H04L 45/00 |
| | | | | 370/392 |

(Continued)

FOREIGN PATENT DOCUMENTS

WO    WO 2019/239173 A1    12/2019

OTHER PUBLICATIONS

Fenner, B., et al., "Protocol Independent Multicast—Sparse Mode (PIM-SM) Protocol Specification (Revised)," Internet Engineering Task Force, RFC 7761, Mar. 2016, 137 pages.

(Continued)

*Primary Examiner* — Glenton B Burgess
*Assistant Examiner* — Rachel J Hackenberg
(74) *Attorney, Agent, or Firm* — Tong, Rea, Bentley & Kim, LLC

(57) ABSTRACT

Various example embodiments for supporting stateless multicast communications in a communication system are presented. Various example embodiments for supporting stateless multicast communications may be configured to support stateless multicast communications in a label switching network (e.g., a Multiprotocol Label Switching (MPLS) network, an MPLS—Traffic Engineered (TE) network, or the like) based on use of local label spaces of nodes of the label switching network for encoding of an explicit path tree for the multicast communications within the multicast communications. Various example embodiments for supporting stateless multicast communications in a label switching network based on use of local label spaces of nodes of the label switching network may be configured to support use of local label spaces of nodes of the label switching network by using network-wide unique node identifiers to uniquely (Continued)

identify nodes with which the node and adjacency labels of the explicit path tree are associated.

20 Claims, 39 Drawing Sheets

(51) Int. Cl.
    *H04L 49/201*     (2022.01)
    *H04L 65/611*     (2022.01)
    *H04L 45/00*     (2022.01)
    *H04L 45/48*     (2022.01)
    *H04L 45/02*     (2022.01)

(52) U.S. Cl.
    CPC ............ *H04L 65/611* (2022.05); *H04L 45/04* (2013.01); *H04L 45/26* (2013.01); *H04L 45/48* (2013.01)

(56) References Cited

U.S. PATENT DOCUMENTS

| | | | | |
|---|---|---|---|---|
| 10,581,733 | B2* | 3/2020 | Peng | H04L 45/54 |
| 10,887,225 | B1* | 1/2021 | Chan | H04L 12/66 |
| 2002/0028656 | A1* | 3/2002 | Yemini | H04L 45/12 |
| | | | | 455/11.1 |
| 2010/0142529 | A1* | 6/2010 | Huang | H04L 12/18 |
| | | | | 370/390 |
| 2014/0269699 | A1* | 9/2014 | Filsfils | H04L 41/12 |
| | | | | 370/389 |
| 2014/0369356 | A1* | 12/2014 | Bryant | H04L 45/04 |
| | | | | 370/392 |
| 2015/0078378 | A1* | 3/2015 | Wijnands | H04L 12/18 |
| | | | | 370/390 |
| 2016/0234105 | A1* | 8/2016 | Li | H04L 47/00 |
| 2016/0380889 | A1* | 12/2016 | Chen | H04L 12/4633 |
| | | | | 370/230 |
| 2018/0309667 | A1* | 10/2018 | Che | H04L 45/42 |
| 2021/0135986 | A1* | 5/2021 | Song | H04L 45/50 |
| 2021/0250288 | A1* | 8/2021 | Li | H04L 45/34 |
| 2021/0359942 | A1* | 11/2021 | Previdi | H04L 45/745 |

OTHER PUBLICATIONS

Cain, B., et al., "Internet Group Management Protocol," Version 3, RFC 3376, Network Working Group, Oct. 2002, 53 pages.
Rosen, E., et al., "Multicast in MPLS/BGP IP VPNs," RFC 6513, Internet Engineering Task Force, Feb. 2012, 88 pages.
Aggarwal, R., et al., "BGP Encodings and Procedures for Multicast in MPLS/BGP IP VPNs," Internet Engineering Task Force, RFC 6514, Feb. 2012, 59 pages.
Aggarwal, R., et al., "Resource Reservation Protocol—Traffic Engineering (RSVP-TE) for Point-to-Multipoint TE Label Switched Paths (LSPs)," Network Working Group, RFC 4875, May 2007, 53 pages.
Wijnands, IJ, et al., "Label Distribution Protocol Extensions for Point-to-Multipoint and Multipoint-to-Multipoint Label Switched Paths," Internet Engineering Task Force, RFC 6388, Nov. 2011, 39 pages.
Wijnands, IJ, et al., "Multicast Using Bit Index Explicit Replication (BIER), Internet Engineering Task Force," RFC 8279, Nov. 2017, 43 pages.
Sajassi, A., et al., "BGP MPLW-Based Ethernet VPN," Internet Engineering Task Force, RFC 7432, Feb. 2015, 56 pages.
Aggarwal, R., et al., "Multicast in Virtual Private LAN Service (VPLSL)," Internet Engineering Task Force, RFC 7117, Feb. 2014, 50 pages.
Andersson, L., et al., "LDP Specification," Network Working Group, RFC 5036, Oct. 2007, 135 pages.
Filsfils, C., et al., "Segment Routing Architecture," Internet Engineering Task Force, RFC 8402, Jul. 2018, 32 pages.
Rosen, E., et al., "Multiprotocol Label Switching Architecture," Network Working Group, RFC 3031, Jan. 2001, 61 pages.
Li, Z., et al., "Usecases of MPLS Global Label," draft-li-mpls-global-label-usecases-03, Network Working Group, Oct. 17, 2015, 11 pages.
Iana, "Special-Purpose Multiprotocol Label Switching (MPLS) Label Values," https://www.iana.org/assignments/mpls-label-values/mpls-label-values.xhtml, printed on Mar. 30, 2020, 2 pages.
Eckert et al., "Tree Engineering for Bit Index Explicit Replication (BIER-TE)," draft-ietf-bier-te-arch-07, Mar. 9, 2020, 45 pages.
Broadcom, "10 Tb/s StrataDNX™ Jericho2 Ethernet Switch Series" https://www.broadcom.com/products/ethernet-connectivity/switching/stratadnx/bcm88690, printed on Mar. 30, 2020, 3 pages.
Duffy, Jim, "Arista takes on Cisco, Juniper at routing," https://www.networkworld.com/article/3048914/arista-takes-on-cisco-juniper-at-routing.html, printed on Mar. 30, 2020, 4 pages.
Nokia, "7250 interconnect router," https://www.nokia.com/networks/products/7250-interconnect-router/, printed on Mar. 30, 2020, 5 pages.
C19-STREETINSIDER.COM, "Cisco (CSCO) Counters Arista Networks (ANET) Jericho Claim-UBS," https://www.streetinsider.com/Analyst+Comments/Cisco+%28CSCO%29+Counters+Arista+Networks+%28ANET%29+Jericho+Claim+_+UBS/11469747.html, printed on Mar. 31, 2020, 2 pages.
Filsfils et al., "Segment Routing Policy Architecture," draft-filsfils-spring-segment-routing-policy-06, SPRING Working Group, May 21, 2018, 34 pages.
Bashandy, et al., "Segment Routing with MPLS data plane," RFC 8660, Dec. 2019, 29 pages.

* cited by examiner

FIG. 4A

| ILM of 111-1 | | |
|---|---|---|
| Label | NHLFE | |
| | Next-Hop | Label |
| Ln | Self | None |
| ... | ... | ... |
| L1 | R1->R2 | None |
| ..... | .... | ...... |
| L2 | R1->R5 | None |
| ..... | ..... | ...... |
| L3 | R1->R6 | None |
| ..... | ..... | ...... |

FIG. 4B

| ILM of 111-2 | | |
|---|---|---|
| Label | NHLFE | |
| | Next-Hop | Label |
| Ln | Self | None |
| ... | ... | ... |
| L1 | R2->R1 | None |
| ..... | .... | ...... |
| L2 | R2->R5 | None |
| ..... | ..... | ...... |
| L3 | R2->R6 | None |
| ..... | ..... | ...... |

FIG. 4C

| ILM of 111-3 | | |
|---|---|---|
| Label | NHLFE | |
| | Next-Hop | Label |
| Ln | Self | None |
| ... | ... | ... |
| L1 | R3->R4 | None |
| ..... | .... | ...... |
| L2 | R3->R7 | None |
| ..... | ..... | ...... |
| L3 | R3->R8 | None |
| ..... | ..... | ...... |

FIG. 4D

| ILM of 111-4 | | |
|---|---|---|
| Label | NHLFE | |
| | Next-Hop | Label |
| Ln | Self | None |
| ... | ... | ... |
| L1 | R4->R3 | None |
| ..... | .... | ...... |
| L2 | R4->R7 | None |
| ..... | ..... | ...... |
| L3 | R4->R8 | None |
| ..... | ..... | ...... |

*FIG. 4E*

| ILM of 111-5 | | |
|---|---|---|
| Label | NHLFE | |
| | Next-Hop | Label |
| Ln | Self | None |
| ... | ... | ... |
| L1 | R5->R1 | None |
| .... | .... | ..... |
| L2 | R5->R2 | None |
| ..... | ..... | ...... |
| L3 | R5->R6 | None |
| ..... | ..... | ...... |
| L4 | R5->R7 | None |
| ..... | ..... | ...... |
| L5 | R5->R8 | None |
| ..... | ..... | ...... |

*FIG. 4F*

| ILM of 111-6 | | |
|---|---|---|
| Label | NHLFE | |
| | Next-Hop | Label |
| Ln | Self | None |
| ... | ... | ... |
| L1 | R6->R1 | None |
| .... | .... | ..... |
| L2 | R6->R2 | None |
| ..... | ..... | ...... |
| L3 | R6->R5 | None |
| ..... | ..... | ...... |
| L4 | R6->R7 | None |
| ..... | ..... | ...... |
| L5 | R6->R8 | None |
| ..... | ..... | ...... |

*FIG. 4G*

| ILM of 111-7 | | |
|---|---|---|
| Label | NHLFE | |
| | Next-Hop | Label |
| Ln | Self | None |
| ... | ... | ... |
| L1 | R7->R3 | None |
| .... | .... | ..... |
| L2 | R7->R4 | None |
| ..... | ..... | ...... |
| L3 | R7->R5 | None |
| ..... | ..... | ...... |
| L4 | R7->R6 | None |
| ..... | ..... | ...... |
| L5 | R7->R8 | None |
| ..... | ..... | ...... |

*FIG. 4H*

| ILM of 111-8 | | |
|---|---|---|
| Label | NHLFE | |
| | Next-Hop | Label |
| Ln | Self | None |
| ... | ... | ... |
| L1 | R8->R3 | None |
| .... | .... | ..... |
| L2 | R8->R4 | None |
| ..... | ..... | ...... |
| L3 | R8->R5 | None |
| ..... | ..... | ...... |
| L4 | R8->R6 | None |
| ..... | ..... | ...... |
| L5 | R8->R7 | None |
| ..... | ..... | ...... |

FIG. 6

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             TLI             | Exp |S|          TTL            |
+-+-+-+-+-+-+-+-+-+-+-+-+-+-+-+-+-+-+-+-+-+-+-+-+-+-+-+-+-+-+-+-+
|        Gateway Label        | Exp |S|          TTL            |
+-+-+-+-+-+-+-+-+-+-+-+-+-+-+-+-+-+-+-+-+-+-+-+-+-+-+-+-+-+-+-+-+
|         Tree Label          | Exp |S|          TTL            |
+-+-+-+-+-+-+-+-+-+-+-+-+-+-+-+-+-+-+-+-+-+-+-+-+-+-+-+-+-+-+-+-+
```

FIG. 7

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          EMLS-TEI           | Exp |S|          TTL            |
+-+-+-+-+-+-+-+-+-+-+-+-+-+-+-+-+-+-+-+-+-+-+-+-+-+-+-+-+-+-+-+-+
| Type|    Num Labels(N)      | Exp |S|          TTL            |
+-+-+-+-+-+-+-+-+-+-+-+-+-+-+-+-+-+-+-+-+-+-+-+-+-+-+-+-+-+-+-+-+
|                                                               |
+                                                               +
//              EMLS-TE Label Stack   (Variable)               //
//                                                             //
|                                                               |
+-+-+-+-+-+-+-+-+-+-+-+-+-+-+-+-+-+-+-+-+-+-+-+-+-+-+-+-+-+-+-+-+
```

FIG. 8

```
+-+-+-+-+-+-+-+-+-+-+-+-+-+-+-+-+-+-+-+-+-+-+-+-+-+-+-+-+-+-+-+-+
| Type|    Num Labels(N)      | Exp |S|          TTL            |
+-+-+-+-+-+-+-+-+-+-+-+-+-+-+-+-+-+-+-+-+-+-+-+-+-+-+-+-+-+-+-+-+
```

*FIG. 9*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                       ILB 1 (Variable)                        |
~                                                               ~
+-+-+-+-+-+-+-+-+-+-+-+-+-+-+-+-+-+-+-+-+-+-+-+-+-+-+-+-+-+-+-+-+
|                       ILB 2 (Variable)                        |
~                                                               ~
+-+-+-+-+-+-+-+-+-+-+-+-+-+-+-+-+-+-+-+-+-+-+-+-+-+-+-+-+-+-+-+-+
//                                                             //
//                                                             //
+-+-+-+-+-+-+-+-+-+-+-+-+-+-+-+-+-+-+-+-+-+-+-+-+-+-+-+-+-+-+-+-+
|                       ILB N (Variable)                        |
~                                                               ~
+-+-+-+-+-+-+-+-+-+-+-+-+-+-+-+-+-+-+-+-+-+-+-+-+-+-+-+-+-+-+-+-+
```

*FIG. 10*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Router Index       | Num Labels(P)| Exp |0|      TTL       |
+-+-+-+-+-+-+-+-+-+-+-+-+-+-+-+-+-+-+-+-+-+-+-+-+-+-+-+-+-+-+-+-+
|              Label 1                 | Exp |0|      TTL       |
+-+-+-+-+-+-+-+-+-+-+-+-+-+-+-+-+-+-+-+-+-+-+-+-+-+-+-+-+-+-+-+-+
|              Label 2                 | Exp |0|      TTL       |
+-+-+-+-+-+-+-+-+-+-+-+-+-+-+-+-+-+-+-+-+-+-+-+-+-+-+-+-+-+-+-+-+
//                                                             //
//                                                             //
+-+-+-+-+-+-+-+-+-+-+-+-+-+-+-+-+-+-+-+-+-+-+-+-+-+-+-+-+-+-+-+-+
|              Label P                 | Exp |0|      TTL       |
+-+-+-+-+-+-+-+-+-+-+-+-+-+-+-+-+-+-+-+-+-+-+-+-+-+-+-+-+-+-+-+-+
```

*FIG. 11*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              EMLS-TEI             |  Exp |0|      TTL         |
+-+-+-+-+-+-+-+-+-+-+-+-+-+-+-+-+-+-+-+-+-+-+-+-+-+-+-+-+-+-+-+-+
| 0x2 |    Num Labels = 15          |Exp=0|0|      TTL=0        |
+-+-+-+-+-+-+-+-+-+-+-+-+-+-+-+-+-+-+-+-+-+-+-+-+-+-+-+-+-+-+-+-+
| Router Index = 1    |  Num Labels=1 |Exp=0|0|     TTL         |⎤
+-+-+-+-+-+-+-+-+-+-+-+-+-+-+-+-+-+-+-+-+-+-+-+-+-+-+-+-+-+-+-+-+ ⎬ ILB-1
|              L2                   |Exp=0|0|      TTL=0        |⎦
+-+-+-+-+-+-+-+-+-+-+-+-+-+-+-+-+-+-+-+-+-+-+-+-+-+-+-+-+-+-+-+-+
| Router Index = 5    |  Num Labels=2 |Exp=0|0|     TTL         |⎤
+-+-+-+-+-+-+-+-+-+-+-+-+-+-+-+-+-+-+-+-+-+-+-+-+-+-+-+-+-+-+-+-+ ⎪
|              L2                   |Exp=0|0|      TTL=0        |⎬ ILB-2
+-+-+-+-+-+-+-+-+-+-+-+-+-+-+-+-+-+-+-+-+-+-+-+-+-+-+-+-+-+-+-+-+ ⎪
|              L4                   |Exp=0|0|      TTL=0        |⎦
+-+-+-+-+-+-+-+-+-+-+-+-+-+-+-+-+-+-+-+-+-+-+-+-+-+-+-+-+-+-+-+-+
| Router Index = 2    |  Num Labels=1 |Exp=0|0|     TTL         |⎤
+-+-+-+-+-+-+-+-+-+-+-+-+-+-+-+-+-+-+-+-+-+-+-+-+-+-+-+-+-+-+-+-+ ⎬ ILB-3
|              Ln                   |Exp=0|0|      TTL=0        |⎦
+-+-+-+-+-+-+-+-+-+-+-+-+-+-+-+-+-+-+-+-+-+-+-+-+-+-+-+-+-+-+-+-+
| Router Index = 7    |  Num Labels=3 |Exp=0|0|     TTL         |⎤
+-+-+-+-+-+-+-+-+-+-+-+-+-+-+-+-+-+-+-+-+-+-+-+-+-+-+-+-+-+-+-+-+ ⎪
|              L1                   |Exp=0|0|      TTL=0        |⎪
+-+-+-+-+-+-+-+-+-+-+-+-+-+-+-+-+-+-+-+-+-+-+-+-+-+-+-+-+-+-+-+-+ ⎬ ILB-4
|              L2                   |Exp=0|0|      TTL=0        |⎪
+-+-+-+-+-+-+-+-+-+-+-+-+-+-+-+-+-+-+-+-+-+-+-+-+-+-+-+-+-+-+-+-+ ⎪
|              Ln                   |Exp=0|0|      TTL=0        |⎦
+-+-+-+-+-+-+-+-+-+-+-+-+-+-+-+-+-+-+-+-+-+-+-+-+-+-+-+-+-+-+-+-+
| Router Index = 3    |  Num Labels=1 |Exp=0|0|     TTL         |⎤
+-+-+-+-+-+-+-+-+-+-+-+-+-+-+-+-+-+-+-+-+-+-+-+-+-+-+-+-+-+-+-+-+ ⎬ ILB-5
|              Ln                   |Exp=0|0|      TTL=0        |⎦
+-+-+-+-+-+-+-+-+-+-+-+-+-+-+-+-+-+-+-+-+-+-+-+-+-+-+-+-+-+-+-+-+
| Router Index = 4    |  Num Labels=1 |Exp=0|0|     TTL         |⎤
+-+-+-+-+-+-+-+-+-+-+-+-+-+-+-+-+-+-+-+-+-+-+-+-+-+-+-+-+-+-+-+-+ ⎬ ILB-6
|              Ln                   |Exp=0|S|      TTL=0        |⎦
+-+-+-+-+-+-+-+-+-+-+-+-+-+-+-+-+-+-+-+-+-+-+-+-+-+-+-+-+-+-+-+-+
```

FIG. 12

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                                                               |
+                             ILU 1                             +
|                                                               |
+-+-+-+-+-+-+-+-+-+-+-+-+-+-+-+-+-+-+-+-+-+-+-+-+-+-+-+-+-+-+-+-+
|                                                               |
+                             ILU 2                             +
|                                                               |
+-+-+-+-+-+-+-+-+-+-+-+-+-+-+-+-+-+-+-+-+-+-+-+-+-+-+-+-+-+-+-+-+
//                                                             //
//                                                             //
+-+-+-+-+-+-+-+-+-+-+-+-+-+-+-+-+-+-+-+-+-+-+-+-+-+-+-+-+-+-+-+-+
|                                                               |
+                             ILU N                             +
|                                                               |
+-+-+-+-+-+-+-+-+-+-+-+-+-+-+-+-+-+-+-+-+-+-+-+-+-+-+-+-+-+-+-+-+
```

FIG. 13

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|         Router Index         | Exp |0|          TTL           |
+-+-+-+-+-+-+-+-+-+-+-+-+-+-+-+-+-+-+-+-+-+-+-+-+-+-+-+-+-+-+-+-+
|             Label            | Exp |S|          TTL           |
+-+-+-+-+-+-+-+-+-+-+-+-+-+-+-+-+-+-+-+-+-+-+-+-+-+-+-+-+-+-+-+-+
```

STATELESS MULTICAST BASED ON LOCAL LABEL SPACES

TECHNICAL FIELD

Various example embodiments relate generally to communication systems and, more particularly but not exclusively, to supporting multicast in various types of communication systems.

BACKGROUND

In many communication networks, various communications technologies may be used to support multicast communications.

SUMMARY

In at least some example embodiments, an apparatus includes at least one processor and at least one memory including a set of instructions, wherein the set of instructions is configured to, when executed by the at least one processor, cause the apparatus to support communication of a packet of a multicast flow supported by a network, wherein the packet includes an encoding of an element of an explicit path tree for the multicast flow, wherein the element is encoded using a tuple including a node identifier of a node that uniquely identifies the node within the network and an element label for the element that is assigned from a local label space of the node. In at least some example embodiments, the element includes the node and the element label includes a node label. In at least some example embodiments, the element includes an adjacency of the node and the element label includes an adjacency label. In at least some example embodiments, the packet includes an encoding of a second element of the explicit path tree for the multicast flow. In at least some example embodiments, the second element is associated with the node. In at least some example embodiments, the second element is encoded using the tuple, and the tuple further includes a second element label for the second element that is assigned from the local label space of the node. In at least some example embodiments, the second element is encoded using a second tuple including the node identifier of the node that uniquely identifies the node within the network and a second element label for the second element that is assigned from the local label space of the node. In at least some example embodiments, the second element is associated with a second node. In at least some example embodiments, the second element is encoded using a second tuple including a node identifier of the second node that uniquely identifies the second node within the network and an element label for the second element that is assigned from a local label space of the second node. In at least some example embodiments, to support communication of the packet, the set of instructions is configured to, when executed by the at least one processor, cause the apparatus to receive, by an ingress node of the multicast flow, a native packet, create, by the ingress node based on the native packet, the packet, and forward, by the ingress node toward at least one next-hop node, the packet. In at least some example embodiments, to support communication of the packet, the set of instructions is configured to, when executed by the at least one processor, cause the apparatus to receive, by the node, the packet, determine, by the node based on the node identifier of the node from the tuple, that the element label of the element from the tuple is to be processed by the node, and handle, by the node based on processing of the element label based on the local label space of the node, the packet. In at least some example embodiments, to handle the packet, the set of instructions is configured to, when executed by the at least one processor, cause the apparatus to determine, based on the element label and the local label space of the node, that the element label identifies an adjacency of the node, determine whether the adjacency of the node is a forward connected adjacency of the node, and forward the packet toward a next-hop node of the adjacency of the node based on a determination that the adjacency is a forward connected adjacency of the node. In at least some example embodiments, to forward the packet, the set of instructions is configured to, when executed by the at least one processor, cause the apparatus to remove the tuple from the packet to form a new packet, create a copy of the new packet, and forward the copy of the new packet toward the next-hop node. In at least some example embodiments, the node is an ingress node of the explicit path tree, a transit node of the explicit path tree, or a bud node of the explicit path tree. In at least some example embodiments, to handle the packet, the set of instructions is configured to, when executed by the at least one processor, cause the apparatus to determine, based on the element label and the local label space of the node, that the element label identifies the node and forward the packet to a multicast flow overlay based on a determination that the element label identifies the node. In at least some example embodiments, to forward the packet to the multicast flow overlay, the set of instructions is configured to, when executed by the at least one processor, cause the apparatus to create a local copy of the packet, remove, from the local copy of the packet, a header including the tuple to form thereby a new packet, and forward, based on a native header of the new packet, the new packet to the multicast flow overlay. In at least some example embodiments, the network node is a transit node of the explicit path tree, a bud node of the explicit path tree, or a leaf node of the explicit path tree. In at least some example embodiments, the network node includes an ingress node of the explicit path tree and the set of instructions is configured to, when executed by the at least one processor, cause the apparatus to send, from the network node toward a network controller, a request for the explicit path tree and receive, by the network node from the network controller, a response including a description of the explicit path tree.

In at least some example embodiments, a non-transitory computer-readable medium stores a set of instructions configured to cause an apparatus to support communication of a packet of a multicast flow supported by a network, wherein the packet includes an encoding of an element of an explicit path tree for the multicast flow, wherein the element is encoded using a tuple including a node identifier of a node that uniquely identifies the node within the network and an element label for the element that is assigned from a local label space of the node. In at least some example embodiments, the element includes the node and the element label includes a node label. In at least some example embodiments, the element includes an adjacency of the node and the element label includes an adjacency label. In at least some example embodiments, the packet includes an encoding of a second element of the explicit path tree for the multicast flow. In at least some example embodiments, the second element is associated with the node. In at least some example embodiments, the second element is encoded using the tuple, and the tuple further includes a second element label for the second element that is assigned from the local label space of the node. In at least some example embodiments, the second element is encoded using a second tuple including the node identifier of the node that uniquely identifies the node within the network and a second element label for the second element that is assigned from the local label space of the node. In at least some example embodiments, the second element is associated with a second node. In at least some example embodiments, the second element is encoded using a second tuple including a node identifier of the second node that uniquely identifies the second node within the network and an element label for the second element that is assigned from a local label space of the second node. In at least some example embodiments, to support communication of the packet, the set of instructions is configured to cause the apparatus to receive, by an ingress node of the multicast flow, a native packet, create, by the ingress node based on the native packet, the packet, and forward, by the ingress node toward at least one next-hop node, the packet. In at least some example embodiments, to support communication of the packet, the set of instructions is configured to cause the apparatus to receive, by the node, the packet, determine, by the node based on the node identifier of the node from the tuple, that the element label of the element from the tuple is to be processed by the node, and handle, by the node based on processing of the element label based on the local label space of the node, the packet. In at least some example embodiments, to handle the packet, the set of instructions is configured to cause the apparatus to determine, based on the element label and the local label space of the node, that the element label identifies an adjacency of the node, determine whether the adjacency of the node is a forward connected adjacency of the node, and forward the packet toward a next-hop node of the adjacency of the node based on a determination that the adjacency is a forward connected adjacency of the node. In at least some example embodiments, to forward the packet, the set of instructions is configured to cause the apparatus to remove the tuple from the packet to form a new packet, create a copy of the new packet, and forward the copy of the new packet toward the next-hop node. In at least some example embodiments, the node is an ingress node of the explicit path tree, a transit node of the explicit path tree, or a bud node of the explicit path tree. In at least some example embodiments, to handle the packet, the set of instructions is configured to cause the apparatus to determine, based on the element label and the local label space of the node, that the element label identifies the node and forward the packet to a multicast flow overlay based on a determination that the element label identifies the node. In at least some example embodiments, to forward the packet to the multicast flow overlay, the set of instructions is configured to cause the apparatus to create a local copy of the packet, remove, from the local copy of the packet, a header including the tuple to form thereby a new packet, and forward, based on a native header of the new packet, the new packet to the multicast flow overlay. In at least some example embodiments, the network node is a transit node of the explicit path tree, a bud node of the explicit path tree, or a leaf node of the explicit path tree. In at least some example embodiments, the network node includes an ingress node of the explicit path tree and the set of instructions is configured to cause the apparatus to send, from the network node toward a network controller, a request for the explicit path tree and receive, by the network node from the network controller, a response including a description of the explicit path tree.

In at least some example embodiments, a method includes supporting communication of a packet of a multicast flow supported by a network, wherein the packet includes an encoding of an element of an explicit path tree for the multicast flow, wherein the element is encoded using a tuple including a node identifier of a node that uniquely identifies the node within the network and an element label for the element that is assigned from a local label space of the node. In at least some example embodiments, the element includes the node and the element label includes a node label. In at least some example embodiments, the element includes an adjacency of the node and the element label includes an adjacency label. In at least some example embodiments, the packet includes an encoding of a second element of the explicit path tree for the multicast flow. In at least some example embodiments, the second element is associated with the node. In at least some example embodiments, the second element is encoded using the tuple, and the tuple further includes a second element label for the second element that is assigned from the local label space of the node. In at least some example embodiments, the second element is encoded using a second tuple including the node identifier of the node that uniquely identifies the node within the network and a second element label for the second element that is assigned from the local label space of the node. In at least some example embodiments, the second element is associated with a second node. In at least some example embodiments, the second element is encoded using a second tuple including a node identifier of the second node that uniquely identifies the second node within the network and an element label for the second element that is assigned from a local label space of the second node. In at least some example embodiments, supporting communication of the packet includes receiving, by an ingress node of the multicast flow, a native packet, creating, by the ingress node based on the native packet, the packet, and forwarding, by the ingress node toward at least one next-hop node, the packet. In at least some example embodiments, supporting communication of the packet includes receiving, by the node, the packet, determining, by the node based on the node identifier of the node from the tuple, that the element label of the element from the tuple is to be processed by the node, and handling, by the node based on processing of the element label based on the local label space of the node, the packet. In at least some example embodiments, handling the packet includes determining, based on the element label and the local label space of the node, that the element label identifies an adjacency of the node, determining whether the adjacency of the node is a forward connected adjacency of the node, and forwarding the packet toward a next-hop node of the adjacency of the node based on a determination that the adjacency is a forward connected adjacency of the node. In at least some example embodiments, forwarding the packet includes removing the tuple from the packet to form a new packet, creating a copy of the new packet, and forwarding the copy of the new packet toward the next-hop node. In at least some example embodiments, the node is an ingress node of the explicit path tree, a transit node of the explicit path tree, or a bud node of the explicit path tree. In at least some example embodiments, handling the packet includes determining, based on the element label and the local label space of the node, that the element label identifies the node and forwarding the packet to a multicast flow overlay based on a determination that the element label identifies the node. In at least some example embodiments, forwarding the packet to the multicast flow overlay includes creating a local copy of the packet, removing, from the local copy of the packet, a header including the tuple to form thereby a new packet, and forwarding, based on a native header of the new packet, the new packet to the multicast flow overlay. In at least some example embodiments, the network node is a transit node of the explicit path tree, a bud node of the explicit path tree, or a leaf node of the explicit path tree. In at least some example embodiments, the network node includes an ingress node of the explicit path tree and the method includes sending, from the network node toward a network controller, a request for the explicit path tree and receiving, by the network node from the network controller, a response including a description of the explicit path tree.

In at least some example embodiments, an apparatus includes means for supporting communication of a packet of a multicast flow supported by a network, wherein the packet includes an encoding of an element of an explicit path tree for the multicast flow, wherein the element is encoded using a tuple including a node identifier of a node that uniquely identifies the node within the network and an element label for the element that is assigned from a local label space of the node. In at least some example embodiments, the element includes the node and the element label includes a node label. In at least some example embodiments, the element includes an adjacency of the node and the element label includes an adjacency label. In at least some example embodiments, the packet includes an encoding of a second element of the explicit path tree for the multicast flow. In at least some example embodiments, the second element is associated with the node. In at least some example embodiments, the second element is encoded using the tuple, and the tuple further includes a second element label for the second element that is assigned from the local label space of the node. In at least some example embodiments, the second element is encoded using a second tuple including the node identifier of the node that uniquely identifies the node within the network and a second element label for the second element that is assigned from the local label space of the node. In at least some example embodiments, the second element is associated with a second node. In at least some example embodiments, the second element is encoded using a second tuple including a node identifier of the second node that uniquely identifies the second node within the network and an element label for the second element that is assigned from a local label space of the second node. In at least some example embodiments, the means for supporting communication of the packet includes means for receiving, by an ingress node of the multicast flow, a native packet, means for creating, by the ingress node based on the native packet, the packet, and means for forwarding, by the ingress node toward at least one next-hop node, the packet. In at least some example embodiments, the means for supporting communication of the packet includes means for receiving, by the node, the packet, means for determining, by the node based on the node identifier of the node from the tuple, that the element label of the element from the tuple is to be processed by the node, and means for handling, by the node based on processing of the element label based on the local label space of the node, the packet. In at least some example embodiments, the means for handling the packet includes means for determining, based on the element label and the local label space of the node, that the element label identifies an adjacency of the node, means for determining whether the adjacency of the node is a forward connected adjacency of the node, and means for forwarding the packet toward a next-hop node of the adjacency of the node based on a determination that the adjacency is a forward connected adjacency of the node. In at least some example embodiments, the means for forwarding the packet includes means for removing the tuple from the packet to form a new packet, means for creating a copy of the new packet, and means for forwarding the copy of the new packet toward the next-hop node. In at least some example embodiments, the node is an ingress node of the explicit path tree, a transit node of the explicit path tree, or a bud node of the explicit path tree. In at least some example embodiments, the means for handling the packet includes means for determining, based on the element label and the local label space of the node, that the element label identifies the node and means for forwarding the packet to a multicast flow overlay based on a determination that the element label identifies the node. In at least some example embodiments, the means for forwarding the packet to the multicast flow overlay includes means for creating a local copy of the packet, means for removing, from the local copy of the packet, a header including the tuple to form thereby a new packet, and means for forwarding, based on a native header of the new packet, the new packet to the multicast flow overlay. In at least some example embodiments, the network node is a transit node of the explicit path tree, a bud node of the explicit path tree, or a leaf node of the explicit path tree. In at least some example embodiments, the network node includes an ingress node of the explicit path tree and the apparatus includes means for sending, from the network node toward a network controller, a request for the explicit path tree and means for receiving, by the network node from the network controller, a response including a description of the explicit path tree.

BRIEF DESCRIPTION OF THE DRAWINGS

The teachings herein can be readily understood by considering the following detailed description in conjunction with the accompanying drawings, in which:

FIGS. 4A-4H depict examples of ILM tables programmed into routers of the MPLS TE multicast domain of the communication system of FIG. 1;

FIG. 6 depicts an example embodiment of a TLS for use in a multi-domain stateless MPLS TE multicast domain;

FIG. 7 depicts an example embodiment of an EMLS-TE used to encode node and adjacency labels along a stateless explicit path tree;

FIG. 8 depicts an example embodiment of an EMLS-TE Descriptor label used within an EMLS-TE;

FIG. 9 depicts an example embodiment of an EMLS-TE Label Stack for an EMLS-TE of type EMLS-TE-2;

FIG. 10 depicts an example embodiment of an Indexed Label Block (ILB) configured for use in an EMLS-TE-2;

FIG. 11 depicts an example of an EMLS-TE-2 packet for the explicit path tree of the MPLS TE multicast domain of FIG. 1;

FIG. 12 depicts an example embodiment of an EMLS-TE Label Stack for an EMLS-TE of type EMLS-TE-3;

FIG. 13 depicts an example embodiment of an Indexed Label Unit (ILU) configured for use in an EMLS-TE-3;

To facilitate understanding, identical reference numerals have been used herein, wherever possible, in order to designate identical elements that are common among the various figures.

DETAILED DESCRIPTION

Figure 1:
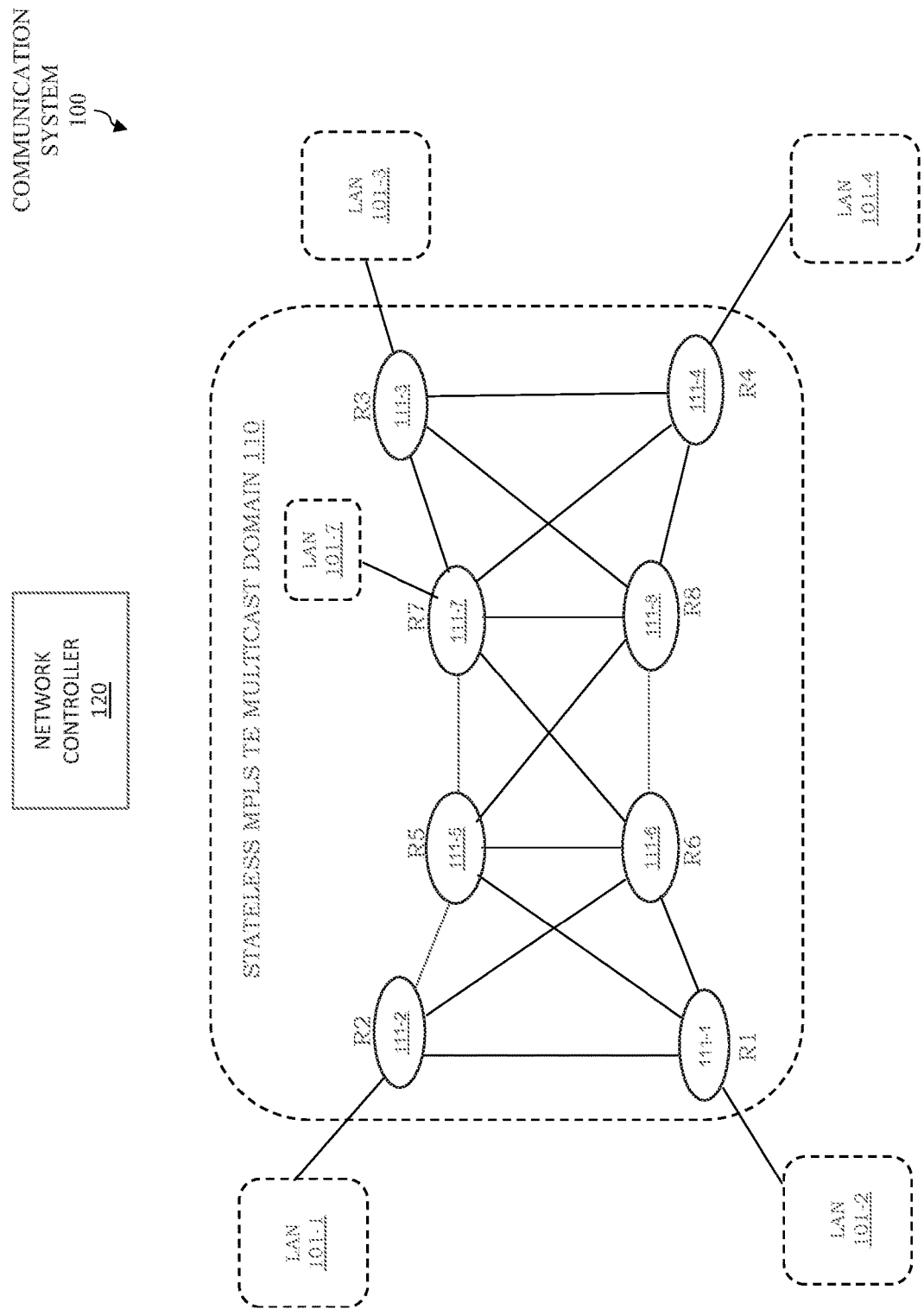
FIG. 1 depicts an example embodiment of a communication system configured to support stateless multicast communications in a Multiprotocol Label Switching—Traffic Engineering (MPLS-TE) multicast domain.

Various example embodiments for supporting stateless multicast communications in a communication system are presented. Various example embodiments for supporting stateless multicast communications may be configured to support stateless multicast communications in a label switching network (e.g., a Multiprotocol Label Switching (MPLS) network, an MPLS—Traffic Engineered (TE) network, or the like) based on use of local label spaces of nodes of the label switching network. Various example embodiments for supporting stateless multicast communications in a label switching network based on use of local label spaces of nodes of the label switching network may be configured to support multicast communications based on encoding of an explicit path tree for the multicast communications within the multicast communications. Various example embodiments for supporting stateless multicast communications in a label switching network based on use of local label spaces of nodes of the label switching network may be configured to support use of local label spaces of nodes of the label switching network by using network-wide unique node identifiers to uniquely identify nodes with which the node and adjacency labels of the explicit path tree are associated, thereby enabling unique identification of the node and adjacency labels of the explicit path tree even though the local labels are assigned from local label spaces of the nodes (and, thus, might otherwise overlap). Various example embodiments for supporting stateless multicast communications in a label switching network based on encoding of an explicit path tree for the multicast communications within the multicast communications, where the explicit path tree includes a set of elements including a set of egress nodes and a set of adjacencies, may be configured to encode the set of elements using a respective set of tuples, wherein the tuple that encodes an element includes a node identifier of the node that uniquely identifies the node of the element within the network and an element label for the element that is assigned from a local label space of the node (e.g., where the element is an egress node the tuple includes a unique node identifier of the egress node and a label for the egress node that is assigned from the local label space of the egress node and where the element is an adjacency the tuple includes a unique node identifier of the node to which the adjacency is connected and a label for the adjacency that is assigned from the local label space of the node to which the adjacency is connected). Various example embodiments for supporting stateless multicast communications in a label switching network based on use of local label spaces of nodes of the label switching network may be configured to support communication of multicast packets on a stateless explicit path tree by pushing a label stack onto the multicast packet, wherein the label stack includes a set of tuples encoding the elements of the explicit path tree (namely, the tuples encoding the egress nodes and adjacencies of the explicit path tree). Various example embodiments for supporting stateless multicast communications in a label switching network based on use of local label spaces of nodes of the label switching network may be configured to support communication of a multicast packet on a stateless explicit path tree based on configuration of routers along the stateless explicit path tree to scan the label stack on the multicast packet to look for tuples that identify itself (and, if the tuples for itself is found, to handle the packet based on whether the tuple is encoding the node as an egress node of the explicit path tree or whether the tuple is encoding an adjacency of the node that is forward connected in the node). Various example embodiments for supporting stateless multicast communications may be configured to support communication of a packet of a multicast flow supported by a network, wherein the packet includes an encoding of an element of an explicit path tree for the multicast flow, wherein the element is encoded using a tuple including a node identifier of a node that uniquely identifies the node within the network and an element label for the element that is assigned from a local label space of the node. It will be appreciated that these and various other example embodiments and advantages or potential advantages of supporting stateless multicast communications may be further understood by way of reference to the various figures, which are discussed further below.

FIG. 1 depicts an example embodiment of a communication system configured to support stateless multicast communications in a Multiprotocol Label Switching—Traffic Engineering (MPLS-TE) network domain.

The communication system 100 includes a set of local area networks (LANs) 101-1-101-4 (collectively, LANs 101) interconnected via a stateless MPLS multicast domain 110 which is controlled by a network controller 120. It will be appreciated that although, for simplicity, the LANs 101 are used as the originators and recipients of packets being multicast via the stateless MPLS TE multicast domain 110, the stateless MPLS multicast domain 110 may be configured to support multicast of packets for various other applications (e.g., Virtual Private Networks (VPNs), Virtual Private LAN Services (VPLSs), or the like, as well as various combinations thereof). The stateless MPLS multicast domain 110 includes a set of routers 111-1-111-8 (collectively, routers 111) which, for ease of reference, also are referred to herein as R1-R8, respectively.

The stateless MPLS multicast domain 110 is configured to support multicast communications. In general, multicast is a method of sending packets to a group of interested receivers in a single transmission. In general, multicast uses network infrastructure efficiently by having the source send a packet only once, even if it needs to be delivered to a large number of receivers. The nodes in the network take care of replicating the packet to the multiple receivers, as necessary. It will be appreciated that various types of multicast (e.g., Internet Protocol (IP), Multiprotocol Label Switching (MPLS), and the like) may be supported.

In general, as indicated above, multicast communication may be supported based on use of IP multicast. IP multicast is the IP-specific version of the general concept of multicast networking. It uses reserved multicast address blocks in IPV4 and IPV6 as the destination address (e.g., group address G) in the IP header. In Point-to-Multipoint (P2MP) IP multicast, a single IP packet is sent by a source S to the group address G which is received by all nodes that are members of G. Here, a flow can be described as (S, G), i.e. from a source S to the group G constitutes a flow. In Multipoint-to-Multipoint (MP2MP) IP multicast, a single IP packet is sent by any source to the group address G, which is received by all nodes that are members of G. Here, a flow can be described as (*, G), i.e., from any source to the group G constitutes a flow. Multicast Distribution Trees (MDTs) for a specific IP multicast flow may be set up by control protocols, such as Protocol Independent Multicast—Sparse Mode (PIM-SM), Protocol Independent Multicast—Dense Mode (PIM-DM), or the like. The control protocols set up the MDT by configuring the multicast flow in each router along the MDT. This form of IP multicast is stateful since every router along the MDT is required to maintain states for the MDT in the control plane and the data plane.

In general, as indicated above, multicast communication may be supported based on use of MPLS multicast. MPLS multicast is the MPLS-specific version of multicast networking, where multicast forwarding is performed over MDTs based on MPLS labels. MPLS MDTs may be set up by control protocols, such as P2MP Resource Reservation Protocol—Traffic Engineering (P2MP-RSVP-TE), Multicast Label Distribution Protocol (mLDP), or the like. This form of MPLS multicast is stateful since every router along the MDT is required to maintain states for the MDT in the control plane and the data plane. P2MP RSVP-TE may be used to set-up MDTs for stateful MPLS TE multicast. It also will be appreciated that applications that use an MDT for multicasting packets could be generalized as a "multicast flow overlay".

It will be appreciated that IP/MPLS multicast is often employed in various applications of streaming media, such as IP Television (IPTV), multi-point video conferencing, and the like.

The stateless MPLS multicast domain 110 is configured to support stateless MPLS TE multicast. The stateless MPLS multicast domain 110 is configured to support stateless MPLS TE multicast between LANs 101 via the stateless MPLS multicast domain 110. The stateless MPLS multicast domain 110 is configured to support stateless MPLS TE multicast between LANs 101 via the stateless MPLS multicast domain 110 based on use of unique router identifiers of the routers 111 within the stateless MPLS multicast domain 110 and based on use of local label spaces of the routers 111 of the stateless MPLS multicast domain 110. The stateless MPLS multicast domain 110 is configured to support stateless MPLS TE multicast between LANs 101 via the stateless MPLS multicast domain 110 based on use of an explicit path tree encoded within MPLS packets being multicast between the LANs 101 via the stateless MPLS multicast domain 110. The stateless MPLS multicast domain 110 is configured to support stateless MPLS TE multicast between LANs 101 via the stateless MPLS multicast domain 110, based on use of the unique router identifiers of the routers 111 within the stateless MPLS multicast domain 110 and based on use of the local label spaces of the routers 111 of the stateless MPLS multicast domain 110, by using network-wide unique router identifiers to uniquely identify routers 111 with which the node and adjacency labels of the explicit path tree are associated, thereby enabling unique identification of the node and adjacency labels of the explicit path tree even though the local node and adjacency labels are assigned from local label spaces of the routers 111 (and, thus, might otherwise overlap). In this manner, each router 111 of the explicit path tree is able to uniquely identify its node label and its forward connected adjacency labels in the encoding of the explicit path tree in the multicast packets being multicast between the LANs 101 via the stateless MPLS multicast domain 110. The stateless MPLS multicast domain 110 may be configured to support stateless MPLS TE multicast between LANs 101 via the stateless MPLS multicast domain 110, based on use of unique router identifiers of the routers 111 within the stateless MPLS multicast domain 110 and based on use of local label spaces of the routers 111 of the stateless MPLS multicast domain, 110 in various ways.

The network controller 120 is configured to provide various control functions for the stateless MPLS multicast domain 110. For example, the network controller 120 may be configured to support management of the unique router identifiers for the routers 111 of the stateless MPLS multicast domain 110 (e.g., assignment of identifiers from a router identifier space, configuration of routers 111 of stateless MPLS TE multicast domain 110 to support assigned router identifiers, or the like). The network controller 120 may be configured to support various other control functions for the stateless MPLS TE multicast domain 110. The network controller 120 may be a Network Management System (NMS), a Software Defined Networking (SDN) controller, a Path Computation Element (PCE), or the like, as well as various combinations thereof.

The communication system 100 is configured to support stateless MPLS TE multicast via the stateless MPLS multicast domain 110, based on use of unique router identifiers of the routers 111 within the stateless MPLS multicast domain 110 and based on use of local label spaces of the routers 111 of the stateless MPLS multicast domain 110, in various ways.

Figure 2:
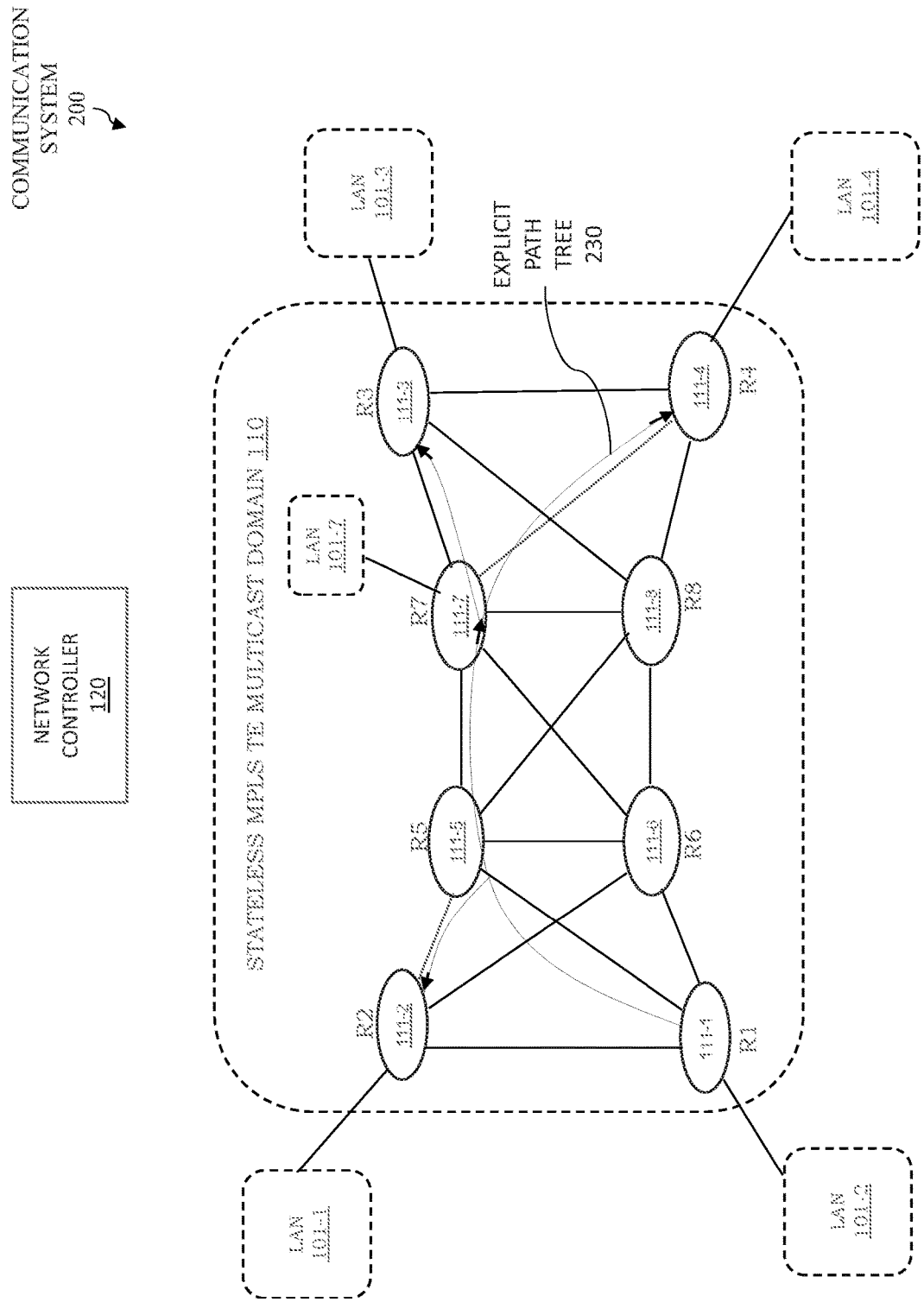
FIG. 2 depicts the communication system of FIG. 1 for illustrating an explicit path tree for a multicast flow within the stateless MPLS TE multicast domain of the communication system of FIG. 1.

FIG. 2 depicts the communication system of FIG. 1 for illustrating an explicit path tree for a multicast flow within the stateless MPLS TE multicast domain of the communication system of FIG. 1. As illustrated in FIG. 2, the communication system 200 of FIG. 2 is similar to the communication system 100 of FIG. 1. FIG. 2, as indicated above, illustrates an explicit path tree 230 for a multicast flow. The source of the multicast flow is in LAN 101-1, which is the local network of router 111-1. The packets for the multicast flow are received by LAN 101-2, LAN 101-3, LAN 101-4, and LAN 101-7, which are local networks of router 111-2, router 111-3, router 111-4, and router 111-7 respectively. Thus, within communication system 200, router 111-1 is the ingress router of the multicast flow and router 111-2, router 111-3, router 111-4, and router 111-7 are the egress routers of the multicast flow. The router 111-1 intends to send the multicast flow along a traffic engineered (TE) explicit path tree, which meets the QoS requirements of the multicast flow. The explicit path tree computed by the network controller 120 to the egress routers, as indicated above, is denoted in FIG. 2 as explicit path tree 230.

Figure 3:
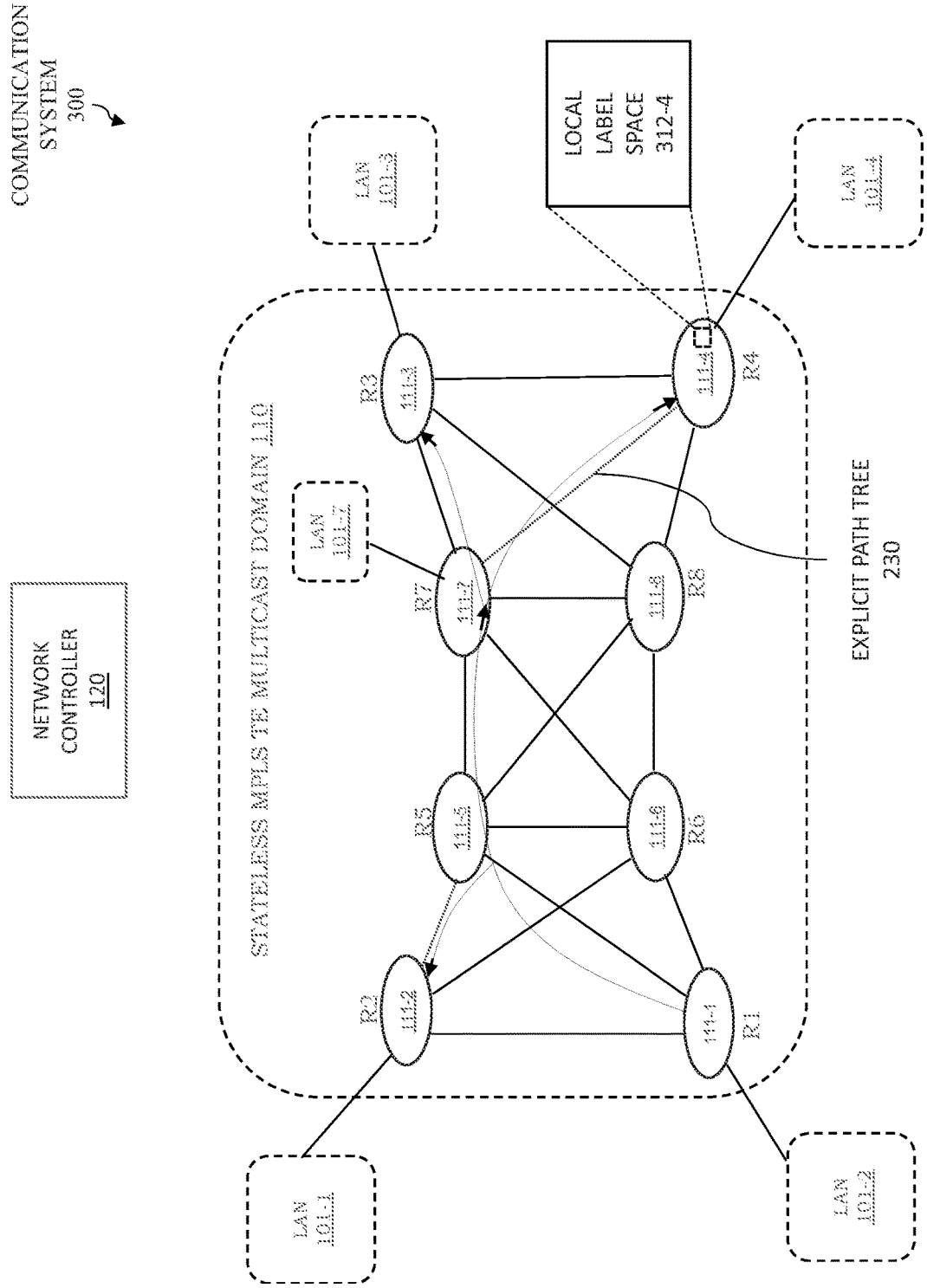
FIG. 3 depicts the communication system of FIG. 1 for illustrating unique router identifiers and local label spaces of routers of the stateless MPLS TE multicast domain of the communication system of FIG. 1.

FIG. 3 depicts the communication system of FIG. 1 for illustrating unique router identifiers and local label spaces of routers of the stateless MPLS TE multicast domain of the communication system of FIG. 1. As illustrated in FIG. 3, the communication system 300 of FIG. 3 is similar to the communication system 100 of FIG. 1.

In the stateless MPLS multicast domain 110 of FIG. 3, each of the routers 111 is assigned a router identifier that is unique within the stateless MPLS multicast domain 110. As illustrated in FIG. 3, the unique router identifier of a router 111 may be an integer index (illustratively, router 111-1 is assigned index "1", router 111-2 is assigned index "2", and so forth, with router 111-8 being assigned index "8"); however, it will be appreciated that other suitable identifiers may be used. The unique router identifiers of the routers 111 may be assigned by the network controller 120 from a unique router identifier space for the stateless MPLS multicast domain 110.

In the stateless MPLS multicast domain 110 of FIG. 3, each of the routers 111-1 to 111-8 maintains a local label space (although, for purposes of clarity, only the label space 312-4 for router 111-4 is depicted in FIG. 3). The routers 111 allocate labels from their local label spaces as follows: (1) each router 111 is allocated a node label from its local label space (e.g., in an IP network, the node label may map to a routable loopback IP address in the router 111) and (2) each forward connected adjacency of a router 111 is assigned an adjacency label from the local label space of the router 111 (e.g., for connectivity between R5 and R7, the adjacency label for adjacency R5→R7 is allocated from the local label space of R5 and the adjacency label for adjacency R7→R5 is allocated from the local label space of R7). The routers 111 program the assigned local labels into their ILM Tables as follows: (a) each router 111 programs its assigned node label into its ILM Table with the forwarding context as "self" and (b) each router 111 programs each adjacency label for each adjacency that is "forward connected" (i.e., direction is from the router 111 to its neighbor router 111) into its ILM Table with the forwarding context as the adjacency to the neighbor router 111.

It will be appreciated that, although primarily presented herein with respect to specific types, numbers, and arrangements of elements of the communication systems depicted in FIGS. 1-3, the communication systems depicted in FIGS. 1-3 may include various other types, numbers, and/or arrangements of elements while still supporting stateless MPLS TE multicast based on use of the unique router identifiers of the routers 111 within the stateless MPLS multicast domain 110 and based on use of the local label spaces of the routers 111 of the stateless MPLS multicast domain 110.

In at least some example embodiments, a node or adjacency in the explicit path tree is uniquely identified across the domain as the tuple {router index, label}, where the 'router index' in the tuple in the router index assigned to the parent router of the node or adjacency and the 'label' in the tuple is the label assigned to a node or adjacency from the local label space of the parent router. This tuple is termed as "indexed-label". As evident, a node or adjacency can be uniquely identified in the domain with its indexed-label and the router index acts as the distinguisher between overlapping labels among routers. So, an explicit path tree can be represented as the set of indexed-labels of nodes and adjacencies along the explicit path tree. The router index also may be considered to be the domain-wide unique identifier of the local label space in the router, wherein the indexed-label would represent a label along with the identifier of the local label space from which the label is allocated. It will be appreciated that the encoding of the explicit path tree based on indexed labels may be performed in a number of ways. It also will be appreciated that the term Traffic Engineered Explicit Multicast Label Stack (EMLS-TE) may be used to refer to the MPLS label stack that encodes an explicit path tree.

In at least some example embodiments, the encoding of the explicit path tree based on indexed labels may include encoding the stack of indexed-labels of the nodes and adjacencies in the tree where each indexed label of the explicit path tree is encoded as a stack of two MPLS labels (i.e., router index is also encoded as a MPLS Label). However, it will be appreciated that the encoding the explicit path tree into EMLS-TE as the stack of indexed-labels of the nodes and adjacencies in the explicit path tree may not be very efficient, since the indexed labels of nodes and/or forward connected adjacencies in a router along the tree will bear the same router index (i.e., the same router index will be repeated in multiple tuples associated with the router for the explicit path tree).

In at least some example embodiments, the encoding of the explicit path tree based on indexed labels may include encoding the explicit path tree as tuples of {router index, router label block}, where the "router index" is the index assigned to a router that owns the "router label block" and the "router label block" is a block of labels containing the node label and/or the forward connected adjacency label(s) in that router along the explicit path tree. In other words, the explicit path tree can be viewed as a set of routers along the tree, wherein each router is specified with its node and/or adjacency labels in the explicit path tree. The tuple {router index, router label block} is encoded as a label stack (i.e., router index is also encoded as MPLS Label) and is termed as "Indexed Label Block" (ILB). The labels within the router label block of an ILB will not overlap as those are assigned from local label space of the associated router, whereas the labels may overlap among different ILBs. The router index acts as the distinguisher between overlapping labels. This method of EMLS-TE is referred to herein as EMLS-TE-2, where the suffix "2" is for the type of EMLS-TE that encodes an explicit path tree as a set of ILBs. A packet encoded with EMLS-TE-2 is denoted herein as an EMLS-TE-2 packet.

In at least some example embodiments, when an ingress router needs to send a packet for a multicast flow along an explicit path tree, the ingress router pushes an EMLS-TE-2 onto the packet, where the EMLS-TE-2 consists of the ILBs of all routers along the explicit path tree. The ingress router may perform the following operations to forward the packet along the tree: (1) looks up the specific ILB that matches the router index configured in the router, (2) for a matching ILB, looks up each label in the router label block of the ILB in its ILM, to identify the labels that indicate its forward connected adjacencies, (3) removes the ILB from the EMLS-TE-2, and (4) for each forward connected adjacency, makes a copy of the EMLS-TE-2 packet and sends the copy of the EMLS-TE-2 packet to the next-hop of the forward connected adjacency.

In at least some example embodiments, when a router receives an EMLS-TE-2 packet for a multicast flow along an explicit path tree, the router may perform the following operations: (1) looks up the specific ILB that matches the router index configured in the router, (2) for a matching ILB, looks up each label in the router label block of the ILB in its ILM, to identify the labels that indicate its forward connected adjacencies, (3) removes the ILB from the EMLS-TE-2, (4) for each forward connected adjacency, makes a copy of the EMLS-TE-2 packet and sends the copy of the EMLS-TE-2 packet to the next-hop of the forward connected adjacency, and (5) if a label looked up in (2) indicates the router itself (i.e., the label is the node label), makes a local copy of the EMLS-TE-2 packet, removes the EMLS-TE-2 from the copy of the EMLS-TE-2 packet to form a new packet, and forwards the new packet based on its native headers.

It will be appreciated that creation and forwarding of an EMLS-TE-2 packet may be performed in various ways, which may be further understood with respect to the following example associated with FIGS. 1-3.

In this example, the routers 111 maintain the default ILM. Each of the routers 111 allocates a set of labels, including a node label and a set of adjacency labels for its forward connected adjacencies, from its local label space. The routers 111 may already allocate those labels if the stateless MPLS TE multicast domain 110 is a Segment Routing (SR) or Segment Routing with Traffic Engineering (SR-TE) capable network. SR/SR-TE is a form of source routing for unicast in which an ingress router prepends to packets a header that includes an ordered list of network segments to be traversed by the packet. A router is called a node segment and a forward connected adjacency is called an adjacency segment. In an MPLS network, segments are identified by MPLS labels. Each router allocates a label for its node segment and a label to each of its forward connected adjacency segments from its local label space, and distributes the labels mappings across the network through the SR control plane. An ingress router prepends a label stack to packets as the ordered list of segments to be traversed by the packet and each router receiving the packet processes and forwards the packet based on the segment on the top of the label stack. Upon completion of the segment, the related label is popped from the stack. This pop and forwarding continues until the label stack becomes empty. Since a receiving router only inspects segment at the top of the label stack, overlapping labels in the label stack (because each router allocates labels for its node and adjacency segments from its local label space) is not a problem in SR/SR-TE. Thus, when SR/SR-TE is enabled in the stateless MPLS TE multicast domain 110, label allocation and distribution of label mappings for nodes and adjacencies may be performed by the SR control plane (e.g., routing protocols such as OSPF, OSPFv3, IS-IS, BGP-LS, or the like). The network controller 120 may also trigger allocation of node and adjacency labels at each router. It will be appreciated that this may be further understood by way of reference to the following example.

In this example, assume that the routers 111 allocated node/adjacency labels as follows, where these label allocations demonstrate the worst case of overlapping of labels between the routers as each allocates from its local label space (e.g., assume a worst case in which the same node label Ln is allocated by each router R1-R8). For example, assume that the routers 111 allocated node/adjacency labels as follows: (1) R1: Node Label=Ln and Adjacency Labels: R1→R2=L1, R1→R5=L2, R1→R6=L3, (2) R2: Node Label=Ln and Adjacency Labels: R2→R1=L1, R2→R5=L2, R2→R6=L3, (3) R3: Node Label=Ln and Adjacency Labels: R3→R4=L1, R3→R7=L2, R3→R8=L3, (4) R4: Node Label=Ln and Adjacency Labels: R4→R3=L1, R4→R7=L2, R4→R8=L3, (5) R5: Node Label=Ln and Adjacency Labels: R5→R1=L1, R5→R2=L2, R5→R6=L3, R5→R7=L4, R5→R8=L5, (6) R6: Node Label=Ln and Adjacency Labels: R6→R1=L1, R6→R2=L2, R6→R5=L3, R6→R7=L4, R6→R8=L5, (7) R7: Node Label=Ln and Adjacency Labels: R7→R3=L1, R7→R4=L2, R7→R5=L3, R7→R6=L4, R7→R8-L5, and (8) R8: Node Label=Ln and Adjacency Labels: R8→R3=L1, R8→R4=L2, R8→R5=L3, R8→R6=L4, R8→R7=L5. Here, each router 111 programs its node label and adjacency labels into its ILM. A node label entry in the ILM maps to the Next-Hop Label Forwarding Entry (NHLFE) that is programmed with the next-hop as "self". An adjacency label maps to the NHLFE that is programmed with the next-hop information of the forward connected adjacency. The NHLFE mapped by an adjacency label is not programmed with any label, because there are no labels to push into the packet while forwarding to the next-hop. The ILM entries programmed in the routers 111 in this example are depicted in FIGS. 4A—4H.

In this example, assume that the ingress router 111-1 intends to send the multicast flow along a traffic engineered explicit path tree, which meets the QoS requirements of the multicast flow. The explicit path tree computed by the network controller to the egress routers is depicted in FIG. 2. The explicit path tree 230 is composed of the adjacencies as follows: (1) from router 111-1=R1→R5, (2) from router 111-5={R5→R2, R5→R7}, and (3) from 111-7={R7→R3, R7→R4}. As evident from the explicit path tree 230, router 111-7 is a bud, since it is a leaf as well as a transit router in the tree. The ingress router 111-1 then performs the following actions to translate the explicit path tree into constituent ILBs: (1) builds the list of nodes (egress routers) and adjacencies by adding the nodes into the adjacency list of the explicit path tree (the resultant list is =>{R1→R5, R5→R2, R5→R7, R7→R3, R7→R4, R2, R3, R4, R7}), (2) determines, from the list of (1), the routers along the explicit path tree (which are {R1, R5, R2, R7, R3, R4}), (3) builds, for each router from (2) a node-adjacency group that includes the node and/or forward connected adjacencies of the router (in this case, the node-adjacency groups are as follows: R1={R1→R5}, R5={R5→R2, R5→R7}, R2={R2}, R7={R7→R3, R7→R4, R7}, R3={R3}, and R4={R4}), (4) translates, for each group from (3), the nodes/adjacencies into corresponding labels allocated from local label space of the router (in this case, the node-adjacency groups as label stacks are now as follows: R1={L2}, R5={L2, L4}, R2={Ln}, R7={L1, L2, Ln}, R3={Ln}, and R4={Ln}, where it may be seen that labels may overlap among groups, but not within a group), and (5) builds the ILBs for each node-adjacency group, where the router index in the ILB is the index configured in the router of the group and the label block in the ILB is the label stack of the group (in this case, this results in the following ILBs: ILB-1={1, {L2}}, ILB-2={5, {L2, L4}}, ILB-3={2, {Ln}}, ILB-4={7, {L1, L2, Ln}}, ILB-5={3, {Ln}, and ILB-6={4, {Ln}}).

In this example, for any packet for the flow received from LAN 101-1, router 111-1 pushes an EMLS-TE-2 that encodes ILBs in the explicit path tree, i.e., {ILB-1, ILB-2, ILB-3, ILB-4, ILB-5, ILB-6}. The ILBs can be encoded in any order, but for optimal forwarding of the EMLS-TE-2 packet, the ILBs may be encoded in the order of occurrence in the explicit path tree.

The router 111-1, to forward the packet, scans the EMLS-TE-2 to look for the ILB that matches its configured router index 1, which is ILB-1. Then it looks up each label in the label block of ILB-1 in its ILM (FIG. 4A). The only label L2 in the block is mapped to the forward connected adjacency R1→R5. Router 111-1 removes ILB-1 from EMLS-TE-2 and forwards the packet over R1→R5 with EMLS-TE-2={ILB-2, ILB-3, ILB-4, ILB-5, ILB-6}.

The router 111-5 receives the packet forwarded on R1→R5 with EMLS-TE-2={ILB-2, ILB-3, ILB-4, ILB-5, ILB-6}. Router 111-5 scans the EMLS-TE-2 for the ILB that matches its configured router index 5, which is ILB-2. Then it looks up each label in the label block of ILB-2 in its ILM (FIG. 4E). From the lookup, it finds L2 and L4 are mapped to the forward connected adjacencies R5→R2 and R5→R7, respectively. It removes the ILB-2 from EMLS-TE-2 and forwards a copy of the packet to each adjacency with EMLS-TE-2={ILB-3, ILB-4, ILB-5, ILB-6}.

The router 111-2 receives the copy forwarded on R5→R2 with EMLS-TE-2={ILB-3, ILB-4, ILB-5, ILB-6}. Router 111-2 scans the EMLS-TE-2 to look for the ILB that matches its configured router index 2, which is ILB-3. Then it looks up each label in the label block of ILB-3 in its ILM (FIG. 4B). The only label Ln in the block identifies itself, so router 111-2 is an egress router for the EMLS-TE-2 packet. So, it removes the EMLS-TE-2 from the packet and forwards the packet to LAN 101-2 based on processing of the native header of the packet.

The router 111-7 receives the copy forwarded on R5→R7 with EMLS-TE-2={ILB-3, ILB-4, ILB-5, ILB-6}. Router 111-7 scans the EMLS-TE-2 to look for the ILB that matches its configured router index 7, which is ILB-4. Then it looks up each label in the EMLS-TE-2 in its ILM (FIG. 4G). From the lookup, it finds label Ln identifies itself, so it makes a local copy of the packet, removes EMLS-TE-2 from the copy and forwards the local copy to LAN 101-7 based on processing the native header of the copy. It also finds labels L1 and L2 are mapped to the two forward connected adjacencies R7→R3 and R7→R4 respectively. It removes ILB-4 from the EMLS-TE-2 and forwards a copy to each adjacency with EMLS-TE-2={ILB-3, ILB-5, ILB-6}.

The router 111-3 receives the copy forwarded on R7→R3 with EMLS-TE-2={ILB-3, ILB-5, ILB-6}. Router 111-3 scans the EMLS-TE-2 to look for the ILB that matches its configured router index 3, which is ILB-5. Then it looks up each label in the label block of ILB-5 in its ILM (FIG. 4C). The only label Ln in the block identifies itself, so router 111-3 is an egress router for the EMLS-TE-2 packet. So, it removes the EMLS-TE-2 from the packet and forwards the packet to LAN 101-3 based on processing of the native header of the packet.

The router 111-4 receives the copy forwarded on R7→R4 with EMLS-TE-2={ILB-3, ILB-5, ILB-6}. Router 111-4 scans the EMLS-TE-2 to look for the ILB that matches its configured router index 4, which is ILB-6. Then it looks up each label in the label block of ILB-6 in its ILM (FIG. 4D). The only label Ln in the block identifies itself, so router 111-4 is an egress router for the EMLS-TE-2 packet. So, it removes the EMLS-TE-2 from the packet and forwards the packet to LAN 101-4 based on processing of the native header of the packet.

It will be appreciated that, although primarily described with respect to an example in which the encoding of the explicit path tree based on indexed labels includes encoding the explicit path tree as tuples of {router index, router label block}, where the "router index" is the index assigned to a router that owns the "router label block" and the "router label block" is a block of labels containing the node label and/or the forward connected adjacency label(s) in that router along the explicit path tree, in at least some example embodiments the encoding of the explicit path tree based on indexed labels may include encoding the stack of indexed-labels of the nodes and adjacencies in the tree where each indexed label of the explicit path tree is encoded as a stack of two MPLS labels. The stack of two MPLS labels that encodes the indexed label is referred to herein as an Indexed Label Unit (ILU). As discussed hereinabove, such an encoding is not efficient because indexed labels for the node and/or adjacencies in a router will bear the same router index. It is noted that this type of EMLS-TE that encodes a tree as stack of ILUs is denoted as "EMLS-TE-3", where the suffix "3" stands for the type of EMLS-TE that encodes a tree as stack of ILUs. For example, reconsider the example provided above for EMLS-TE-2, the explicit path tree 230 can be encoded as EMLS-TE-3={{1, L2}, {5, L2}, {5, L4}, {2, Ln}, {7, L1}, {7, L2}, {7, Ln}, {3, Ln}, {4, Ln}}. A router that receives the EMLS-TE-3, scans for the ILUs that match its configured router index. Then it looks up the labels of matching ILUs in its ILM to make forwarding decisions. It will be appreciated that encoding of EMLS-TE-3 is not optimal because (a) ILU entries for node and/or adjacency labels of a specific router would encode the same router index, which increases the overhead/size of the EMLS-TE-3 and (b) a forwarding router has to parse the entire label stack to parse for its local ILUs (as opposed to the case of EMLS-TE-2, in which the router looks for its local ILB and then parses through the labels in that ILB only).

It will be appreciated that, herein, the approach of stateless MPLS TE multicast using EMLS-TE-2 is referred to as "Option-A" and the approach of stateless MPLS TE multicast using EMLS-TE-3 is referred to as "Option-B".

It will be appreciated that, although primarily presented with respect to use of a single domain architecture (e.g., the stateless MPLS TE multicast domain is a single domain), in at least some example embodiments a multi-domain architecture (e.g., the stateless MPLS TE multicast domain includes multiple sub-domains) may be supported.

In at least some example embodiments, a stateless MPLS TE multicast domain may be divided into multiple sub-domains, respectively. The explicit path tree may span the multiple domains and the use of the multiple domains may provide various efficiencies associated with encoding of the explicit path tree within packets sent over the explicit path tree. For example, the multi-domain architecture may be used to prevent the number of encoded labels in an encoding of an explicit path tree from growing linearly with the size of the explicit path tree (in terms of nodes and adjacencies). This will be further appreciated when considering that (1) a router that processes an EMLS-TE-2 packet needs to find its local ILB in the packet, complexity of which grows linearly with the number of ILBs in the stack, i.e., of O(P) complexity wherein P is the number of ILBs or the routers along the explicit path tree and (2) a router that processes an EMLS-TE-3 packet needs to parse all ILUs to look for the local ILUs in the stack, the complexity of which grows linearly with the number of nodes and adjacencies along the explicit path tree, i.e., O(N) complexity wherein N is the number of nodes and adjacencies along the explicit path tree. This also will be further appreciated when considering that the size of the EMLS-TE-2 or EMLS-TE-3 grows linearly with the size of the explicit path tree (in terms of nodes and adjacencies), which increases the overhead of the EMLS-TE-2 or EMLS-TE-3 packets. The multi-domain architecture may be configured to mitigate such issues by limiting the size of the EMLS-TE-2 in the EMLS-TE-2 packet or the size of the EMLS-TE-3 in the EMLS-TE-3 packet to the size of the portion of the explicit path tree (in terms of nodes and adjacencies) in the sub-domain of the multi-domain architecture, for each of the sub-domains of the multi-domain architecture. As a result, the size of EMLS-TE-2 or EMLS-TE-3 does not grow linearly with the number of nodes and adjacencies that form the tree. It will be appreciated that the multi-domain architecture may be further understood by way of reference to the example communication system of FIG. 5.

Figure 5:
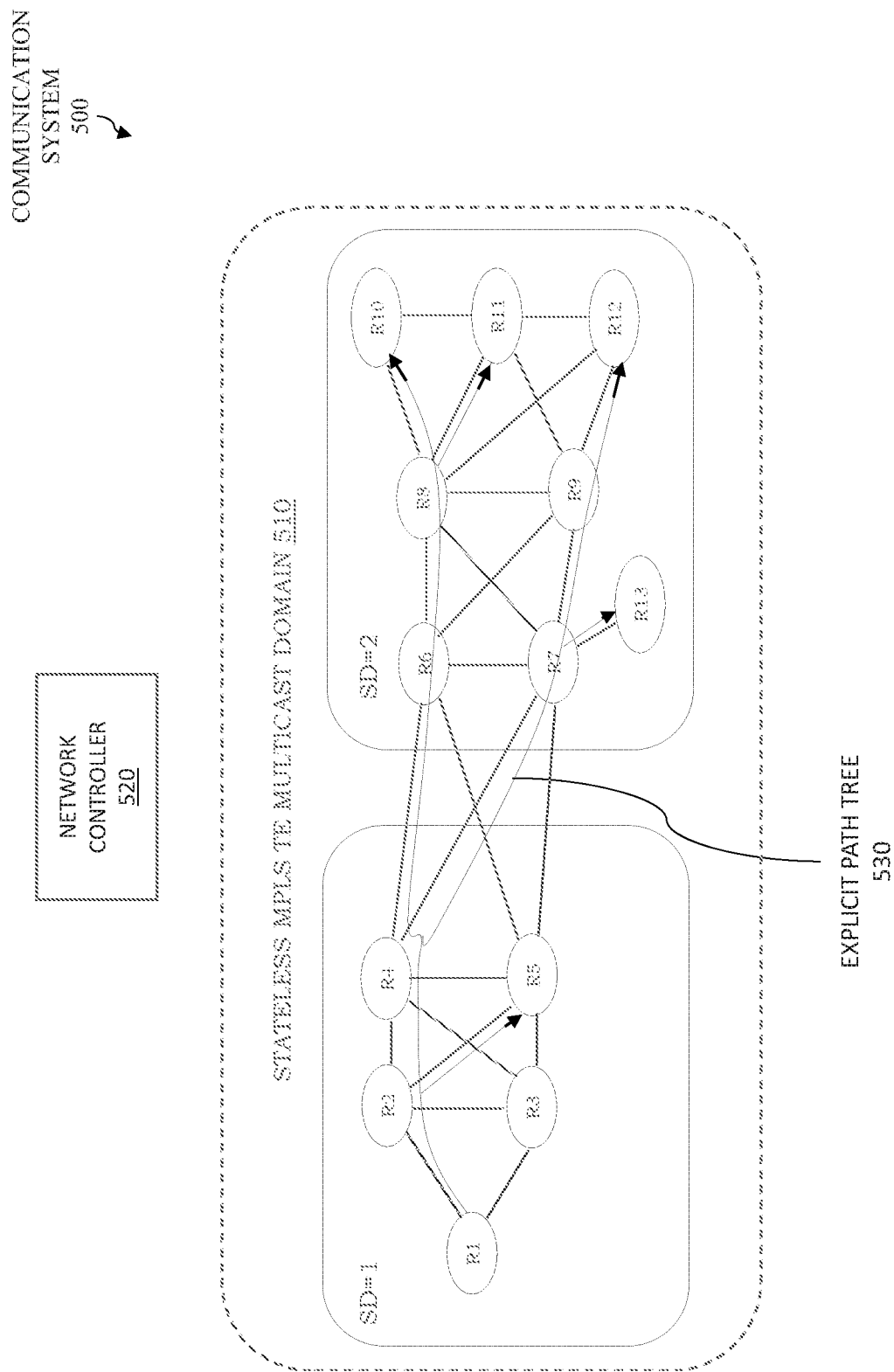
FIG. 5 depicts an example embodiment of a communication system configured to support stateless multicast communications in an MPLS TE multicast domain implemented as a set of multiple sub-domains.

FIG. 5 depicts an example embodiment of a communication system configured to support stateless multicast communications in an MPLS TE multicast domain implemented as a set of multiple sub-domains.

The example communication system 500 includes a stateless MPLS TE multicast domain 510 which is controlled by a network controller 520. The stateless MPLS TE multicast domain 510 includes thirteen routers (denoted as R1-R13, respectively). The stateless MPLS TE multicast domain 510 is divided into two sub-domains (denoted as SD1 and SD2). The routers R1-R5 are members of SD1 and routers R6-R13 are members of SD2. It will be appreciated that more than two SDs may be used. Typically, an SD is limited by the maximum number of adjacencies and routers it allows. Each router is configured with the identifier of its parent SD. Also, a router learns the SD of its neighboring routers, so a router can distinguish between "intra-domain" and "inter-domain" adjacencies. For example, R3→R5 is an intra-domain adjacency in SD1, whereas R4→R6 is an inter-domain adjacency from SD1 to SD2. Each R1-R13 is assigned a router index. The router index for Rx is denoted as x. Each router in R1-R13 assigned labels from its local label space to its node and forward connected adjacencies. The node label for router Rx is denoted as Lx and adjacency label for Rx→Ry is denoted as Lx_y. It will be appreciated that such aspects may be further understood from the following example.

As an example, for a specific multicast flow, assume that R1 is the ingress router and R5 and R10-R13 are the egress (leaf) routers. The network controller 520 computes an explicit path tree 530 that spans across SD1 and SD2. R6 and R7 are the border routers of SD2, through which the explicit path tree enters SD2. So, R6 and R7 are ingress routers of two subtrees, in SD2, of the explicit path tree. The explicit path tree consists of following ILBs: ILB-1={1, {L1_2}}, ILB-2={2, {L2_4, L2_5}}, ILB-3={5, {L5}}, ILB-4={4, {L4_6, L4_7}}, ILB-5={6, {L6_8}}, ILB-6={7, {L7_13, L7_9}}, ILB-7={8, {L8_10, L8_11}}, ILB-8={9, {L9_12}}, ILB-9={10, {L10}}, ILB-10={11, {L11}}, ILB-11={12, {L12}}, and ILB-12={13, {L13}}.

It will be appreciated that two approaches for use of Option-A (EMLS-TE-2) may be supported and that continuation of the example above for sending multicast packets of the multicast flow for the two approaches is provided below.

A description of forwarding of a multicast packet of the multicast flow over the explicit path tree in the example above, using a first approach of Option-A (EMLS-TE-2), follows. It will be appreciated that use of the first approach of Option-A mitigates the issue discussed above of the complexity growing linearly with the number of ILBs in the stack.

In continuation of the above example for the first approach of Option-A, the ingress router would encode an EMLS-TE-2 for each SD to be traversed by the packet, i.e., an EMLS-TE-2 would encode ILBs only for the subset of routers in the SD. EMLS-TE-2 would be encoded with its parent SD number. The rule is that, when a multi-domain EMLS-TE-2 packet traverses a specific SD then, within the SD, the EMLS-TE-2 for the SD is only processed. When a packet is forwarded on an inter-domain adjacency then the EMLS-TE-2 of the source SD (for example, when forwarded on R4→R6 the source SD is 1) is removed from the packet. So, to send a packet in the exemplary multicast flow, the routers operate as follows.

R1 encodes the following EMLS-TE-2s and pushes the EMLS-TE-2s onto the packet (where the suffix "(x)" in EMLS-TE-2 denotes its parent SD "x"): EMLS-TE-2(1)= {<SD=1>, ILB-1, ILB-2, ILB-3, ILB-4}+EMLS-TE-2(2)= {<SD=2>, ILB-5, ILB-6, ILB-7, ILB-8, ILB-9, ILB-10, ILB-11, ILB-12}. R1 processes EMLS-TE-2(1) and sends the packet to R2 with the following (ILB-1 is removed from EMLS-TE-2(1) as it is local ILB of R1): EMLS-TE-2(1)= {<SD=1>, ILB-2, ILB-3, ILB-4}+EMLS-TE-2(2)= {<SD=2>, ILB-5, ILB-6, ILB-7, ILB-8, ILB-9, ILB-10, ILB-11, ILB-12}.

R2 processes EMLS-TE-2(1) and replicates the packet into following two copies: (1) Copy-1: EMLS-TE-2(1)= {<SD=1>ILB-3, ILB-4}+EMLS-TE-2(2)={<SD=2>, ILB-5, ILB-6, ILB-7, ILB-8, ILB-9, ILB-10, ILB-11, ILB-12}, which is sent to R2→R4 and (2) Copy-2: EMLS-TE-2(1)= {<SD=1>ILB-3, ILB-4}+EMLS-TE-2(2)={<SD=2>, ILB-5, ILB-6, ILB-7, ILB-8, ILB-9, ILB-10, ILB-11, ILB-12}, which is sent to R2→R5.

When R4 receives Copy-1 and processes EMLS-TE-2(1), it replicates the packet into following two copies: (1) Copy-3: EMLS-TE-2(2)={<SD=2>, ILB-5, ILB-6, ILB-7, ILB-8, ILB-9, ILB-10, ILB-11, ILB-12}, which is sent to R4→R6 (where it is noted that, since R4→R6 is an inter-domain adjacency, R4 removes EMLS-TE-2(1) from the forwarded packet) and (2) Copy-4: EMLS-TE-2(2)={<SD=2>, ILB-5, ILB-6, ILB-7, ILB-8, ILB-9, ILB-10, ILB-11, ILB-12}, which is sent to R4→R7 (where it is noted that, since R4→R7 is an inter-domain adjacency, R4 removes EMLS-TE-2(1) from the forwarded packet).

When R5 receives Copy-2, it processes EMLS-TE-2(1) and the only label L5 in it local ILB-3 indicates that it is the egress router. So R5 strips both EMLS-TE-2(1) and EMLS-TE-2(1), and handles the packet based on its native header.

When R6 receives Copy-3, it processes EMLS-TE-2(2) and, based on its local ILB-5, generates the following copy: Copy-5: EMLS-TE-2(2)={<SD=2>ILB-6, ILB-7, ILB-8, ILB-9, ILB-10, ILB-11, ILB-12}, which is sent to R8→R8L.

When R7 receives Copy-4, it processes EMLS-TE-2(2) and, based on its local ILB-6, generates the following two copies: (1) Copy-6: EMLS-TE-2(2)={<SD=2>ILB-7, ILB-8, ILB-9, ILB-10, ILB-11, ILB-12}, which is sent to R7→R9 and (2) Copy-7: EMLS-TE-2(2)={<SD=2>ILB-7, ILB-8, ILB-9, ILB-10, ILB-11, ILB-12}, which is sent to R7→R13.

When R8 receives Copy-5, it processes EMLS-TE-2(2) and, based on its local ILB-7, generates the following two copies: (1) Copy-8: EMLS-TE-2(2)={<SD=2>ILB-8, ILB-9, ILB-10, ILB-11, ILB-12}, which is sent to R8→R10 and (2) Copy-9: EMLS-TE-2(2)={<SD=2>ILB-8, ILB-9, ILB-10, ILB-11, ILB-12}, which is sent to R8→R11.

When R9 receives Copy-6, it processes EMLS-TE-2(2) and based on its local ILB-8, it generates the following copy: Copy-10: EMLS-TE-2(2)={<SD=2>ILB-9, ILB-10, ILB-11, ILB-12}, which is sent to R9→R12.

When R13 receives Copy-7, it processes EMLS-TE-2(2) and the only label L13 in its local ILB-12 indicates that it is the egress router, so R13 strips the EMLS-TE-2(2) and handles the packet based on its native header.

When R10 receives Copy-8, it processes EMLS-TE-2(2) and the only label L10 in its local ILB-9 indicates that it is the egress router, so R10 strips the EMLS-TE-2(2) and handles the packet based on its native header.

When R11 receives Copy-9, it processes EMLS-TE-2(2) and the only label L11 in its local ILB-10 indicates that it is the egress router, so R11 strips the EMLS-TE-2(2) and handles the packet based on its native header.

When R12 receives Copy-10, it processes EMLS-TE-2(2) and the only label L12 in its local ILB-11 indicates that it is the egress router, so R12 strips the EMLS-TE-2(2) and handles the packet based on its native header.

In this manner, the packet reaches all of the egress routers of the multicast flow via the explicit path tree.

A description of forwarding of a multicast packet of the multicast flow over the explicit path tree in the example above, using a second approach of Option-A (EMLS-TE-2), follows. It will be appreciated that use of the second approach of Option-A mitigates both of the issues discussed above (namely, the issue of the complexity growing linearly with the number of ILBs in the stack and the size of the EMLS-TE growing linearly with the size of the explicit path tree (in terms of nodes and adjacencies)).

It will be appreciated that the second approach of Option-A is a "quasi-stateful" approach. The rule is that, when an EMLS-TE-2 packet traverses a specific SD then, within the SD, the EMLS-TE-2 packet encodes the ILBs that belong to that SD only. For a multi-domain explicit path tree, the EMLS-TE-2 packet does not have to encode the nodes and adjacencies of the entire tree, so the size of EMLS-TE-2 does not grow linearly with the size of the multi-domain tree.

It is noted that this second approach uses the concept of a "tree label" and "tree label stack". In the stateless MPLS TE multicast domain 510, R6 and R7 are the border routers of SD 2, through which the explicit path tree enters SD2. So, R6 and R7 are ingress routers of two subtrees in SD2, of the explicit path tree. The network controller 520 allocates a Tree Label in a border router from its respective local label space, that maps to the EMLS-TE-2 containing the ILBs of the subtree. In this example, assume that the tree label allocated in R6 is TL6 (which maps to the EMLS-TE-2={ILB-5, ILB-7, ILB-9, ILB-10}) and that the tree label allocated in R7 is TL7 (which maps to the EMLS-TE-2={ILB-6, ILB-8, ILB-11, ILB-12}).

In continuation of the above example for the first approach of Option-A, the ingress router pushes the EMLS-TE-2 containing ILBs for the subset of the tree within its local SD, and a TLS for each border router in adjoining SD, wherein each TLS encodes the tuple {Gateway Label, Tree Label}. The TLS encodes the node label in the border router as "Gateway Label" and encodes the tree label of a subtree programmed in the border router as "Tree Label". The TLS is encoded within the local ILB for the Gateway. In this example, the following are the local ILBs for the gateways R6 and R7 respectively: ILB-13={6, TLS={L6, TL6}} and ILB-14={7, TLS={L7, TL7}}. So, to send a packet in the exemplary multicast flow, the routers operate as follows.

R1 encodes the EMLS-TE-2={ILB-1, ILB-2, ILB-3, ILB-4, ILB-13, ILB-14} and pushes it onto the packet. R1 sends the following EMLS-TE-2 packet to R2 after processing local ILB-1: EMLS-TE-2={ILB-2, ILB-3, ILB-4, ILB-13, ILB-14} (it is noted that ILB-1 is removed in the forwarded packet as it is the local ILB of R1).

R2 processes local ILB-2 and replicates the EMLS-TE-2 packet into the following two copies: (1) Copy-1: EMLS-TE-2={ILB-3, ILB-4, ILB-13, ILB-14}, which is sent to R2→R4 and (2) Copy-2: EMLS-TE-2={ILB-3, ILB-4, ILB-13, ILB-14}, which is sent to R2→R5.

When R4 receives Copy-1, it processes local ILB-4 and replicates the packet into following two copies: (1) Copy-3: EMLS-TE-2={ILB-3, ILB-13, ILB-14}, which is sent to R4→R6 and (2) Copy-4: EMLS-TE-2={ILB-3, ILB-13, ILB-14}, which is sent to R4→R7.

When R5 receives Copy-2, the only label L5 in local ILB-3 indicates that it is the egress router, so R5 strips the EMLS-TE-2 and handles the packet based on its native header.

When R6 receives Copy-3, it processes local ILB-13 and finds only the TLS={L6, TL6}. Gateway Label L6 indicates it is the border router for TLS. So, R6 translates the Tree Label TL6 to EMLS-TE-2={ILB-5, ILB-7, ILB-9, ILB-10}. So, R6 processes the local ILB-5 and generates the following copy: Copy-5: EMLS-TE-2={ILB-7, ILB-9, ILB-10}, which is sent to R6→R8.

When R7 receives Copy-4, it processes local ILB-14 and finds only the TLS={L7, TL7}. Gateway Label L7 indicates it is the border router for TLS. So, R7 translates the Tree Label TL7 to EMLS-TE-2={ILB-6, ILB-8, ILB-11, ILB-12}. So, R7 processes the local ILB-6 and generates the following two copies: (1) Copy-6: EMLS-TE-2={ILB-8, ILB-11, ILB-12} sent to R7→R9 and (2) Copy-7: EMLS-TE-2={ILB-8, ILB-11, ILB-12}, which is sent to R7→R13.

When R8 receives Copy-5, it processes local ILB-7 and it replicates it into following two copies: (1) Copy-8: EMLS-TE-2={ILB-9, ILB-10}, which is sent to R8→R10 and (2) Copy-9: EMLS-TE-2={ILB-9, ILB-10}, which is sent to R8→R11.

When R9 receives Copy-6, it processes local ILB-8 and generates the following copy: Copy-10: EMLS-TE-2={ILB-11, ILB-12}, which is sent to R9→R12.

When R13 receives Copy-7, the only label L13 in its local ILB-12 indicates that it is the egress router, so R13 strips the EMLS-TE-2 and handles the packet based on its native header.

When R10 receives Copy-8, the only label L10 in its local ILB-9 indicates that it is the egress router, so R10 strips the EMLS-TE-2 and handles the packet based on its native header.

When R11 receives Copy-9, the only label L11 in its local ILB-10 indicates that it is the egress router, so R11 strips the EMLS-TE-2 and handles the packet based on its native header.

When R12 receives Copy-10, the only label L12 in its local ILB-11 indicates that it is the egress router, so R12 strips the EMLS-TE-2 and handles the packet based on its native header.

It will be appreciated that the TLS may be formatted in various ways. An example embodiment for formatting of a TLS for use in a multi-domain stateless MPLS TE multicast domain is presented in FIG. 6.

FIG. 6 depicts an example embodiment of a TLS for use in a multi-domain stateless MPLS TE multicast domain. The TLS 600 includes a Tree Label Indicator (TLI) Label, a Gateway Label (GL) Label, and a Tree Label (TL) Label.

The TLI Label is configured to enable a receiving router to distinguish unambiguously between the TLS and the labels that represent egress routers. When TLS is embedded within EMLS, a receiving router needs to be able to distinguish unambiguously between the labels that represent egress routers and the TLS. To accomplish this, the first label in a TLS is the TLI Label, where preceding means closer to the top of the label stack (farther from the Bottom of Stack indication). TLI Label is a special label that that is not expected to be used for any other purposes. The TLI Label includes a 20-bit TLI field, a 3-bit EXP field, a 1-bit S field (or S bit), and an 8-bit TTL field. The TLI field of the TLI Label may have a value of TLI or any other suitable value, which may be reserved at the IANA registry on Special-purpose labels. The EXP and TTL fields in TLI Label are set to 0, as those fields are not expected to have any significance. The S bit is set to 0 since other labels follow the TLI Label in the TLS.

The GL Label is configured to identify the gateway router (i.e., the label of the unicast LSP to the gateway router). The label is assigned to a loopback address in the gateway router and advertised in the MPLS control plane (e.g., LDP, SR, or the like). The GL Label includes a 20-bit Gateway Label field (encoding the label that identifies the gateway router), a 3-bit EXP field, a 1-bit S field (or S bit), and an 8-bit TTL field. The Gateway Label is encoded as the node label assigned to the gateway/border router. Further, the TLS is embedded within the local ILB for a gateway router, so a forwarding router along the explicit path tree does not perform any action on the TLS; rather, it gets forwarded transparently within the local ILB of the gateway/border router until the ILB reaches the gateway/border router.

The TL Label is configured to identify the explicit path tree (e.g., stateless MPLS multicast tree) that originates at the gateway router. The TL Label includes a 20-bit Tree Label field (encoding the label that identifies the explicit path tree), a 3-bit EXP field, a 1-bit S field (or S bit), and an 8-bit TTL field. The Tree Label maps to an EMLS-TE-2 or EMLS-TE-3 that encodes the indexed-labels of nodes and adjacencies of an explicit path tree rooted at the router that programmed the tree label.

It will be appreciated that a TLS for use in a multi-domain stateless MPLS TE multicast domain may be formatted in various other ways.

In this manner, the packet reaches all of the egress routers of the multicast flow via the explicit path tree.

It will be appreciated that, although primarily presented with respect to examples in which Option-A (EMLS-TE-2) is used, the examples above may be adapted for use of Option-B (EMLS-TE-3).

It will be appreciated that various example embodiments may be configured to support stateless MPLS TE multicast that includes sending a multicast packet on a stateless explicit path tree by pushing an MPLS label stack onto the multicast packet, wherein the label stack encodes indexed-labels of nodes and adjacencies along the tree, wherein an indexed-label is a generic concept of a tuple {router index, label} that uniquely identifies a node or adjacency across the network/domain, and wherein the 'router index' is a network/domain wide unique index assigned to a router and the 'label' is a label allocated from the local label space of the router (e.g., per-platform label space) to identify the router or an adjacency in the router. The router index may be also considered as a network/domain wide unique identifier for the local label space of the router. The explicit path tree is computed in such a way that it guarantees the QoS requirements of the multicast flow associated with the packet. The multicast packet is propagated along the explicit path tree and each router along the explicit path tree scans the MPLS label stack on the received packet to look for the indexed-labels that match the router index configured in the router. If the node indexed-label is found, the router makes a local copy of the packet, removes the MPLS label stack from the copy, and forwards the copy to the local context. If adjacency indexed-labels are found, the router removes all such indexed-labels from the MPLS label stack and forwards a copy of the MPLS packet (with the remaining indexed-labels) to each adjacency indicated by the adjacency indexed-labels.

It will be appreciated that, since the nodes and adjacencies along the explicit path tree are assigned labels from the local label spaces of their parent routers, node or adjacency labels of different parent routers may overlap (i.e., will have same label value); however, the encoding of those labels as indexed-labels in the MPLS label stack solves the label overlapping problem as the router index in an indexed-label uniquely identifies the router that allocated the label.

It will be appreciated, as discussed herein, that the encoding of the indexed-labels into an MPLS label stack may be performed in a number of ways, at least including Option-A and Option-B discussed herein.

For example, as discussed herein, in various example embodiments of Option-A, the node and/or adjacency labels of a router along the explicit path tree are stacked together into a label block and the label block is tagged with the router index. This unit is termed as the Indexed Label Block (ILB). The MPLS label stack sent on a packet is composed of the stack of ILBs, wherein each ILB represents a router along the explicit path tree. Each router along the tree scans the MPLS label stack on the packet to look for the ILB that matches its assigned router index and then forwards the packet based on the node and/or adjacency labels in the label block of the matching ILB.

For example, as discussed herein, in various example embodiments of Option-B, an indexed-label is encoded as Indexed Label Unit (ILU). So, the MPLS label stack is encoded with ILUs of nodes and adjacencies along the explicit path tree. Each router along the tree scans for the ILUs that match its assigned index and forwards the packet based on the node and/or adjacency labels in each matching ILU.

It will be appreciated that at least some example embodiments presented herein may be configured to support any stateless MPLS TE multicast solution using local label space at the routers and/or any solution that assigns an indexed-label as an identifier to any network element (e.g., such as a node, an adjacency, or the like).

It will be appreciated that the EMLS-TE used to encode node and adjacency labels along a stateless explicit path tree may be formatted in various ways. In at least some example embodiments, the EMLS-TE may be formatted as depicted in FIG. 7.

FIG. 7 depicts an example embodiment of an EMLS-TE used to encode node and adjacency labels along a stateless explicit path tree. The EMLS-TE 700 includes an EMLS-TE Indicator (EMLS-TEI) label, an EMLS-TE Descriptor label, and an EMLS-TE Label Stack.

The EMLS-TEI label is a special label configured to enable routers to unambiguously distinguish between EMLS-TE and non-EMLS-TE labels. When EMLS-TE is embedded within a MPLS label stack consisting of "other" labels, a receiving router needs to be able to distinguish unambiguously between the EMLS-TE label and non-EMLS-TE labels. To accomplish this, the label immediately preceding an EMLS-TE may be the EMLS-TEI label, where preceding means closer to the top of the label stack (farther from bottom of stack indication). The EMLS-TEI label is a special label that is not expected to be used for any other purposes. The EMLS-TEI Label includes a 20-bit EMLS-TEI field, a 3-bit EXP field, a 1-bit S field (or S bit), and an 8-bit TTL field. The EMLS-TEI field of the EMLS-TEI label may have a value of EMLS-TEI or any other suitable value, which may be reserved at the IANA registry on Special-purpose labels. The EXP and TTL fields in EMLS-TEI label are set to values as required for the packet. The sending router and receiving router of an EMLS-TE packet use the EXP field for mapping to the appropriate forwarding class. The originating router of the EMLS-TE may set the TTL to the maximum depth of the explicit path tree, to maximum value of 255, or the like. A receiving router decrements the TTL field by 1, while processing the EMLS-TE packet. The S bit is set to 0 since subsequent labels follow the EMLS-TEI label in the EMLS-TE.

The EMLS-TE Descriptor label follows the EMLS-TEI label in the EMLS-TE. The EMLS-TE Descriptor label is another special label that describes the type of EMLS-TE and the size of the EMLS-TE. So, the EMLS-TE Descriptor label does not carry a special fixed value. The EMLS-TE Descriptor label includes a 20-bit value which encodes the type of EMLS-TE and the number of subsequent labels in the EMLS-TE stack. It will be appreciated that the EMLS-TE Descriptor label may be formatted in various ways. In at least some example embodiments, the EMLS-TE Descriptor label may be formatted as depicted in FIG. 8. FIG. 8 depicts an example embodiment of an EMLS-TE Descriptor label used within an EMLS-TE. The EMLS-TE Descriptor label 800 includes a 3-bit Type Field, a 17-bit Number of Labels (Num Labels) field, a 3-bit EXP field, a 1-bit S field (or S bit), and an 8-bit TTL field. The 3-bit Type field encodes the type of EMLS-TE. For example, a type 0x2 (or any other suitable value) may be used to indicate use of EMLS-TE-2 and a type 0x3 (or any other suitable value) may be used to indicate use of EMLS-TE-3. The 17-bit Number of Labels field includes a value which indicates the number of subsequent labels that belong to the EMLS-TE. If the value is 'N' then the subsequent N labels (following the EMLS-TE Descriptor label) belong to the EMLS-TE. It will be appreciated that the maximum value of N may be configured to the EMLS MAX, which is a constant that may be configured by an operator and applicable across the stateless MPLS TE multicast domain. The originator of the EMLS-TE packet sets the EXP field to 0, and the receiver will ignore the value of this field. The S bit is set to 0. The TTL field is set to the TTL of the EMLS-TE packet.

The EMLS-TE Label Stack is the body of the EMLS-TE. The exact structure of the EMLS-TE Label Stack depends on the Type field in the EMLS-TE Descriptor label (namely, whether the EMLS-TE is an EMLS-TE-2 or an EMLS-TE-3). It is noted that example embodiments of the EMLS-TE Label Stack for EMLS-TE-2 and EMLS-TE-3 are discussed further below.

In at least some example embodiments, the EMLS-TE Label Stack for EMLS-TE-2 may be formatted as depicted in FIG. 9. FIG. 9 depicts an example embodiment of an EMLS-TE Label Stack for an EMLS-TE of type EMLS-TE-2. For EMLS-TE-2, the label stack consists of a stack of Indexed Label Blocks (ILBs). The label stack consists of N number of ILBs, where each ILB includes a variable number of labels. In at least some example embodiments, an ILB for use in an EMLS-TE-2 may be formatted as in FIG. 10.

FIG. 10 depicts an example embodiment of an ILB configured for use in an EMLS-TE-2. The ILB 1000 includes an ILB Descriptor Label and P number of Labels. The P number of Labels encode the node and/or adjacency labels for the router for which the ILB is provided. The ILB Descriptor Label includes a 12-bit Router Index field, an 8-bit Number of Labels (Num Labels) field, a 3-bit EXP field, a 1-bit S field (or S bit), and an 8-bit TTL field. The Router Index field encodes the index assigned to the router for which the ILB is encoded. It will be appreciated that, with a 12-bit field, there can be up to 4096 routers in the stateless MPLS TE multicast domain. The router index may be also considered as a domain-wide unique label space identifier assigned to a router to identify a certain label space in the router. The Number of Labels field encodes the number of labels in the label block of the ILB. It will be appreciated that, with an 8-bit field, there can be up to 256 labels in the label block, i.e., up to 256-(1 node label)=255 adjacencies can be configured per router. It will be appreciated that the Router Index and Number of Label fields may be configured to have other sizes. The EXP field in the ILB Descriptor is set to 0 by the originator of the ILB and ignored by a receiver. The S-bit is set to 0 since there are labels after the ILB Descriptor. The TTL field must be set to a non-zero value by the originator of the ILB. As discussed further below, a non-zero TTL value means that the ILB has not yet been processed by the router that is configured with the Router Index.

The P Labels that follow the ILB Descriptor Label each include a 20-bit Label field, a 3-bit EXP field, a 1-bit S field (or S bit), and an 8-bit TTL field. The Label fields encode the labels of the node and/or adjacencies of the router. The originating router of the ILB sets the EXP and TTL fields in the labels to 0. A receiver ignores the EXP and TTL fields in the Labels.

It is noted that, as discussed further herein, a router that processes the EMLS-TE-2 on a packet scans for the ILB that matches its configured router index. If a matching ILB is found, then the router looks up each label in its label block in the ILM Table of the router to make forwarding decisions. The router may remove the ILB from the EMLS-TE-2 in the forwarded packets. In certain implementations, removal of an ILB may be costly and so the router may leave the ILB in the EMLS-TE-2; however, such implementations will set the TTL field in the ILB Descriptor to 0, to mark that the ILB has been processed by its targeted router. Thus, a router that processes an ILB should also check if the TTL field in ILB Descriptor is 0 and, if TTL is 0, then it means it had processed the ILB earlier and is now seeing it again (i.e., there must be a loop in the network) and should drop the packet.

It will be appreciated that the formatting of an EMLS-TE-2 packet using an EMLS-TE-2 may be further understood by way of an example as depicted in FIG. 11.

FIG. 11 depicts an example of an EMLS-TE-2 packet for the explicit path tree of the MPLS TE multicast domain of FIG. 1. FIG. 11 depicts the EMLS-TE-2={ILB-1, ILB-2, ILB-3, ILB-4, ILB-5, ILB-6} that is pushed by ingress router 111-1 into a packet of the exemplary multicast flow of FIG. 1, where the ILBs are as follows: ILB-1={1, {L2}}, ILB-2={5, {L2, L4}}, ILB-3={2, {Ln}}, ILB-4={7, {L1, L2, Ln}}, ILB-5={3, {Ln}}, and ILB-6={4, {Ln} }. The Type field in the EMLS-TE Descriptor is set to 0x2 to indicate the type as EMLS-TE-2. There are 15 labels in the Label Stack, so the Number of Labels field in the EMLS-TE Descriptor is set to 15. The S bit in all labels except the last label Ln in ILB-6 is set to 0, since those are not the last label in the stack. The S bit for the last label Ln in ILB-6 is dependent on whether a non-EMLS-TE label follows it. The EXP field is 0 in all labels except the EMLS-TEI. The TTL field is zero in all labels, except in EMLS-TE-2 and in any ILB Descriptor.

In at least some example embodiments, the EMLS-TE Label Stack for EMLS-TE-3 may be formatted as depicted in FIG. 12. FIG. 12 depicts an example embodiment of an EMLS-TE Label Stack for an EMLS-TE of type EMLS-TE-3. For EMLS-TE-3, the label stack consists of a stack of Indexed Label Units (ILUs). The label stack consists of N number of ILUs, where each ILU represents an index-label of a node or adjacency in the explicit path tree. In at least some example embodiments, an ILU for use in an EMLS-TE-3 may be formatted as in FIG. 13.

FIG. 13 depicts an example embodiment of an ILU configured for use in an EMLS-TE-3. The ILU 1300 includes a Router Index Label and a Label that encodes a node or adjacency label for the router for which the ILU is provided.

The Router Index Label includes a 20-bit Router Index field, a 3-bit EXP field, a 1-bit S field (or S bit), and an 8-bit TTL field. The Router Index field encodes the index assigned to the router for which the ILU is encoded and, thus, the router which owns the second label of the ILU. The router index may be also considered as a domain-wide unique label space identifier assigned to a router to identify a certain label space in the router from which the second label of the ILU is allocated by the router. The EXP field is set to 0. The S-bit is set to 0, as a second label follows. The TTL field is set to a non-zero value by the originator of the ILU. As discussed further below, a non-zero TTL value means that the ILU has not yet been processed by the router that is configured with the Router Index.

The Label that follows the Router Index Label includes a 20-bit Label field, a 3-bit EXP field, a 1-bit S field (or S bit), and an 8-bit TTL field. The Label field is the node label or an adjacency label of the router that is configured with the Router Index. The EXP and TTL fields are set to 0. The S-bit is dependent on whether another ILU or other MPLS labels follow this ILU.

It is noted that, as discussed further herein, a router that processes the EMLS-TE-3 on a packet scans for the ILUs that match its configured router index. For each matching ILU that is found, then the router looks up the second label in the ILU in the ILM Table of the router to make forwarding decisions. The router may remove the matching ILU(s) from the EMLS-TE-3 in the forwarded packets. In certain implementations, removal of an ILU(s) may be costly and so the router may leave the ILU(s) in the EMLS-TE-3; however, such implementations will set the TTL field in the Router Index Label of the ILU to 0, to mark that the ILU has been processed by its targeted router. Thus, a router that processes an ILU should also check if the TTL field in Router Index Label is 0 and, if TTL is 0, then it means it had processed the ILU earlier and is now seeing it again (i.e., there must be a loop in the network) and should drop the packet. It will be appreciated that the formatting of an EMLS-TE-3 packet using an EMLS-TE-3 may be further understood by way of an example as depicted in FIG. 14.

Figure 14:
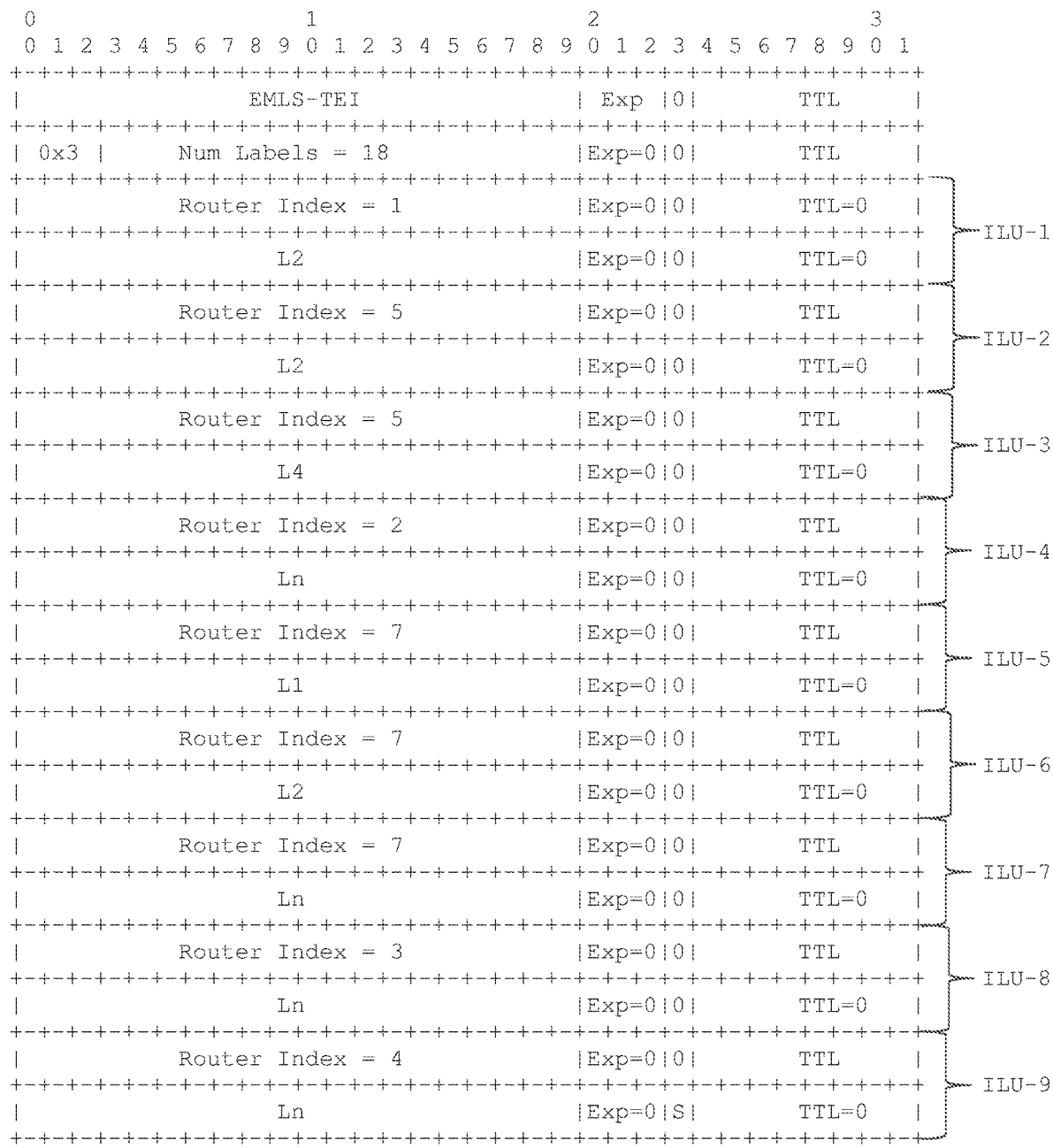
FIG. 14 depicts an example of an EMLS-TE-3 packet for the explicit path tree of the MPLS TE multicast domain of FIG. 1.

FIG. 14 depicts an example of an EMLS-TE-3 packet for the explicit path tree of the MPLS TE multicast domain of FIG. 1. FIG. 14 depicts the EMLS-TE-3={{1, L2}, {5, L2}, {5, L4}, {2, Ln}, {7, L1}, {7, L2}, {7, Ln}, {3, Ln}, {4, Ln}} pushed by the ingress router 111-1 into a packet of the exemplary multicast flow of FIG. 1. The Type field in EMLS-TE Descriptor is set to 0x3 to indicate the type as EMLS-TE-3. There are 18 labels in the Label Stack part, so the Number of Labels field in the EMLS-TE Descriptor is set to 18. The S bit in all labels except the second label Ln in ILU-9 is set to 0, since those are not the last label in the stack. The S bit for the second label Ln in ILU-9 is dependent on whether a non-EMLS-TE label follows it. The EXP field in all labels except the EMLS-TEI is set to 0. The TTL field is set to 0 in all labels except the EMLS-TEI and the first label in ILUs. As evident from FIG. 14, there are multiple ILUs with the same router index (e.g., ILU-5, ILU-6, and ILU-7 each encode the same router index 7, so the label stack adds unnecessary overheads. It will be appreciated that, as a result, the label stack herein consists of 18 labels, whereas the same explicit path tree is encoded with 15 labels in the EMLS-TE-2 in FIG. 11.

It will be appreciated that the TEDB maintained by the network controller for the stateless MPLS TE multicast domain may be built in various ways. The network controller maintains the TEDB for the stateless MPLS TE multicast domain for TE resource management and for computation of explicit path trees based on QoS constraints. At a high-level, a TEDB includes the following components: (A) status and static TE metrics (e.g., bandwidth, delay, color, affinity, or the like) of each adjacency in the domain, and (B) TE resources reserved on the adjacencies by currently active explicit path trees. It will be appreciated that part B cannot exist without part A, as part A is the fundamental basis of the TEDB. The network controller may build part A using either or both of the following methods: (1) periodic polling on adjacency status and its static TE metrics or (2) participating in routing protocols (such as OSPF, OSPFv3, IS-IS, BGP-LS, or the like) that flood the status and static TE metrics for each adjacency in the network.

It will be appreciated that configuration of router indices for routers in a stateless MPLS TE multicast domain may be performed in various ways.

In at least some embodiments, each router in the stateless MPLS TE multicast domain is assigned a network-wide unique index. In at least some example embodiments, a router index can be also considered as an identifier that uniquely identifies the local label space (e.g., per-platform label space) in the router. The index is allocated to the routers from a router index space assigned to the domain. The router index space may be configured in a centralized entity, such as a network controller, that oversees the management of the stateless MPLS TE multicast domain. Various example embodiments for supporting router indices for the routers of the stateless MPLS TE multicast domain are presented with respect to FIGS. 15-17.

Figure 15:
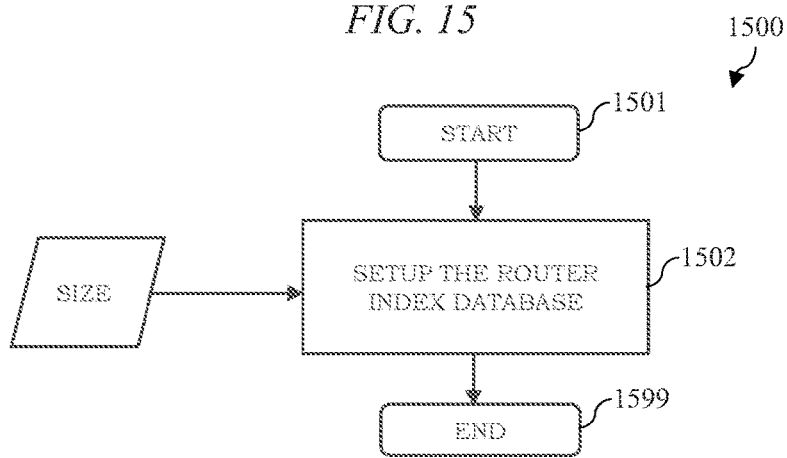
FIG. 15 depicts an example embodiment of a method for use by a network controller for configuration of a router index space in the network controller.

FIG. 15 depicts an example embodiment of a method for use by a network controller for configuration of a router index space in the network controller. It will be appreciated that, although primarily presented as being performed serially, at least a portion of the functions of method 1500 may be performed contemporaneously or in a different order than as presented with respect to FIG. 15. The input to the method 1500 is a size variable which is the maximum number of indices in the router index space. The size is chosen to a value that would allow a maximum number of routers in the stateless MPLS TE multicast domain. The method begins at block 1501 and proceeds to block 1502. Block 1502 sets up the Router Index Database at the network controller for management of router indices in the range {1, size}. After block 1502, the method 1500 proceeds to block 1599 where the method 1500 ends.

The network controller is configured to support configuration of router indices in the stateless MPLS TE multicast domain. The network controller assigns an index to each router in the stateless MPLS TE multicast domain, from its router index space. An example embodiment is presented with respect to FIG. 16.

Figure 16:
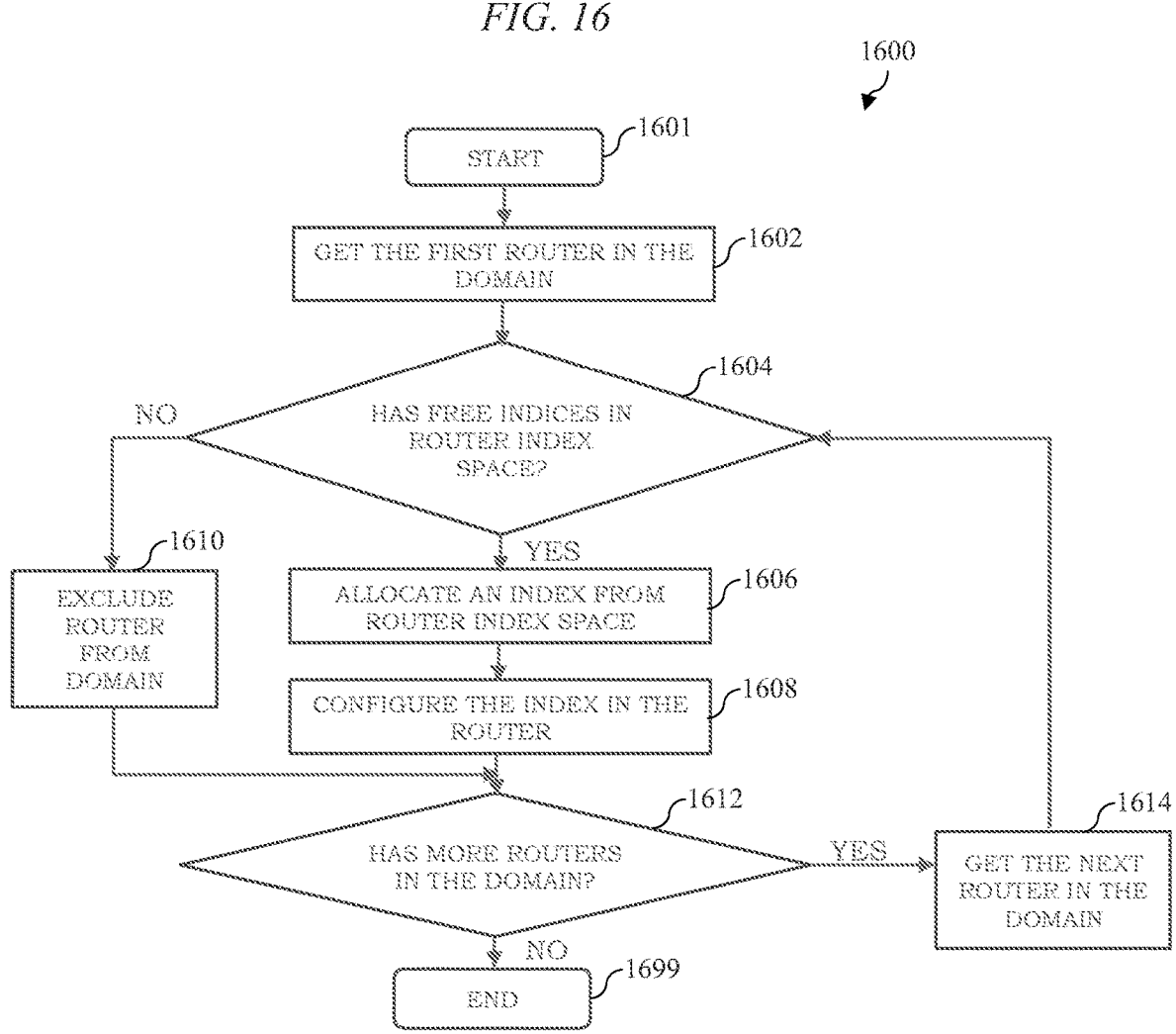
FIG. 16 depicts an example embodiment of a method for use by a network controller for assigning indices to each router in the stateless MPLS TE multicast domain.

FIG. 16 depicts an example embodiment of a method for use by a network controller for assigning indices to each router in the stateless MPLS TE multicast domain. It will be appreciated that, although primarily presented as being performed serially, at least a portion of the functions of method 1600 may be performed contemporaneously or in a different order than as presented with respect to FIG. 16. The method begins at block 1601 and proceeds to block 1602. Block 1602 retrieves the first router in the stateless MPLS TE multicast domain, and then proceeds to block 1604. Block 1604 checks if there is at least one free router index (i.e., not allocated to any router) available in the router index space. If no router indices are available, then block 1604 proceeds to block 1610, otherwise block 1604 proceeds to block 1606. Block 1610 excludes the router from the domain. The exclusion means that the router will not be included while computing an explicit path tree and, thus, will not receive any EMLS-TE-2 or EMLS-TE-3 packets. Block 1610 proceeds to block 1612. Block 1606 allocates an index from the router index space, and then proceeds to block 1608. Block 1608 sends a configuration request to the router with the router index and then proceeds to block 1612. Block 1612 checks if there are more routers in the domain. If there are no routers left in the domain, then block 1612 proceeds to block 1699 where the method 1600 ends, otherwise the block 1612 proceeds to block 1614. Block 1614 retrieves the next router in the domain, and then returns to block 1604, to repeat the subsequent blocks for the next router. It will be appreciated that, after method 1600 terminates, the routers "included" in the domain are configured with respective router indices.

Figure 17:
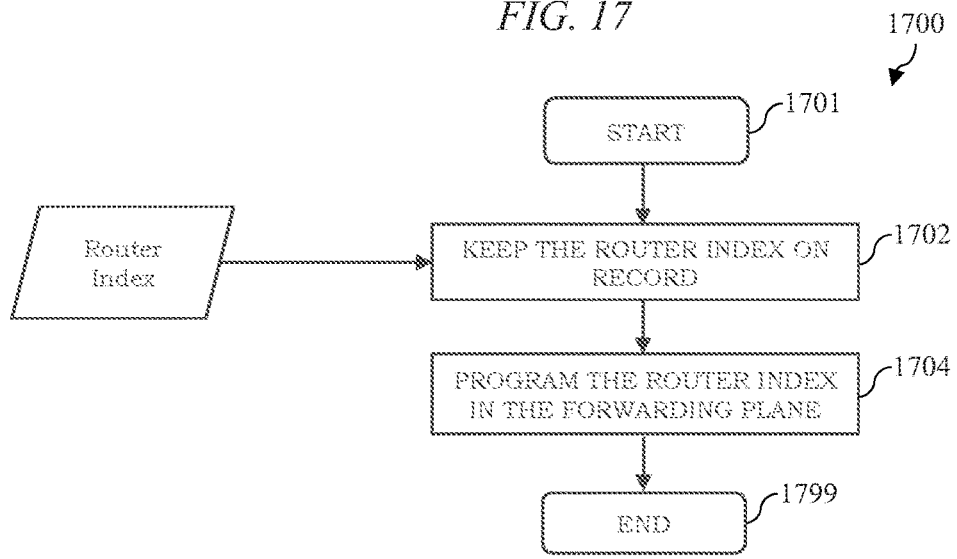
FIG. 17 depicts an example embodiment of a method for use by a router for configuration of a router index in the router.

FIG. 17 depicts an example embodiment of a method for use by a router for configuration of a router index in the router. It will be appreciated that the method 1700 of FIG. 17 may be used to handle a router index configuration request from the network controller in block 1608 in FIG. 16. It will be appreciated that, although primarily presented as being performed serially, at least a portion of the functions of method 1700 may be performed contemporaneously or in a different order than as presented with respect to FIG. 17. The input to the method 1700 is the router index assigned to the router. The method 1700 begins at block 1701 and then proceeds to block 1702. Block 1702 registers the router index in the router, and then proceeds to block 1704. Block 1704 programs the router index into the forwarding plane of the router, so that the configured index can be looked up while processing EMLS-TE-2 and EMLS-TE-3 packets. After block 1704, the method 1700 proceeds to block 1799 where the method 1700 ends.

It will be appreciated that configuration of router indices for routers in a stateless MPLS TE multicast domain may be performed in various other ways.

It will be appreciated that configuration of node and adjacency labels in a stateless MPLS TE multicast domain may be performed in various ways.

In at least some example embodiments, node and adjacency labels may be configured manually in each router in the stateless MPLS TE multicast domain. In at least some example embodiments, for each router in the stateless MPLS TE multicast domain, the network controller triggers the configuration of the node and adjacency labels. It will be appreciated that node and adjacency labels already may be configured in the domain if the domain uses Segment Routing (SR) for stateless MPLS unicast; in that case, no extra configuration is needed. However, a description of generic methods for configuration of node and adjacency labels in the domain follows.

Figure 18:
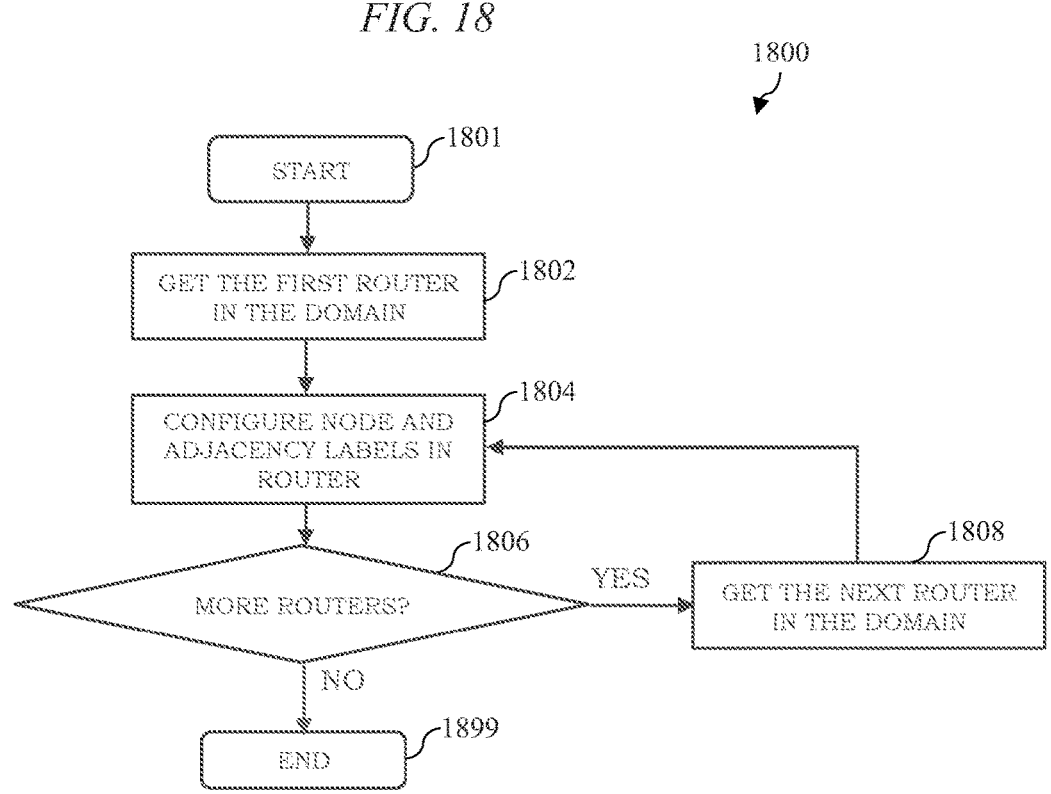
FIG. 18 depicts an example embodiment of a method for use by a network controller for configuration of node and adjacency labels in a stateless MPLS TE multicast domain.

FIG. 18 depicts an example embodiment of a method for use by a network controller for configuration of node and adjacency labels in a stateless MPLS TE multicast domain.

It will be appreciated that, although primarily presented as being performed serially, at least a portion of the functions of method 1800 may be performed contemporaneously or in a different order than as presented with respect to FIG. 18. The method starts at block 1802. Block 1802 retrieves the first router in the stateless MPLS TE multicast domain. Block 1802 proceeds to block 1804. Block 1804 sends requests to the router for allocation of node and adjacency labels from the local label space of the router and then performs configuration of the labels into the forwarding plane of the router. Block 1804 proceeds to block 1806. Block 1806 checks if there are more routers in the domain. If there are no more routers in the domain, then block 1806 proceeds to block 1899 where the method 1800 ends. If there are more routers in the domain, then block 1806 proceeds to block 1808. Block 1808 retrieves the next router in the domain. Block 1808 returns to block 1804 and subsequent blocks are repeated for the next router.

Figure 19:
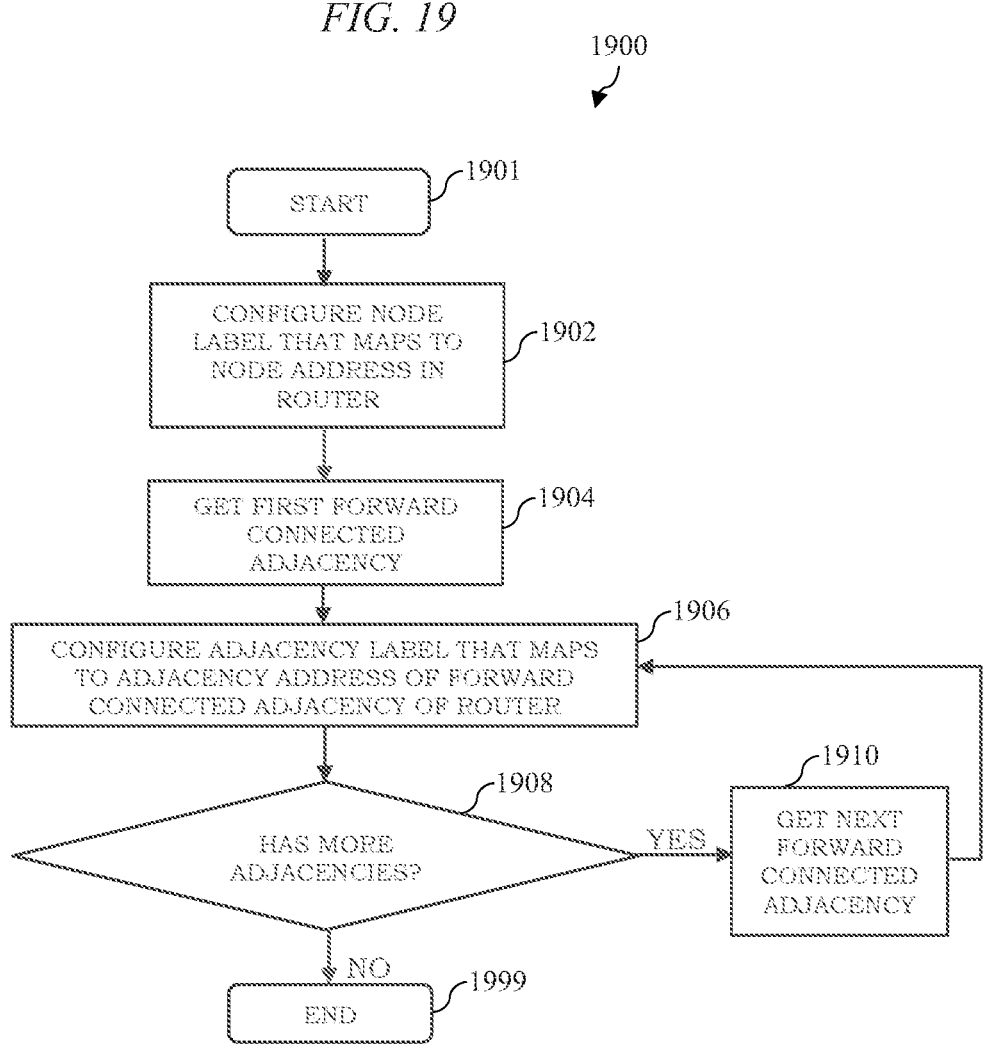
FIG. 19 depicts an example embodiment of a method for use by a router for configuration of node and adjacency labels in the router.

FIG. 19 depicts an example embodiment of a method for use by a network controller for configuration of node and adjacency labels in the router. It will be appreciated that the method 1900 of FIG. 19 may be used as block 1804 of FIG. 18. It will be appreciated that, although primarily presented as being performed serially, at least a portion of the functions of method 1900 may be performed contemporaneously or in a different order than as presented with respect to FIG. 19. The method begins at block 1901 and proceeds to block 1902. Block 1902 configures node label into the router (e.g., sends the configuration command/message to the router to perform the local action needed in the router). The node label maps to a node address of the router (e.g., a loopback IP address in router). The block 1902 then proceeds to block 1904. Block 1904 retrieves the first forward connected adjacency in the router. Here, the adjacency means the adjacency to a neighbor within the stateless MPLS TE multicast domain. It is noted that there must be at least one adjacency in the router in order to remain connected in the stateless MPLS TE multicast domain. It is further noted that the network controller already has the database of node and adjacency addresses of every router in the domain in its TEDB. Block 1904 proceeds to block 1906. Block 1906 configures the adjacency label into the router for the adjacency (e.g., sends the configuration command/message to the router to perform the local action needed in the router). Block 1906 proceeds to block 1908. Block 1908 checks if there are more adjacencies in the router. If there are no more adjacencies in the router, then block 1908 proceeds to block 1999 where the method 1900 ends, otherwise block 1908 proceeds to block 1910. Block 1910 retrieves the next forward connected adjacency in the router and then returns to block 1906 to repeat the subsequent blocks for the next adjacency.

Figure 20:
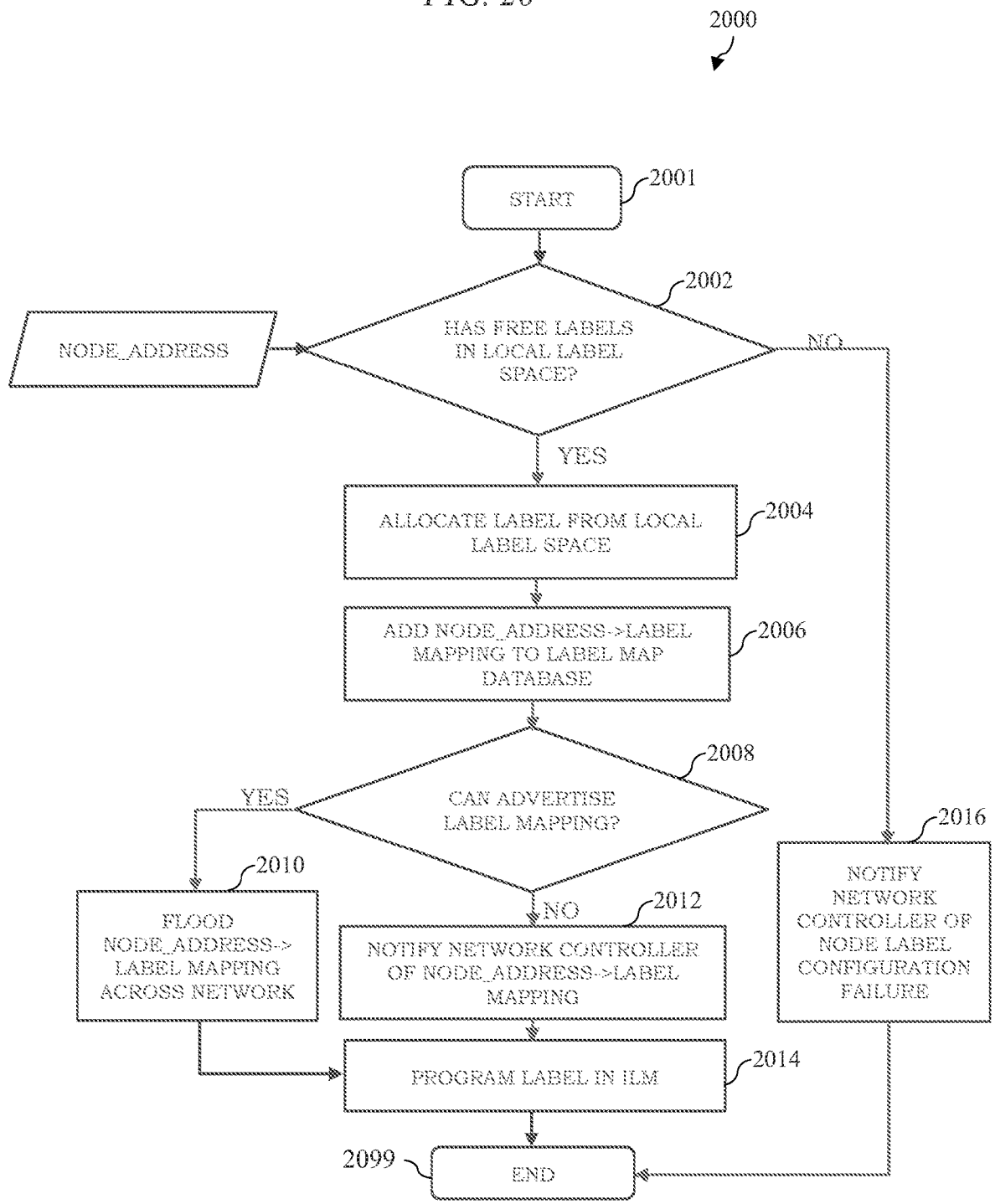
FIG. 20 depicts an example embodiment of a method for use by a router for configuration of a node label in the router.

FIG. 20 depicts an example embodiment of a method for use by a router for configuration of a node label. It will be appreciated that the method 2000 of FIG. 20 may be used to perform the local actions in a router for the block 1906 in FIG. 19. It will be appreciated that, although primarily presented as being performed serially, at least a portion of the functions of method 2000 may be performed contemporaneously or in a different order than as presented with respect to FIG. 20. The input to the method 2000 is the node address, which is a network-wide unique address of the node on which the node label is to be configured. For example, the node address could be a loopback IP address in the router. The method begins at block 2001 and proceeds to block 2002. Block 2002 checks if there are free labels in the local label space of the router. If there are no free labels in the local label space of the router, then block 2002 proceeds to block 2016, otherwise block 2002 proceeds to block 2004. Block 2016 notifies the network controller of the failure to configure the node label. After block 2016, the method 2000 proceeds to block 2099 where the method 2000 ends. Block 2004 allocates a label from the local label space of the router, and then proceeds to block 2006. Block 2006 creates a mapping for the node address to the allocated label and adds the node label mapping to the Label Map Database of the router. The Label Map Database contains the label mappings assigned by the router. Block 2006 proceeds to block 2008. Block 2008 checks if the router is configured to advertise the node label mapping. For example, if Segment Routing (SR) is enabled in the domain then the router can distribute the node label mapping using the SR control plane (e.g., routing protocols such as OSPF, OSPFv3, IS-IS, BGP-LS, or the like) that supports distribution of node and adjacency label mappings across the domain. If the router is configured to advertise node label mapping, then block 2008 proceeds to block 2010, otherwise block 2008 proceeds to block 2012. Block 2010 advertises the node label mapping to all neighboring routers in the domain, which eventually gets flooded throughout the domain. If SR is enabled in the domain, then block 2010 may use SR control plane techniques to flood the label mappings. However, an implementation may enhance the SR control plane to include the router index along with the node label mapping, i.e., the indexed-label mapping for the node. Block 2010 proceeds to block 2014. Block 2012 notifies the network controller of the node label mapping since there is no flooding of the label mapping across the domain, and so a potential ingress router must learn the label mapping from the controller. Block 2012 proceeds to block 2014. Block 2014 programs the node label into the ILM Table of the router. The NHLFE of the ILM entry is configured with the forwarding context as "self", i.e. this is the egress router for this node label. After block 2014, the method 2000 proceeds to block 2099 where the method 2000 ends.

Figure 21:
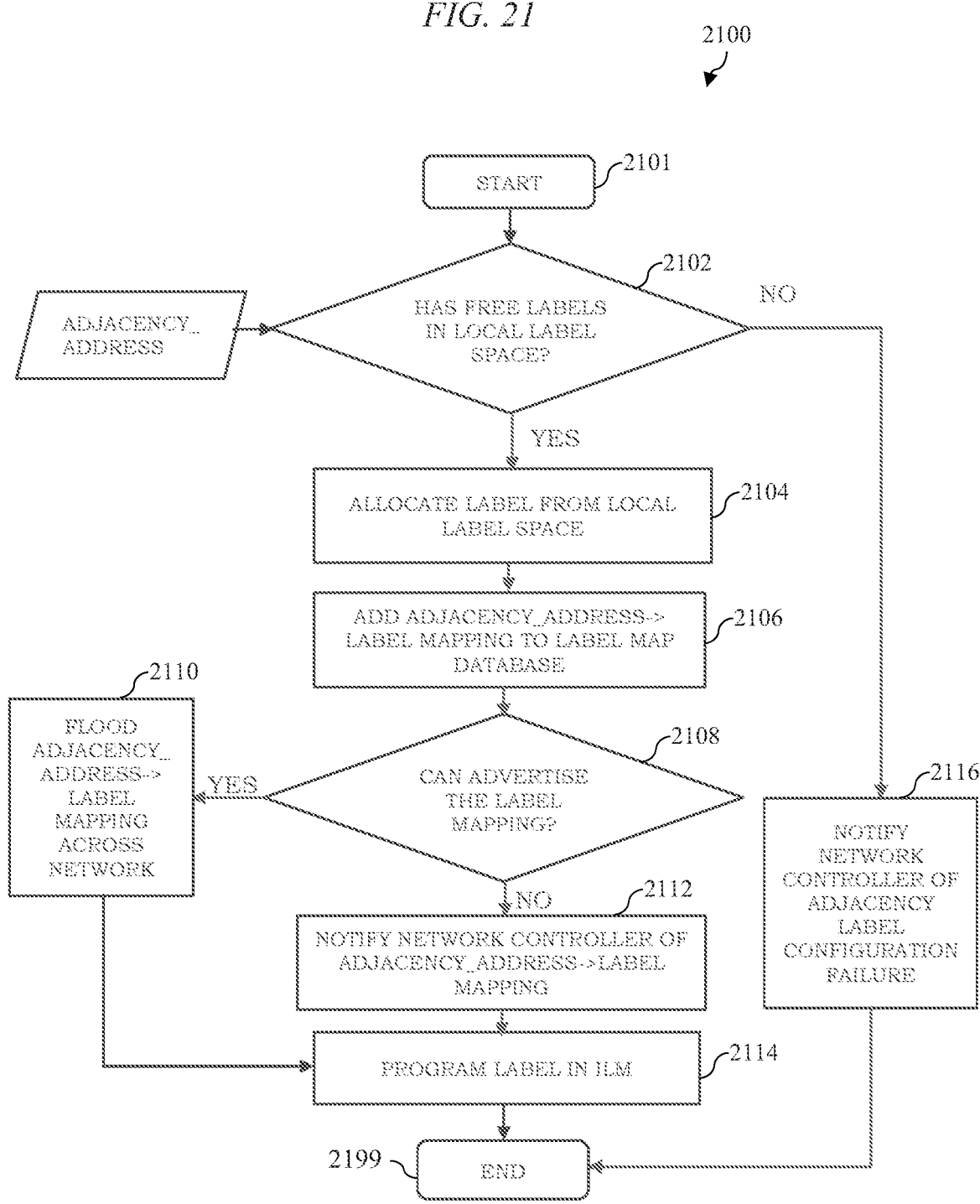
FIG. 21 depicts an example embodiment of a method for use by a router for configuration of an adjacency label to a forward connected adjacency in the router.

FIG. 21 depicts an example embodiment of a method for use by a router for configuration of an adjacency label to a forward connected adjacency in the router. It will be appreciated that the method 2100 of FIG. 21 may be used to perform the local actions in a router for the block 1906 in FIG. 19. It will be appreciated that, although primarily presented as being performed serially, at least a portion of the functions of method 2100 may be performed contemporaneously or in a different order than as presented with respect to FIG. 21. The input to method 2100 is an adjacency address, which is a network-wide unique identifier of the adjacency to which a label is to be configured from the local label space of the router. For example, an adjacency address could be the tuple of IP addresses {IP1, IP2}, where IP1 is the IP address on the link on this router and IP2 is the IP address on the link in the neighbor router that terminates the adjacency. The method begins at block 2101 and proceeds to block 2102. Block 2102 checks if there are free labels in the local label space of the router. If there are no free labels in the local label space of the router, then block 2101 proceeds to block 2116, otherwise block 2102 proceeds to block 2104. Block 2116 notifies the network controller of a failure to configure adjacency label. After block 2116, the method 2100 proceeds to block 2199 where the method 2100 ends. Block 2104 allocates a label from the local label space of the router, and then proceeds to block 2106. Block 2106 creates a mapping for the adjacency address to the allocated label and adds the mapping to the Label Map Database of the router. The Label Map Database contains the label mappings assigned by the router. Block 2106 proceeds to block 2108. Block 2108 checks if the router is configured to advertise the adjacency label mapping. For example, if Segment Routing (SR) is enabled in the domain then the router can distribute the adjacency label mapping using the SR control plane (e.g., routing protocols like OSPF, OSPFv3, IS-IS, BGP-LS, or the like) that supports distribution of node and adjacency labels. If the router is configured to advertise adjacency label mappings, then block 2108 proceeds to block 2110, otherwise block 2108 proceeds to block 2112. Block 2110 advertises the adjacency label mapping to all neighboring routers in the domain, which eventually gets flooded throughout the domain. If SR is enabled in the domain then block 2110 may use SR control plane techniques to flood the label mappings. However, an implementation may enhance the SR control plane to include the router index along with the adjacency label mapping, i.e., the indexed-label mapping for the adjacency. Block 2110 proceeds to block 2114. Block 2112 notifies the network controller of adjacency label mapping since there is no flooding of the label mapping across the domain and so the only way for an ingress router to learn the label mapping is from the network controller. Block 2112 proceeds to block 2114. Block 2114 programs the adjacency label into the ILM Table of the router. The NHLFE of the ILM entry is configured with the forwarding context as the adjacency. After block 2114, the method 2100 proceeds to block 2199 where the method 2100 ends.

Figure 22:
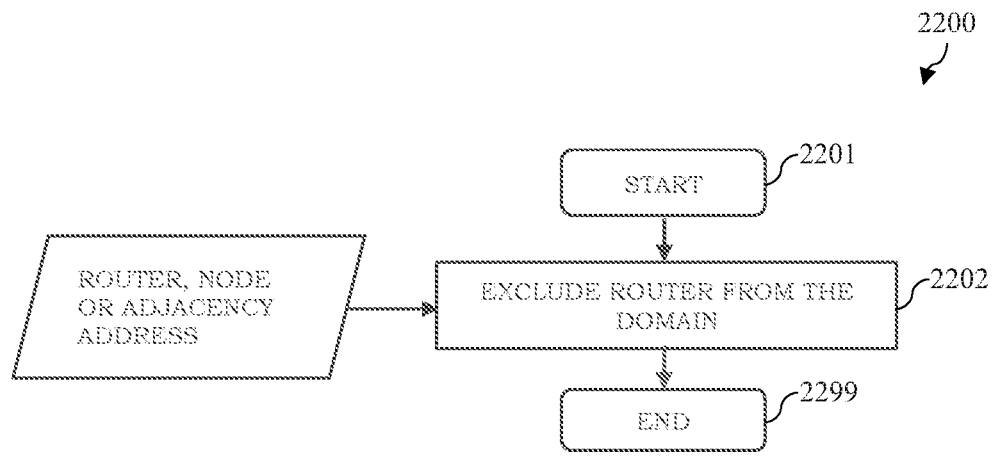
FIG. 22 depicts an example embodiment of a method for use by a network controller for handling node or adjacency label configuration failure at a router.

FIG. 22 depicts an example embodiment of a method for use by a network controller for handling node or adjacency label configuration failure at a router. It will be appreciated that the method 2200 of FIG. 22 may be used to handle the notifications from a router at block 2016 in FIG. 20 and at block 2116 in FIG. 21. It will be appreciated that, although primarily presented as being performed serially, at least a portion of the functions of method 2200 may be performed contemporaneously or in a different order than as presented with respect to FIG. 22. The inputs to the method 2200 include the network-wide unique router identifier (e.g., a Loopback IP address in the router or other suitable identifier) and the node or adjacency address for which failure is being notified. The method 2200 begins at block 2201 and then proceeds to block 2202. Block 2202 excludes the router from the stateless MPLS TE multicast domain. This means that computation of any explicit path tree in the domain would exclude this router. After block 2202, the method 2200 proceeds to block 2299 where the method 2200 ends.

Figure 23:
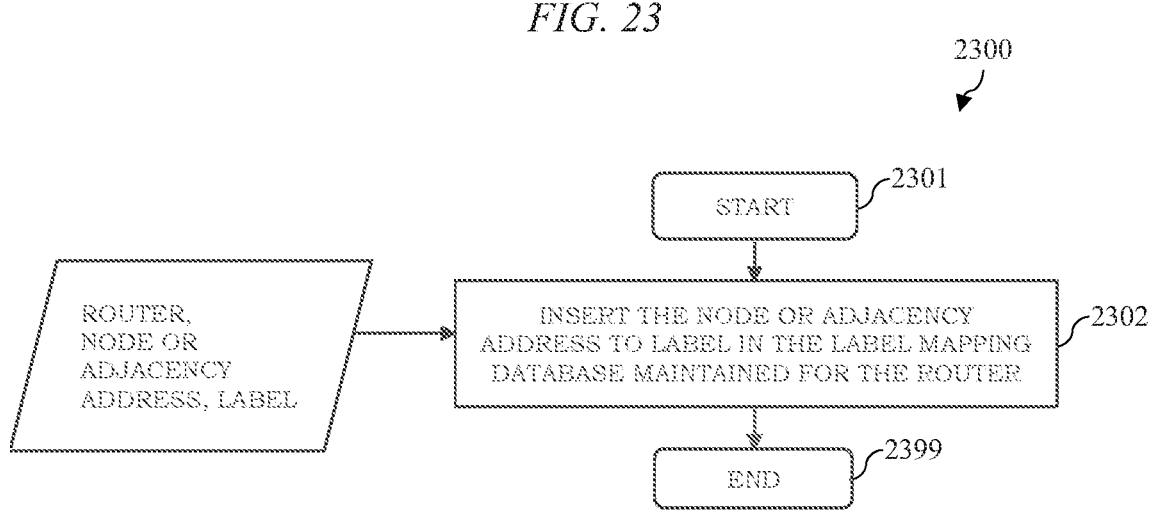
FIG. 23 depicts an example embodiment of a method for use by a network controller for handling a node or adjacency label mapping from a router.

FIG. 23 depicts an example embodiment of a method for use by a network controller for handling a node or adjacency label mapping from a router. It will be appreciated that the method 2300 of FIG. 23 may be used to handle the notifications from a router at block 2012 in FIG. 20 and at block 2112 in FIG. 21. It will be appreciated that, although primarily presented as being performed serially, at least a portion of the functions of method 2300 may be performed contemporaneously or in a different order than as presented with respect to FIG. 23. The inputs to the method 2300 include the network-wide unique router identifier (e.g., a loopback IP address in the router or other suitable identifier), the node or adjacency address for which failure is being notified, and a label mapped to the node or adjacency address. The method begins at block 2301 and proceeds to block 2302. Block 2302 adds the mapping of node or adjacency address to label to the label mapping database maintained for the router. After block 2302, the method 2300 proceeds to block 2399 where the method 2300 ends.

In at least some example embodiments, a control plane may be used for advertising node and adjacency label mappings, such that ingress routers can map node and adjacency labels to node and adjacency labels, respectively. The control plane may be a Segment Routing (SR) control plane for advertising node and adjacency label mappings across the domain. In SR parlance, an adjacency label is termed as an Adjacency-SID and a node label is termed as a Node-SID. The SR control plane may be considered to include various routing protocols (e.g., OSPF, OSPFv3, IS-IS, BGP-LS, or the like) which are well equipped to advertise Adjacency-SID and Node-SIDs. It will be appreciated that various other control plane functions or control plane extensions may be used to support advertisements of node and adjacency label mappings.

It will be appreciated that configuration of node and adjacency labels in a stateless MPLS TE multicast domain may be performed in various other ways.

It will be appreciated that the configuration of the explicit path tree for the multicast flow may be performed in various ways.

In at least some example embodiments, when a multicast flow with a required QoS is setup by an ingress router, it triggers configuration of the explicit path tree that would meet the QoS of the flow. The ingress router sends a tree computation request to the network controller with the set of egress routers of the multicast flow and the required QoS. In the request, the ingress router also includes an indication of whether it intends to receive the explicit path tree in the form of (a) tuples of {router index, node address} and {router index, adjacency address} that constitute the tree or (b) tuples of {router index, node label} and {router index, adjacency label}, i.e., the indexed-labels that constitute the tree, wherein the 'router index' in a tuple indicates the parent router of a node or adjacency. It will be appreciated that (a) is the case when the domain is enabled for flooding of node and adjacency label mappings via routing protocols (e.g., using an SR control plane, such as OSPF, OSPFv3, IS-IS, BGP-LS, or the like) and, thus, in which the ingress router already has the label mappings of nodes and adjacencies across the network such that the ingress router can map the labels of nodes and adjacencies in the tree from their respective addresses. It will be appreciated that (b) is the case when the network is not enabled with routing protocols for flooding of node and adjacency label mappings and, thus, in which the ingress router needs to know the node labels and adjacency labels of the explicit path tree from the network controller. The network controller, based on the tree computation request from the ingress router, computes an explicit path tree by referring to the TEDB such that the explicit path tree meets the requested QoS. The network controller updates the dynamic TE metrics (e.g., available bandwidth or the like) of the adjacencies along the explicit path tree after accounting for the QoS resources reserved by the explicit path tree. Then, the network controller records the explicit path tree in its database and responds to the ingress router with the explicit path tree in the form of case (a) or case (b) as per the choice stated in the tree computation request from the ingress router. The ingress router receives the explicit path tree from the controller and maps the explicit path tree to the multicast flow. This completes the configuration of the explicit path tree for the multicast flow such that any packet on the multicast flow may be sent along the explicit path tree.

It will be appreciated that various methods configured to support the above procedure for configuration of the explicit path tree for the multicast flow are discussed further below.

Figure 24:
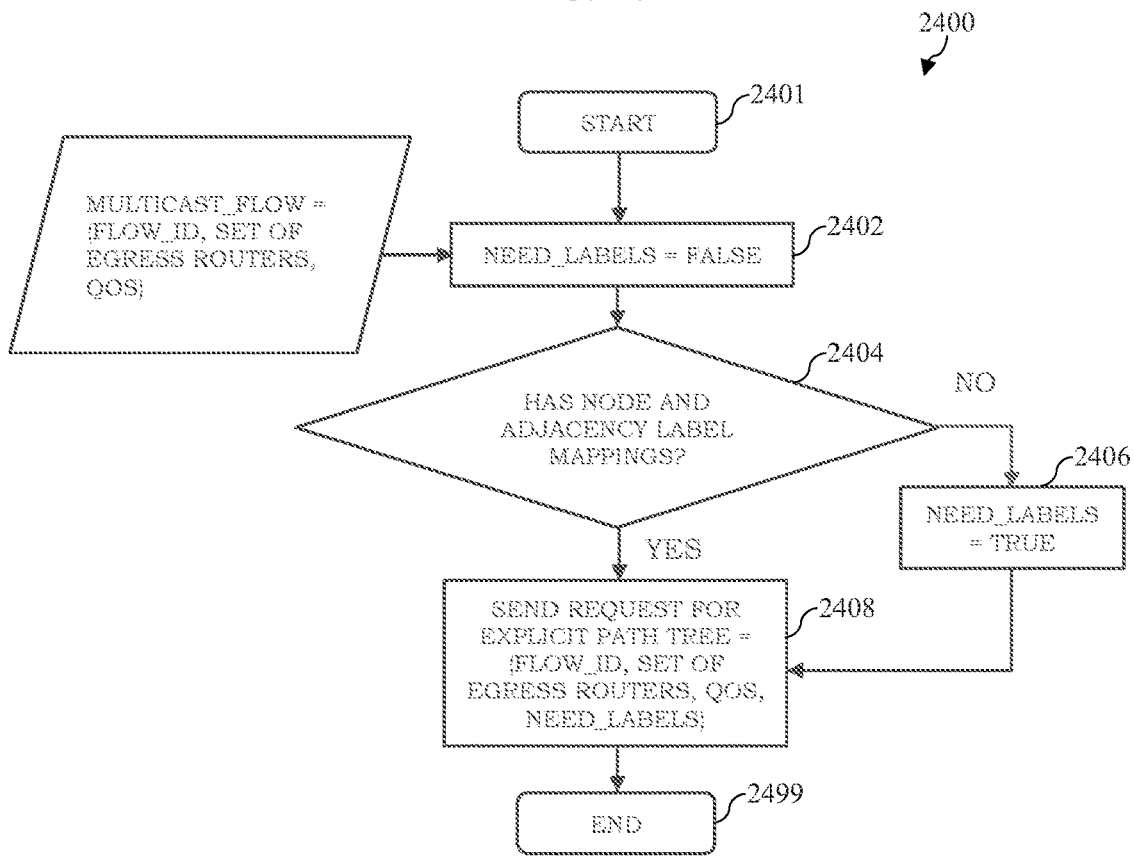
FIG. 24 depicts an example embodiment of a method for use by an ingress router for requesting configuration of an explicit path tree by a network controller.

FIG. 24 depicts an example embodiment of a method for use by an ingress router for requesting configuration of an explicit path tree by a network controller. It will be appreciated that, although primarily presented as being performed serially, at least a portion of the functions of method 2400 may be performed contemporaneously or in a different order than as presented with respect to FIG. 24. The inputs to the method 2400 include a locally assigned identifier for a multicast flow, the set of egress routers, and the required QoS of the multicast flow. The method 2400 begins at block 2401 and then proceeds to block 2402. Block 2402 initializes a variable 'Need Labels' to false. This variable is used to track whether ingress router is going to ask the SDN controller for the labels of the nodes and adjacencies in the explicit path tree. Block 2402 proceeds to block 2404. Block 2404 checks whether the router has the label mappings database for the entire domain, which is built from the advertisements by routing protocols (e.g., using an SR control plane). If the database does not exist, then block 2404 proceeds to block 2406, otherwise block 2404 proceeds to block 2408. Block 2406 sets the variable 'Need Labels' to true, because the ingress router does not have any node and adjacency label mappings for the entire domain. Block 2406 proceeds to block 2408. Block 2408 sends the request to the network controller for an explicit path tree for the multicast flow identifier and its set of egress routers and the required QoS. The 'Need Labels' variable is included along with the request. After block 2408, the method 2400 proceeds to block 2499 where the method 2400 ends.

Figure 25:
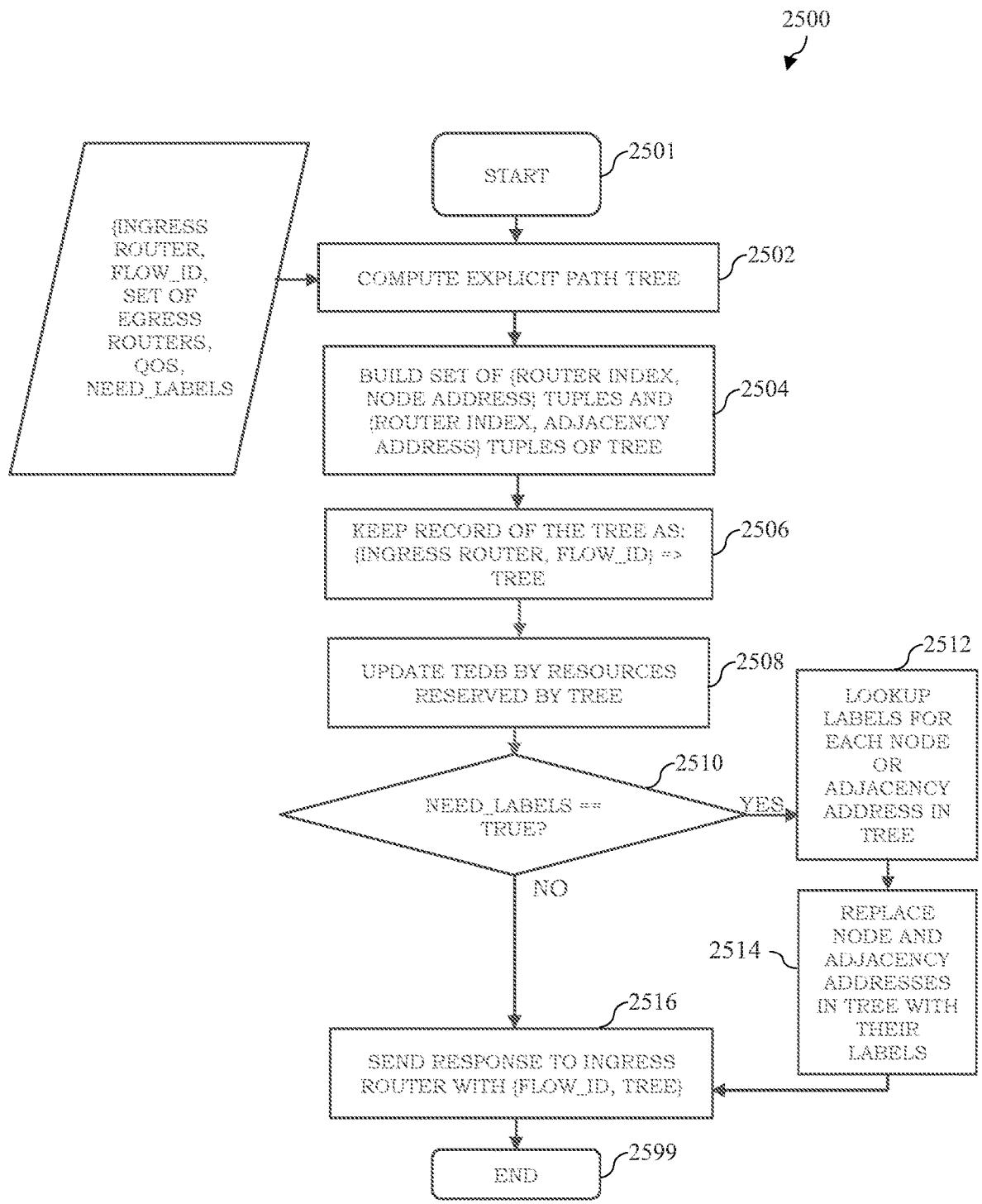
FIG. 25 depicts an example embodiment of a method for use by a network controller for processing an explicit path tree request from an ingress router.

FIG. 25 depicts an example embodiment of a method for use by a network controller for processing an explicit path tree request from an ingress router. It will be appreciated that, although primarily presented as being performed serially, at least a portion of the functions of method 2500 may be performed contemporaneously or in a different order than as presented with respect to FIG. 25. The inputs to the method 2500 are the ingress router that sent the request, the multicast flow identifier assigned by the ingress router, the set of egress routers of the multicast flow, the parameters describing the QoS required by the flow, and an indication as to whether label mappings are needed by the ingress router for the nodes and adjacencies of the computed explicit path tree. The method 2500 begins at block 2501 and proceeds to block 2502. Block 2502 computes the explicit path tree based on the TEDB and the requested QoS constraints. It will be appreciated that various algorithms may be used for computation of the explicit path tree based on QoS constraints; however, for purposes of completeness, a generic method for computation of the explicit path tree may be as follows: (1) build a subset of the adjacencies for the domain in the TEDB that meets the QoS constraints of the flow (e.g., if QoS constraints include the bandwidth B, color C, and delay D, then the subset has all of the adjacencies that have "available" bandwidth of at least B, configured with color C and delay D), (2) in the subset of the adjacencies for the domain, compute unicast shortest paths to each of the egress routers (e.g., using Dijkstra's shortest path first (SPF) algorithm or other suitable algorithms which may be used to compute the shortest paths, and (3) merge the shortest paths to each of the egress routers into a single set (i.e., sets of adjacencies from all paths are combined into a single set) and merge the adjacencies common among the shortest paths as single elements in the set to provide thereby the set of adjacencies in the explicit path tree to the egress routers. Then block 2502 proceeds to block 2504. Block 2504 builds the explicit path tree, to be sent to the ingress router, as the "ordered set" of node and adjacency addresses resulting from the computation at block 2502. Here, "ordered set" means that nodes and adjacencies are ordered in the set according to their occurrences along the explicit path tree. When a subset of adjacencies forms branches at a transit router, then those adjacencies can be put in any order within the subset. Further, block 2504 couples a node address or adjacency address in the ordered set with the router index assigned to its parent router. So, the explicit path tree is now an ordered set of {router index, node address} tuples and {router index, adjacency address} tuples. Then, block 2504 proceeds to block 2506. Block 2506 keeps a record of the mapping of {ingress router, multicast flow identifier} to the explicit path tree. Block 2506 proceeds to block 2508. Block 2508 reserves the QoS resources used by the explicit path tree in TEDB. For example, available bandwidth of the adjacencies included in the explicit path tree are updated in TEDB after deduction of the bandwidth reserved by the explicit path tree. Then block 2508 proceeds to block 2510. Block 2510 checks if the ingress router requested for label mappings of the node and adjacency addresses. If the ingress router requested for label mappings of the node and adjacency addresses, then block 2510 proceeds to block 2512, otherwise block 2510 proceeds to block 2516. Block 2512 looks up the label assignments to the node and adjacency addresses of the explicit path tree in the label mapping database maintained for the router (where this label mapping database may be built by the method 2300 of FIG. 23). Then, block 2512 proceeds to block 2514. Block 2514 updates the explicit path tree by replacing the node and adjacency addresses in the tuples with their respective labels. Block 2514 proceeds to block 2516. Block 2516 sends the response to the ingress router with the multicast flow identifier and the explicit path tree. After block 2516, the method 2500 proceeds to block 2599 where the method 2500 ends.

Figure 26:
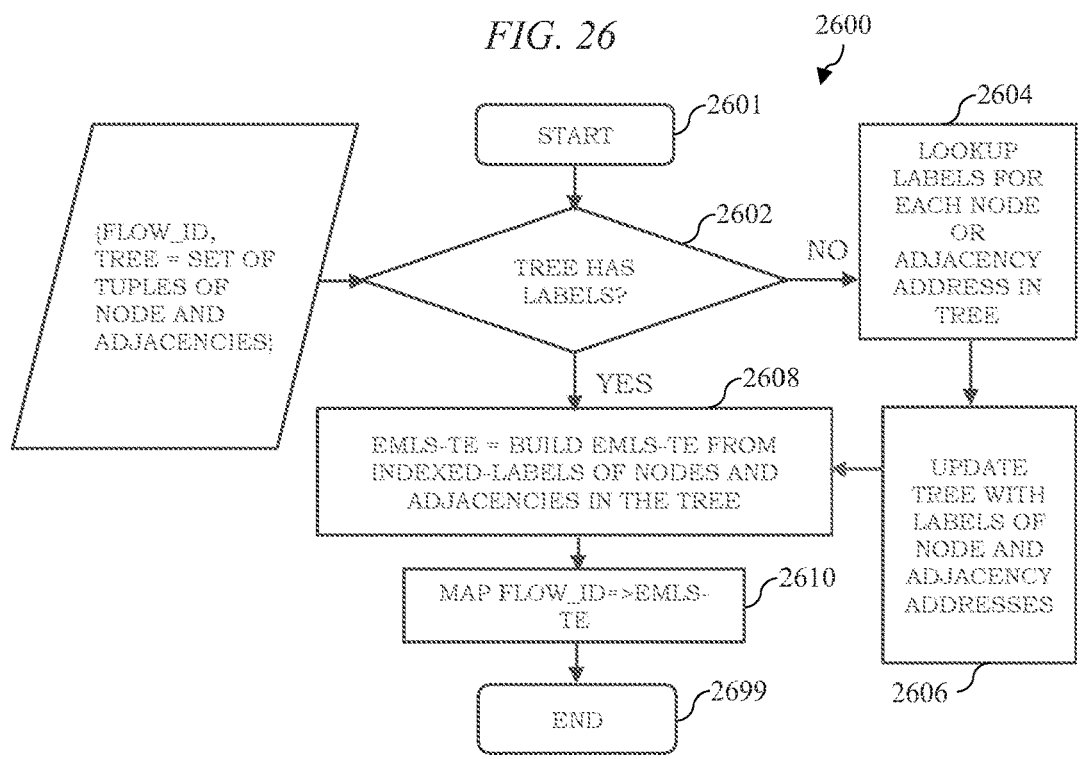
FIG. 26 depicts an example embodiment of a method for use by an ingress router for processing an explicit path tree response from a network controller.

FIG. 26 depicts an example embodiment of a method for use by an ingress router for processing an explicit path tree response from a network controller. It will be appreciated that, although primarily presented as being performed serially, at least a portion of the functions of method 2600 may be performed contemporaneously or in a different order than as presented with respect to FIG. 26. The inputs to the method 2600 are the local identifier of a multicast flow in the ingress router and the explicit path tree with its set of tuples of nodes and adjacencies. The method 2600 begins at block 2601 and proceeds to block 2602. Block 2602 checks if the explicit path tree already has label mappings to the nodes and adjacencies (meaning that the ingress router may have requested the mappings from the network controller). If label mappings not found, then block 2602 proceeds to block 2604, otherwise block 2602 proceeds to block 2608. Block 2604 looks up the label mappings, for each node and adjacency address in the explicit path tree, in the label mapping database of the domain, maintained by the router, which was built by the routing protocols (e.g., SR control plane). Block 2604 proceeds to block 2606. Block 2606 updates the explicit path tree by replacing the node and adjacency addresses with their mapped labels, and then proceeds to block 2608. Block 2608 builds the EMLS-TE-2 or EMLS-TE-3 based on the Option-A or Option-B followed by the domain, from the indexed-labels of nodes and adjacencies in the tree. Block 2608 proceeds to block 2610. Block 2610 maps the EMLS-TE to the multicast flow identifier. That means any packet to be multicast by the ingress router for the flow must use this EMLS-TE. This completes the configuration of the explicit path tree for the multicast flow. After block 2610, the method 2600 proceeds to block 2699 where the method 2600 ends.

It will be appreciated that the configuration of the explicit path tree for the multicast flow may be performed in various other ways.

It is noted that various methods discussed below describe various aspects of the format of EMLS-TE-2 used by Option-A to encode an explicit path tree onto a packet. It will be appreciated that Option-A also may implement methods discussed above which describe various aspects associated with configuration of the explicit path tree that is encoded within the packets.

Figure 27A:
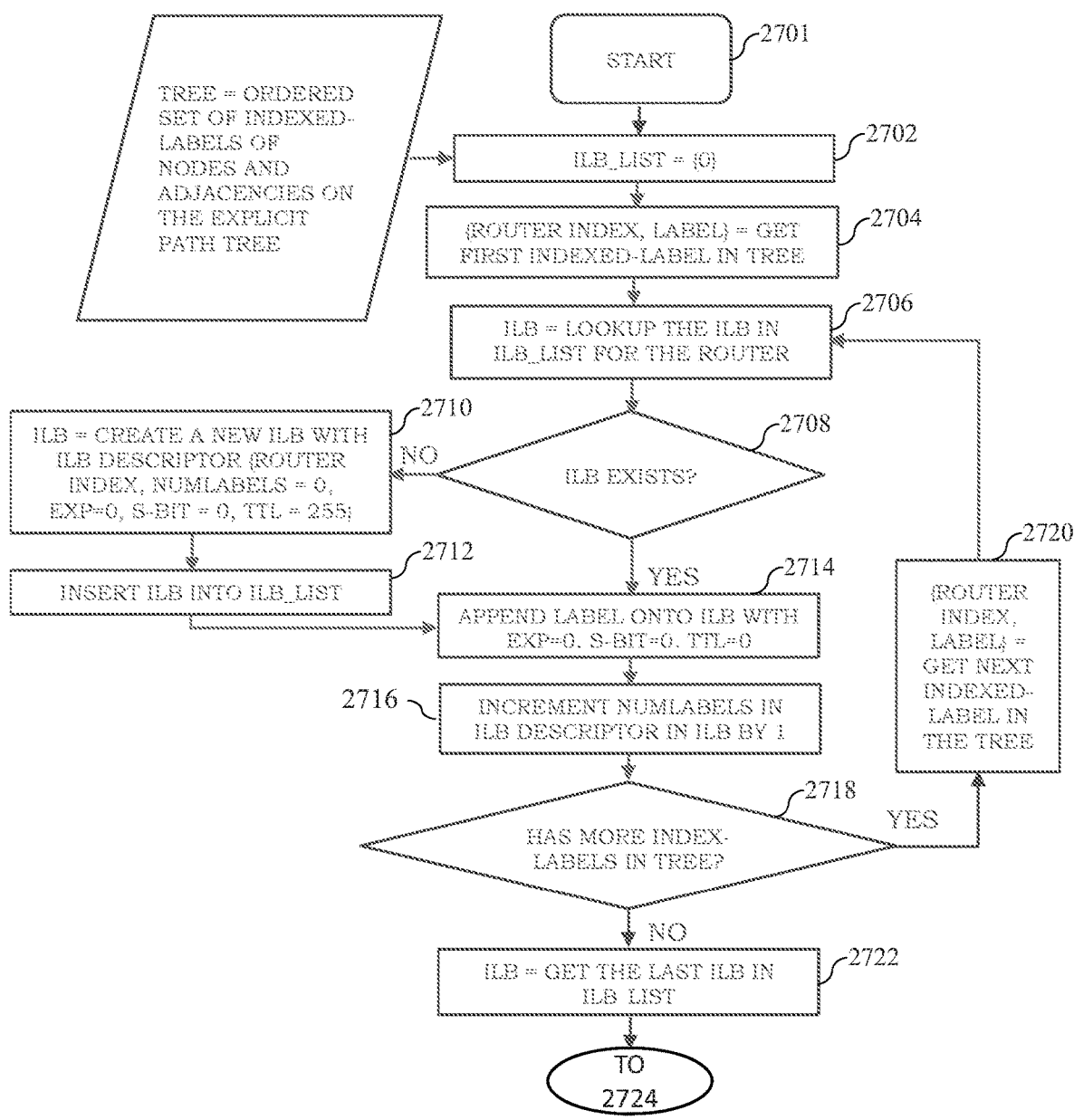
FIGS. 27A and 27B depict an example embodiment of a method for use by a router for building an EMLS-TE-2 from a set of indexed-labels of the nodes and adjacencies in an explicit path tree.
Figure 27B:
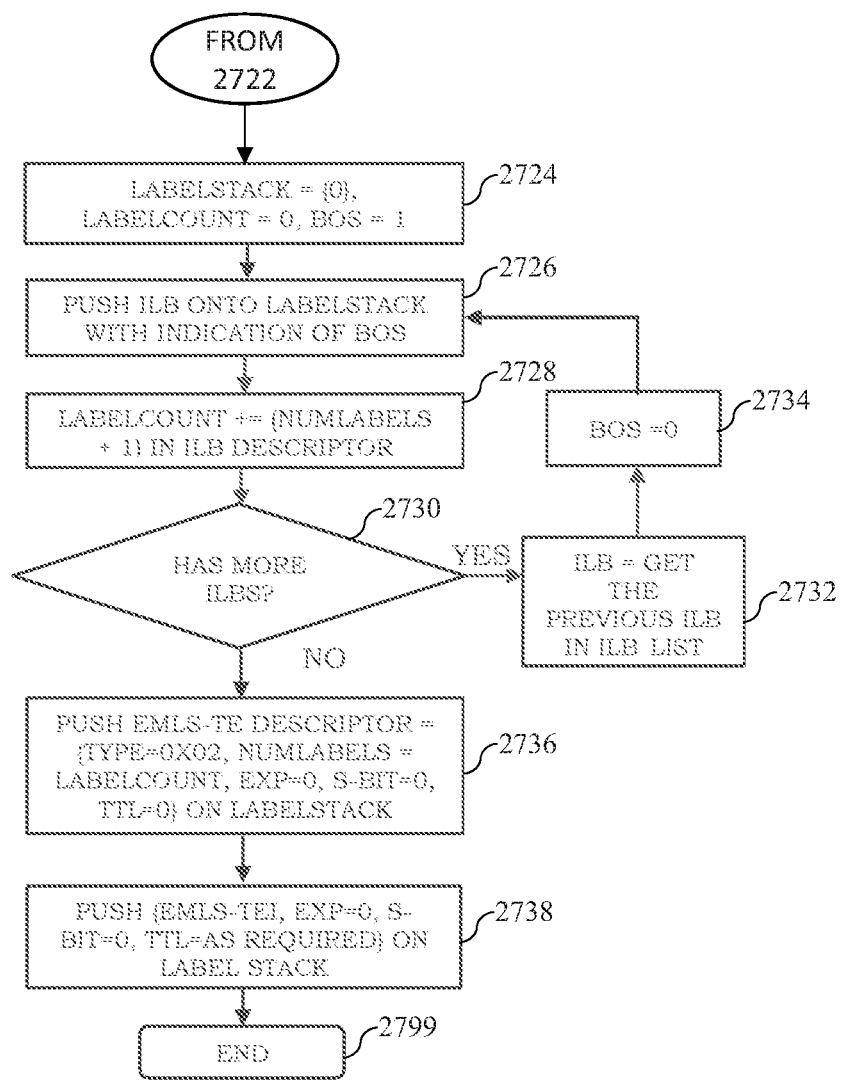

FIGS. 27A and 27B depict an example embodiment of a method for use by a router for building an EMLS-TE-2 from a set of indexed-labels of the nodes and adjacencies in an explicit path tree. It will be appreciated that, although primarily presented as being performed serially, at least a portion of the functions of method 2700 may be performed contemporaneously or in a different order than as presented with respect to FIGS. 27A and 27B. It will be appreciated that the method 2700 of FIGS. 27A and 27B may be used as block 2608 of FIG. 26 when Option-A is implemented by the stateless MPLS multicast TE domain. The inputs to the method 2700 are the ordered set of indexed-labels of nodes and adjacencies in an explicit path tree. The method 2700 begins at block 2701 and then proceeds to block 2702. Block 2702 initializes an empty list of ILBs, and then proceeds to block 2704. Block 2704 retrieves the first indexed-label from the tree. The block 2704 then proceeds to block 2706. Block 2706 looks for the ILB that matches the router index in the indexed-label, and then proceeds to block 2708. Block 2708 checks if an ILB is found from the lookup in block 2706. If an ILB is not found, then the block 2708 proceeds to block 2710, otherwise the block 2708 proceeds to block 2714. Block 2710 creates a new ILB and pushes the ILB Descriptor as {router index, NumLabels=0, EXP=0, S-bit=0, TTL=255}. The TTL in the ILB Descriptor can be set to any non-zero value to assert the validity of the ILB. Here for example, the TTL value is chosen as 255. Then, the block 2710 proceeds to block 2712. Block 2712 inserts the ILB into the list of ILBs, and then proceeds to block 2714. Block 2714 appends the label in the indexed-label onto the ILB as MPLS Label={Label=label, EXP=0, S-bit=0, TTL=0}, and then proceeds to block 2716. Block 2716 increments the NumLabel field in the ILB Descriptor of the ILB by 1, as block 2714 has inserted an MPLS label onto the ILB. Block 2716 proceeds to block 2718. Block 2718 checks if there are more index-labels in the explicit path tree to be processed. If there are more index-labels in the explicit path tree to be processed, then the block 2718 proceeds to block 2720, otherwise the block 2718 proceeds to block 2722. Block 2720 retrieves the next indexed-label in the explicit path tree, and then returns to block 2706 to repeat the subsequent blocks for the next indexed-label. Block 2722 is reached when the list of ILBs is built from the indexed-labels in the tree. It is noted that, since the indexed-labels are ordered in the tree by their occurrences in the tree, so blocks 2706-2720 automatically inserted the ILBs into the list of ILBs by their order of occurrences in the tree. So, block 2722 retrieves the last ILB in the list of ILBs, so that subsequent blocks push ILBs into the target EMLS-TE-2 in the reverse order (i.e., so that ILBs will be in order from the top of EMLS-TE-2). Block 2722 proceeds to block 2724. Block 2724 initializes an empty Label Stack wherein EMLS-TE-2 would be encoded, a variable LabelCount (which tracks the total number of labels pushed onto Label Stack) to 0, and a variable BOS (which tracks the Bottom-Of-the-Stack indication of a label to be pushed) to 1. Block 2724 proceeds to block 2726. Block 2726 pushes the ILB onto the Label Stack. Block 2726 uses the BOS value to determine S-bit of the last MPLS label in the ILB, and then proceeds to block 2728. Block 2728 increments the value of LabelCount by the value of NumLabels field of the ILB descriptor of the ILB plus one (to include the ILB Descriptor itself). The block 2728 then proceeds to block 2730. Block 2730 checks if there are more ILBs in the list of ILB entries to be processed. If there are more ILBs in the list of ILB entries to be processed, then block 2730 proceeds to block 2732, otherwise block 2730 proceeds to block 2736. Block 2732 retrieves the previous ILB of the recently processed ILB, in the list of ILBs ("previous" since the list is being traversed in reverse order), and then proceeds to block 2734. Block 2734 sets the BOS value to 0 since the subsequent ILBs are not the last ILB to be pushed onto the Label Stack. Block 2734 returns to block 2726, to repeat the subsequent blocks for this ILB. Block 2736, which is reached after all ILBs are pushed onto the Label Stack, pushes the EMLS-TE Descriptor as {Type=0x2, NumLabels=LabelCount, EXP=0, S-bit=0, TTL=0} onto the Label Stack. The block 2736 then proceeds to block 2738. Block 2738 pushes the EMLS-TEI as {Label=EMLS-TEI, EXP=0, S-bit=0, TTL as required} onto the Label Stack. An implementation may set the TTL value as the number of levels in the tree or to the maximum value 255. An implementation may use other methods to determine an appropriate TTL value. After block 2738, the method 2700 proceeds to block 2799 where the method 2700 ends.

Figure 28:
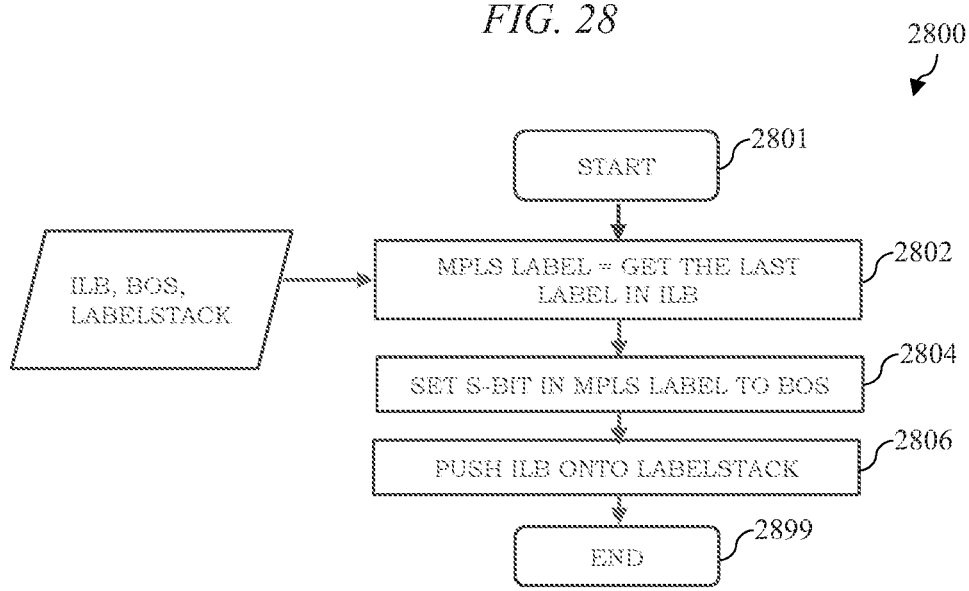
FIG. 28 depicts an example embodiment of a method for use by a router for pushing an ILB onto a label stack.

FIG. 28 depicts an example embodiment of a method for use by a router for pushing an ILB onto a label stack. It will be appreciated that the method 2800 of FIG. 28 may be used as block 2726 of method 2700 of FIGS. 27A and 27B. It will be appreciated that, although primarily presented as being performed serially, at least a portion of the functions of method 2800 may be performed contemporaneously or in a different order than as presented with respect to FIG. 28. The inputs to the method 2800 are the ILB, the BOS that indicates whether this is the first ILB being pushed, and the LabelStack onto which to push the ILB. The method 2800 begins at block 2801 and proceeds to block 2802. Block 2802 retrieves the last MPLS Label in the input ILB, and then proceeds to block 2804. Block 2804 sets the value of S-bit in the MPLS Label to value of BOS, and the proceeds to block 2806. Block 2806 pushes the ILB onto the input Label Stack. After block 2806, the method 2800 proceeds to block 2899 where the method 2800 ends.

Figure 29:
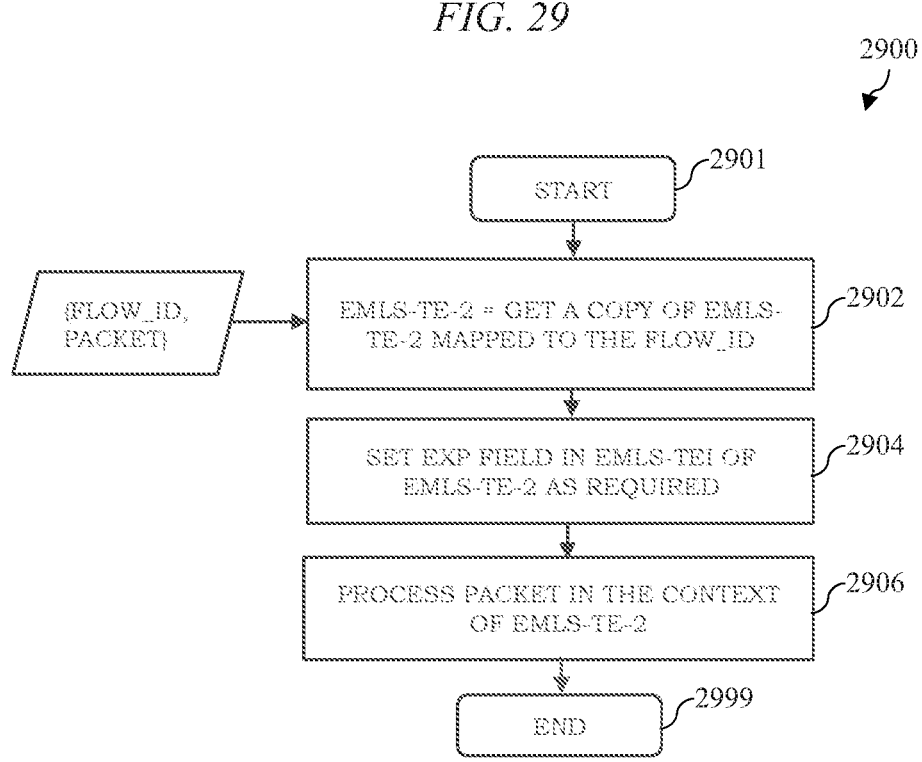
FIG. 29 depicts an example embodiment of a method for use by an ingress router to send a packet for a multicast flow as an EMLS-TE-2 packet across a stateless MPLS TE multicast domain.

FIG. 29 depicts an example embodiment of a method for use by an ingress router to send a packet for a multicast flow as an EMLS-TE-2 packet across a stateless MPLS TE multicast domain. It will be appreciated that, although primarily presented as being performed serially, at least a portion of the functions of method 2900 may be performed contemporaneously or in a different order than as presented with respect to FIG. 29. The inputs to the method 2900 are the locally assigned identifier of the multicast flow and a packet of the flow. The method 2900 begins at block 2901 and then proceeds to block 2902. Block 2902 looks up the EMLS-TE-2 mapped to the multicast flow by its identifier and makes a copy of the EMLS-TE-2. The block 2902 then proceeds to block 2904. Block 2904 sets the EXP field in EMLS-TEI as required. For example, an implementation may determine the EXP based on the QoS policy associated with the multicast flow. Block 2904 proceeds to block 2906. Block 2906 sends the packet to stateless MPLS TE multicast domain in the context of the EMLS-TE-2. The method 2900 then proceeds to block 2999 where the method 2900 ends.

Figure 30:
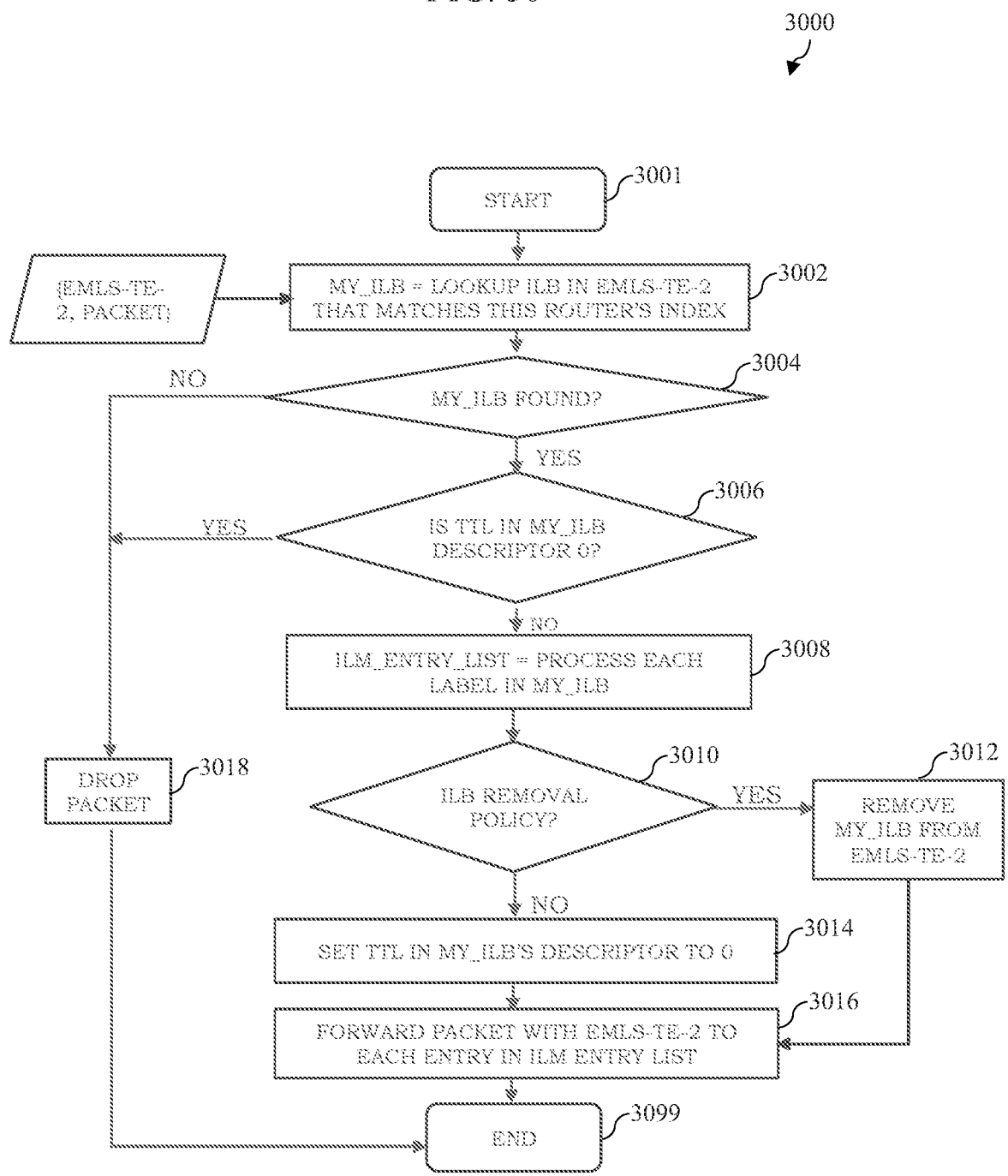
FIG. 30 depicts an example embodiment of a method for use by a router for processing a packet in the context of an EMLS-TE-2.

FIG. 30 depicts an example embodiment of a method for use by a router for processing a packet in the context of an EMLS-TE-2. It will be appreciated that the method 3000 of FIG. 30 may be executed by all types of routers within a stateless MPLS TE multicast domain (e.g., ingress, transit, leaf, and bud routers). It will be appreciated that the method 3000 of FIG. 30 may be used as block 2906 of FIG. 29. It will be appreciated that, although primarily presented as being performed serially, at least a portion of the functions of method 3000 may be performed contemporaneously or in a different order than as presented with respect to FIG. 30. The inputs to the method 3000 are EMLS-TE-2 and the packet. The method begins at block 3001 and proceeds to block 3002. Block 3002 looks up the ILB in the EMLS-TE-2 that matches the router index configured in the router, and then proceeds to block 3004. Block 3004 checks if the ILB entry found. If the ILB entry is not found, then block 3004 proceeds to block 3018, otherwise block 3004 proceeds to block 3006. Block 3006 checks if the TTL in the ILB Descriptor is 0. If the TTL is 0, that means the packet had traversed this router before and there is a loop somewhere in the network, so the block 3006 proceeds to block 3018 to handle the situation. If the TTL is non-zero, then block 3006 proceeds to block 3008. Block 3018 drops the packet and then proceeds to block 3099 where the method 3000 ends. Block 3008 looks up the node and adjacency labels in the ILB into the ILM Table, forwards a copy of the packet to the multicast flow overlay if the node label is found, and builds a list of ILM entries containing the entries of the forward connected adjacency labels. Block 3008 proceeds to block 3010. Block 3010 checks if the router implements the policy of removal of local ILB from the packet. If the policy is for removal the local ILB, then the block 3010 proceeds to block 3012, otherwise the block 3010 proceeds to block 3014. Block 3012 removes the ILB from the EMLS-TE-2, and then proceeds to block 3016. Block 3012 sets the TTL in the ILB Descriptor to 0 to indicate that the ILB has been processed. Block 3012 proceeds to block 3016. Block 3016 walks through the entries in the list of ILM entries, and for each entry, makes a copy of the packet, pushes the EMLS-TE-2 onto the packet copy, and forwards the resultant EMLS-TE-2 packet on the adjacency of that entry. After block 3016, the method 3000 proceeds to block 3099 where the method 3000 ends.

Figure 31:
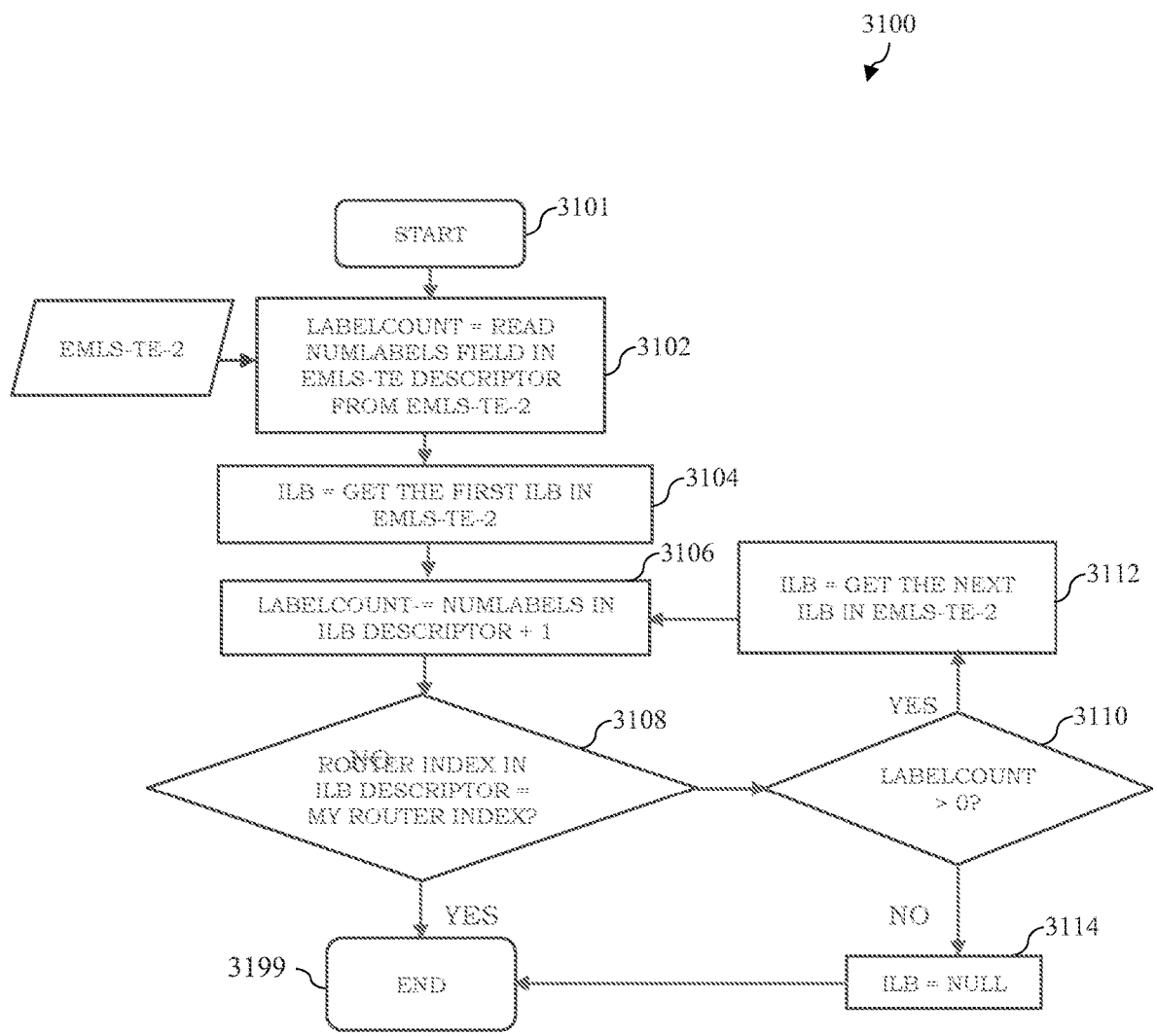
FIG. 31 depicts an example embodiment of a method for use by a router for performing a lookup of a local ILB in an EMLS-TE-2.

FIG. 31 depicts an example embodiment of a method for use by a router for performing a lookup of a local ILB in an EMLS-TE-2. It will be appreciated that the method 3100 of FIG. 31 may be used as block 3002 of FIG. 30. It will be appreciated that, although primarily presented as being performed serially, at least a portion of the functions of method 3100 may be performed contemporaneously or in a different order than as presented with respect to FIG. 31. The input to the method 3100 is an EMLS-TE-2. The method 3100 begins at block 3101 and proceeds to block 3102. Block 3102 reads the NumLabels field in the EMLS-TE Descriptor of EMLS-TE-2 and stores the value into a local variable LabelCount. Then the block 3102 proceeds to block 3104. Block 3104 gets the pointer to the first ILB in EMLS-TE-2, i.e., the pointer to the third label of EMLS-TE-2. Then the block 3104 proceeds to block 3106. Block 3106 decrements the value of LabelCount by the size of the ILB (i.e., NumLabels in ILB Descriptor of the ILB plus one), because one ILB has been processed. The block 3106 then proceeds to block 3108. Block 3108 checks if the router index in the ILB matches the router index configured in the router. If the router index in the ILB matches the router index configured in the router, then the block 3106 proceeds to block 3199, where the method 3100 ends, as the ILB is found, otherwise the block 3100 proceeds to block 3110. Block 3110 checks if there are more ILBs to process, i.e., if the LabelCount is greater than zero. If there are more ILBs to process, then the block 3110 proceeds to block 3112, otherwise the block 3112 proceeds to block 3114. Block 3112 gets the pointer to the next ILB in EMLS-TE-2, i.e., increment the current ILB point by size of the ILB. Block 3112 returns to block 3106, and subsequent blocks are repeated for the next ILB. Block 3114 is reached when a matching ILB is not found. So, the block 3114 sets the ILB pointer to NULL, to indicate the same. After block 3114, the method 3100 proceeds to block 3199 where the method 3100 ends.

Figure 32:
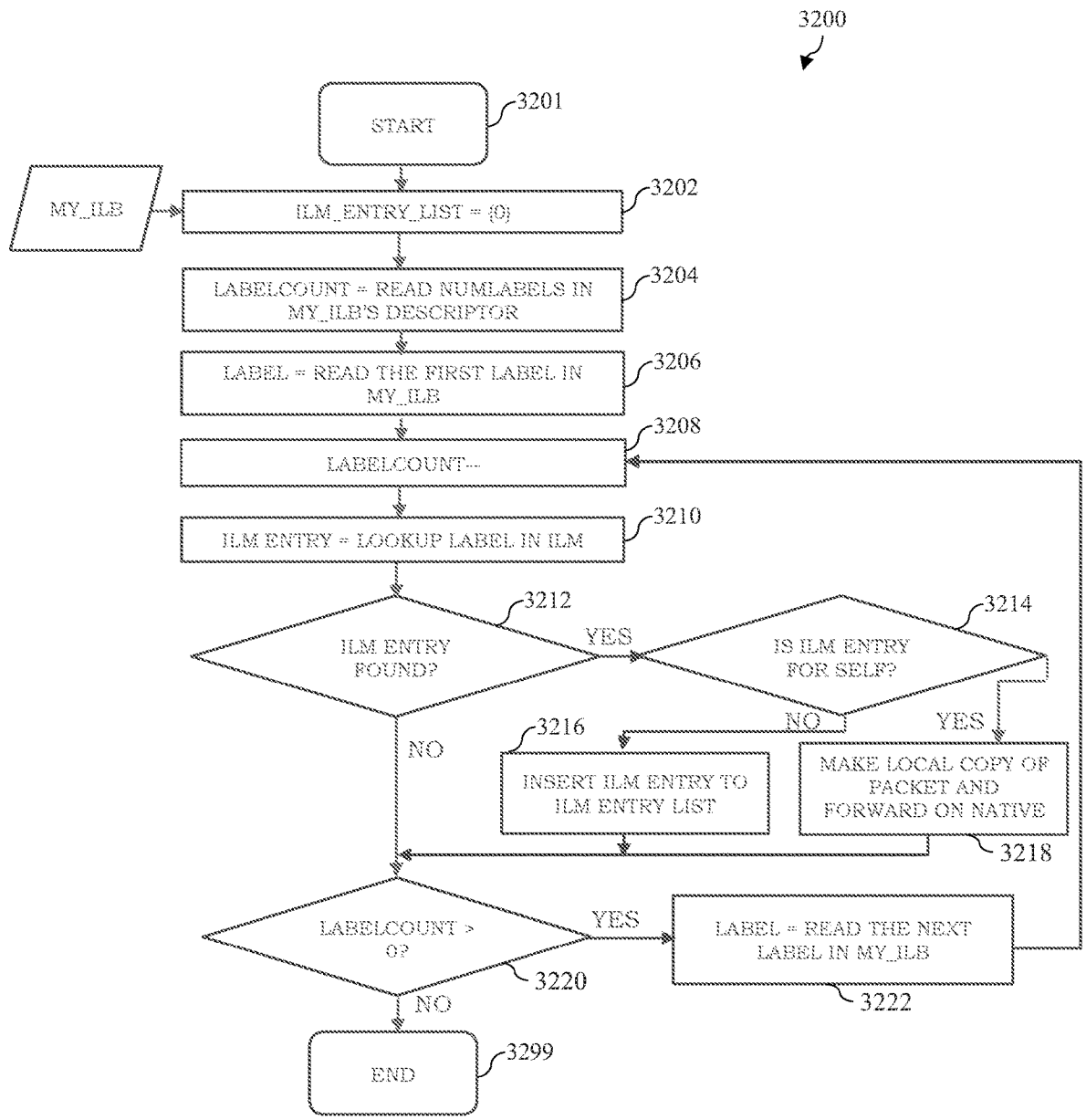
FIG. 32 depicts an example embodiment of a method for use by a router for processing a local ILB.

FIG. 32 depicts an example embodiment of a method for use by a router for processing a local ILB. It will be appreciated that the method 1900 of FIG. 19 may be used as block 3008 of FIG. 30. It will be appreciated that, although primarily presented as being performed serially, at least a portion of the functions of method 3200 may be performed contemporaneously or in a different order than as presented with respect to FIG. 32. The input to the method 3200 is the local ILB of the router. Block 3202 initializes an empty temporal list of ILM entries. This list would contain the ILM entries against the labels in the ILB. Block 3202 proceeds to block 3204. Block 3204 reads the NumLabels field from the ILB Descriptor of the ILB (i.e., the second label in ILB) to the local variable LabelCount, and then proceeds to block 3206. Block 3206 reads the first node or adjacency label in the ILB (i.e., the third label in ILB). Block 3206 proceeds to block 3208. Block 3208 decrements the LabelCount, as one label has been read out from the ILB, and then proceeds to block 3210. Block 3210 looks up the label in ILM Table, and then proceeds to block 3212. Block 3212 checks if ILM entry has been found. If the ILM entry has not been found, then the method 3200 proceeds to block 3214, otherwise the method 3200 proceeds to block 3220. Block 3214 checks if the forwarding context of the ILM entry indicates "self" (which means this router is an egress router of the packet). If the router is an egress router, then block 3214 proceeds to block 3218, otherwise block 3214 proceeds to block 3216. Block 3218 makes a copy of the input packet and forwards the copy based on the native header in the packet copy. The precise implementation of this block depends on the multicast overlay bound to the multicast flow. Block 3218 proceeds to block 3220. Block 3216 inserts the ILM entry into the temporal list of ILM entries, and then proceeds to block 3220. Block 3220 checks if there are more labels to process in the ILB, which is indicated by whether LabelCount has a value greater than zero. If there are more labels to process in the ILB, then block 3220 proceeds to block 3222, otherwise block 3220 proceeds to block 3299, where the method 3200 ends, as all labels in the ILB have been processed and the list of ILM entries contains the forward connected adjacencies for this packet. Block 3222 reads the next label in ILB, and then returns to block 3208, to repeat the subsequent blocks for this label.

Figure 33:
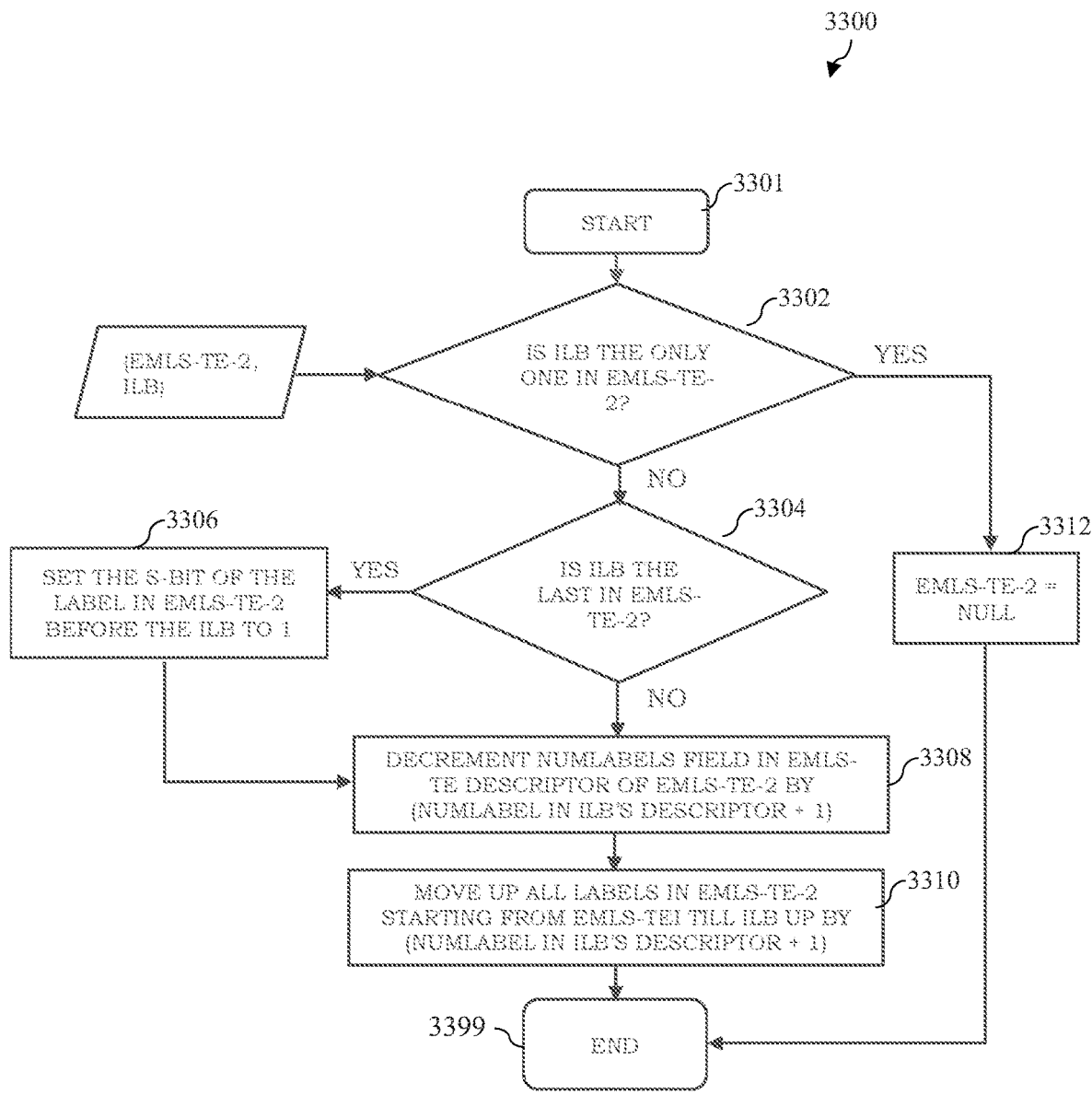
FIG. 33 depicts an example embodiment of a method for use by a router for removing an ILB from an EMLS-TE-2.

FIG. 33 depicts an example embodiment of a method for use by a router for removing an ILB from an EMLS-TE-2. It will be appreciated that the method 3300 of FIG. 33 may be used as block 3012 of FIG. 30. It will be appreciated that, although primarily presented as being performed serially, at least a portion of the functions of method 3300 may be performed contemporaneously or in a different order than as presented with respect to FIG. 33. The inputs to the method 3300 are the EMLS-TE-2 and the ILB to be removed from the EMLS-TE-2. The method beings at block 3301 and proceeds to block 3302. Block 3302 checks if the input ILB is the only ILB in the EMLS-TE-2. If the input ILB is the only ILB in the EMLS-TE-2, then block 3302 proceeds to block 3312, otherwise block 3302 proceeds to block 3304. Block 3312 sets the EMLS-TE-2 to void, as its only ILB is removed, and then block 3302 proceeds to block 3399 where the method 3300 ends. Block 3304 checks if the ILB is the last of the existing ILBs in EMLS-TE-2. If the ILB is the last of the existing ILBs, then the block 3304 proceeds to block 3306, otherwise the block 3304 proceeds to block 3308. Block 3306 sets the S-bit in the MPLS label, in EMLS-TE-2 that comes before the ILB, to 1 because the MPLS label is now the bottom-most in EMLS-TE-2. The block 3306 then proceeds to block 3308. Block 3308 decrements the NumLabels field in the EMLS-TE Descriptor of EMLS-TE-2 by the number of MPLS labels in the ILB, since the ILB is being removed. The number of MPLS labels in the ILB is the value of NumLabels in the ILB Descriptor plus one (accounting for the ILB Descriptor itself). Block 3308 proceeds to block 3310. Block 3310 moves the labels in EMLS-TE-2, that range from EMLS-TEI until the MPLS label before the ILB, up by number of labels in ILB. As a result, the ILB is wiped out of the EMLS-TE-2. After block 3310, the method 3300 proceeds to block 3399 where the method 3300 ends.

Figure 34:
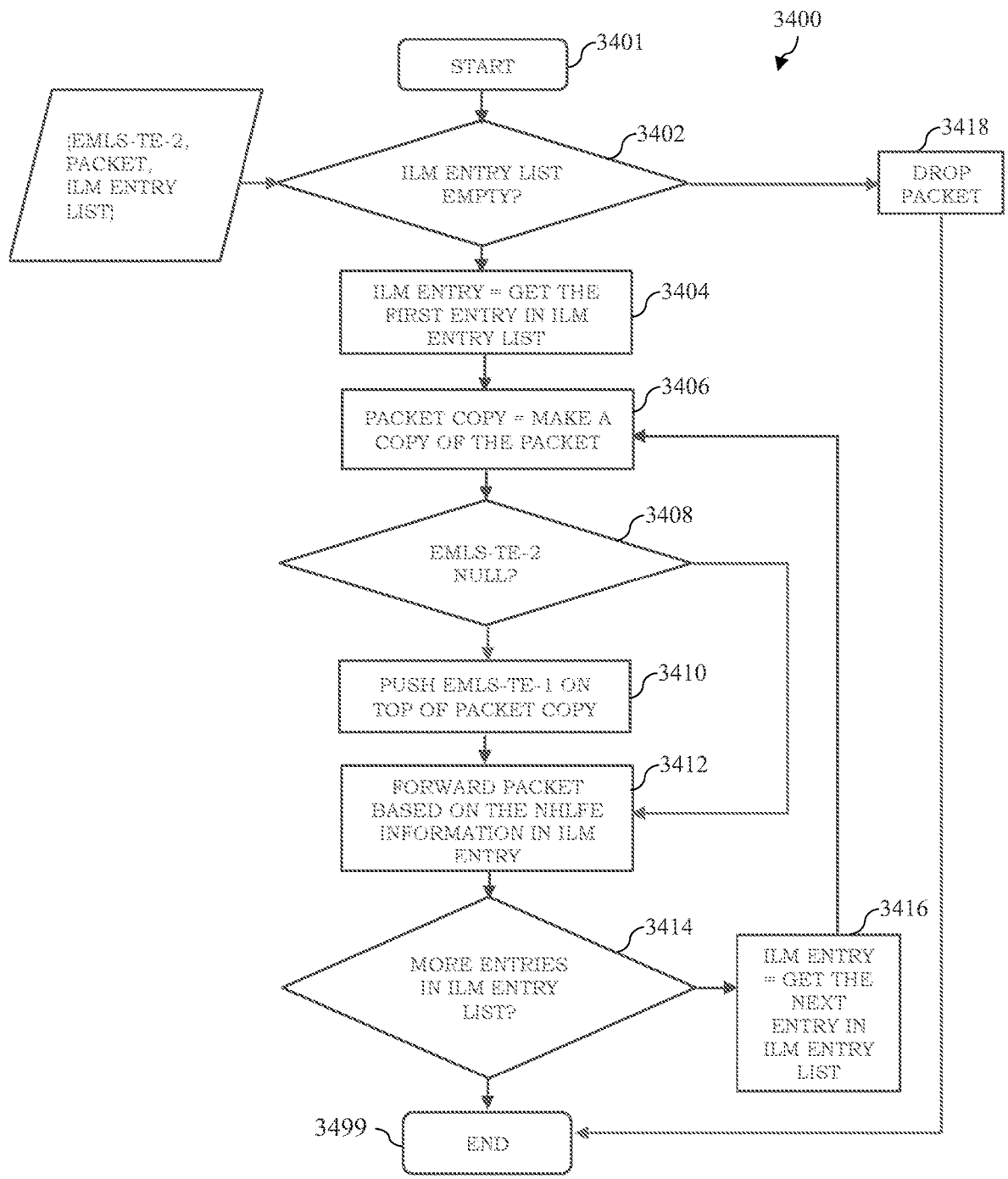
FIG. 34 depicts an example embodiment of a method for use by a router for forwarding EMLS-TE-2 packets.

FIG. 34 depicts an example embodiment of a method for use by a router for forwarding EMLS-TE-2 packets. It will be appreciated that the method 3400 of FIG. 34 may be used as block 3016 of FIG. 30. It will be appreciated that, although primarily presented as being performed serially, at least a portion of the functions of method 3400 may be performed contemporaneously or in a different order than as presented with respect to FIG. 34. The inputs to the method 3400 are the Packet, the EMLS-TE-2 to be pushed onto the packet, and the list of LM entries on which to forward a copy of the EMLS-TE-2 packet. The method 3400 begins at block 3401 and then proceeds to block 3402. Block 3402 checks if the list of ILM entries is empty. If the list is empty, then block 3402 proceeds to block 3418, else proceeds to block 3404. Block 3404 retrieves the first ILM entry from the input list of ILM entries, and then block 3404 proceeds to block 3406. Block 3406 makes a copy of the input packet, and then proceeds to block 3408. Block 3408 checks if the EMLS-TE-2 is valid. The EMLS-TE-2 may be invalid if block 3012 in the method in FIG. 30 had removed the local ILB and that was the only ILB in the EMLS-TE-2, which caused removal of the EMLS-TE-2 itself. If the EMLS-TE-2 is invalid then block 3408 proceeds to block 3410, otherwise the block 3408 proceeds to block 3412. Block 3410 pushes a copy of input EMLS-TE-2 on top of the packet copy, which results in an EMLS-TE-2 packet. Block 3410 proceeds to block 3412. Block 3412 forwards the EMLS-TE-2 to the adjacency associated with the ILM entry, based on the NHLFE of the ILM entry. Then block 3412 proceeds to block 3414. Block 3414 checks if there are more ILM entries in the list. If none are left, then block 3414 proceeds to block 3499 where the method 3400 ends, otherwise the block 3414 proceeds to block 3416. Block 3416 retrieves the next ILM entry in the list of ILM entries, and then returns to block 3406, to repeat the subsequent blocks for the next ILM entry. It is noted that performing blocks to 3002 to 3014 in FIG. 30 by ingress router on each packet for a multicast flow may be sub-optimal, as the operations therein are not specific to a packet, but for the multicast flow in general. So, an implementation at ingress router can perform the blocks 3002 to 3014 in continuation to the method in FIG. 26, to prebuild the list of ILM entries and the EMLS-TE-2 to be sent on forwarded packets. For example, block 2610 can perform the blocks 3002-3014 and then the multicast flow identifier can be mapped to the tuple {EMLS-TE-2, list of ILM entries}. Then, for every packet on the multicast flow, the ingress router will look up the {EMLS-TE-2, list of ILM entries} mapped to the flow identifier and would execute the method 34 to forward/replicate the packet.

Figure 35:
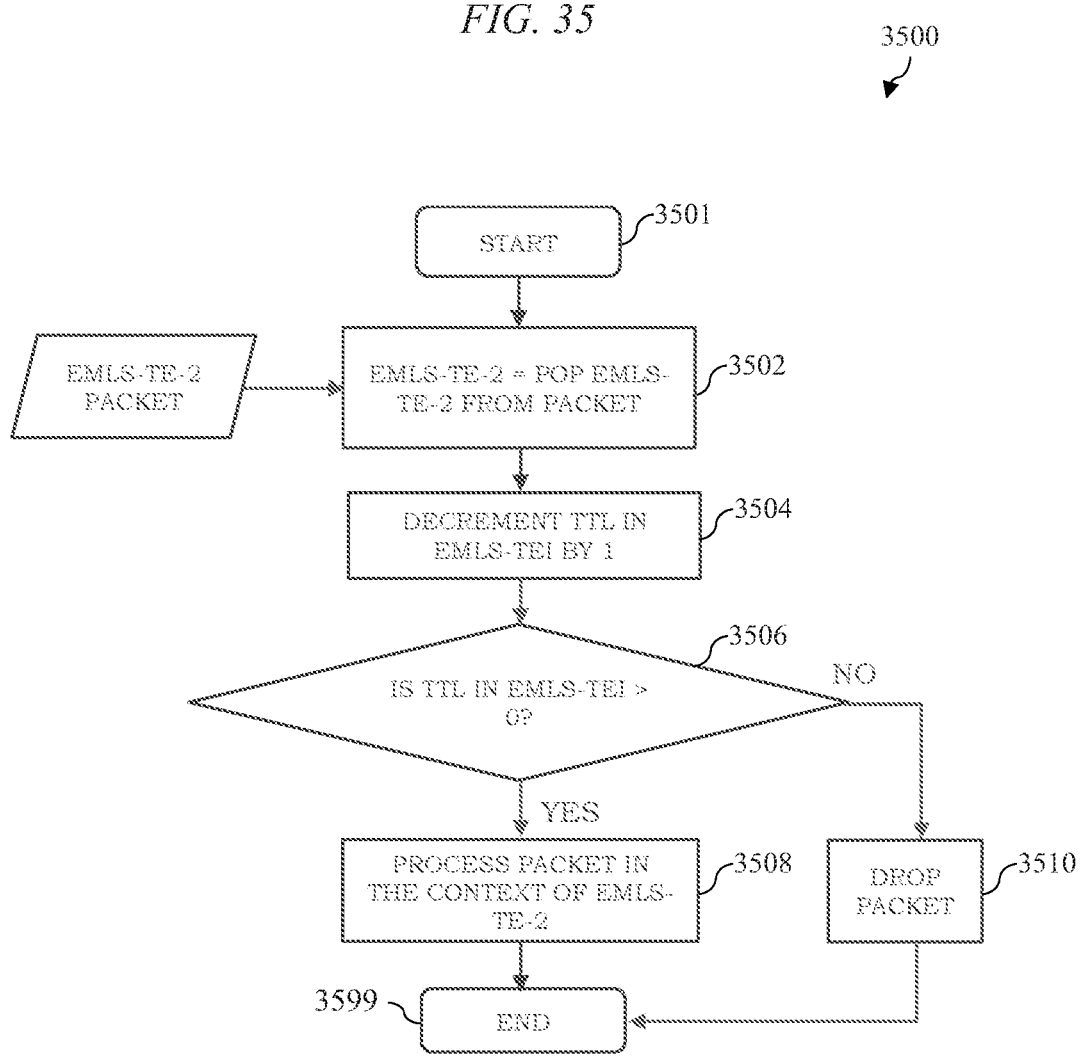
FIG. 35 depicts an example embodiment of a method for use by a router for processing an EMLS-TE-2 packet.

FIG. 35 depicts an example embodiment of a method for use by a router for processing an EMLS-TE-2 packet. It will be appreciated that the method 3500 of FIG. 35 may be executed by transit, bud, and egress routers within a stateless MPLS TE multicast domain. It will be appreciated that, although primarily presented as being performed serially, at least a portion of the functions of method 3500 may be performed contemporaneously or in a different order than as presented with respect to FIG. 35. The input to the method 3500 is an EMLS-TE-2 packet. The method 3500 begins at block 3501 and then proceeds to block 3502. Block 3502 pops the EMLS-TE-2 from the packet, and then proceeds to block 3504. Block 3504 decrements the TTL in EMLS-TEI (of EMLS-TE-2) by one, and then proceeds to block 3506. Block 3506 checks if the TTL in EMLS-TEI is greater than zero. If the TTL in the EMLS-TEI is greater than zero, then block 3504 proceeds to block 3508, otherwise block 3504 proceeds to block 3510. Block 3508 processes the packet in the context of the EMLS-TE-2. Block 3508 may be implemented by the method in FIG. 34, which implements the common processing part for any router in the stateless MPLS TE multicast domain. After block 3508, the method 3500 proceeds to block 3599 where the method 3500 ends. Block 3510 drops the packet, as TTL has become zero. After block 3510, the method 3500 proceeds to block 3599 where the method 3500 ends.

It is noted that various methods discussed below describe various aspects of the format of EMLS-TE-3 used by Option-B to encode an explicit path tree onto a packet. It will be appreciated that Option-B also may implement methods discussed above which describe various aspects of the format of EMLS-TE-2 used by Option-A to encode an explicit path tree onto a packet.

Figure 36:
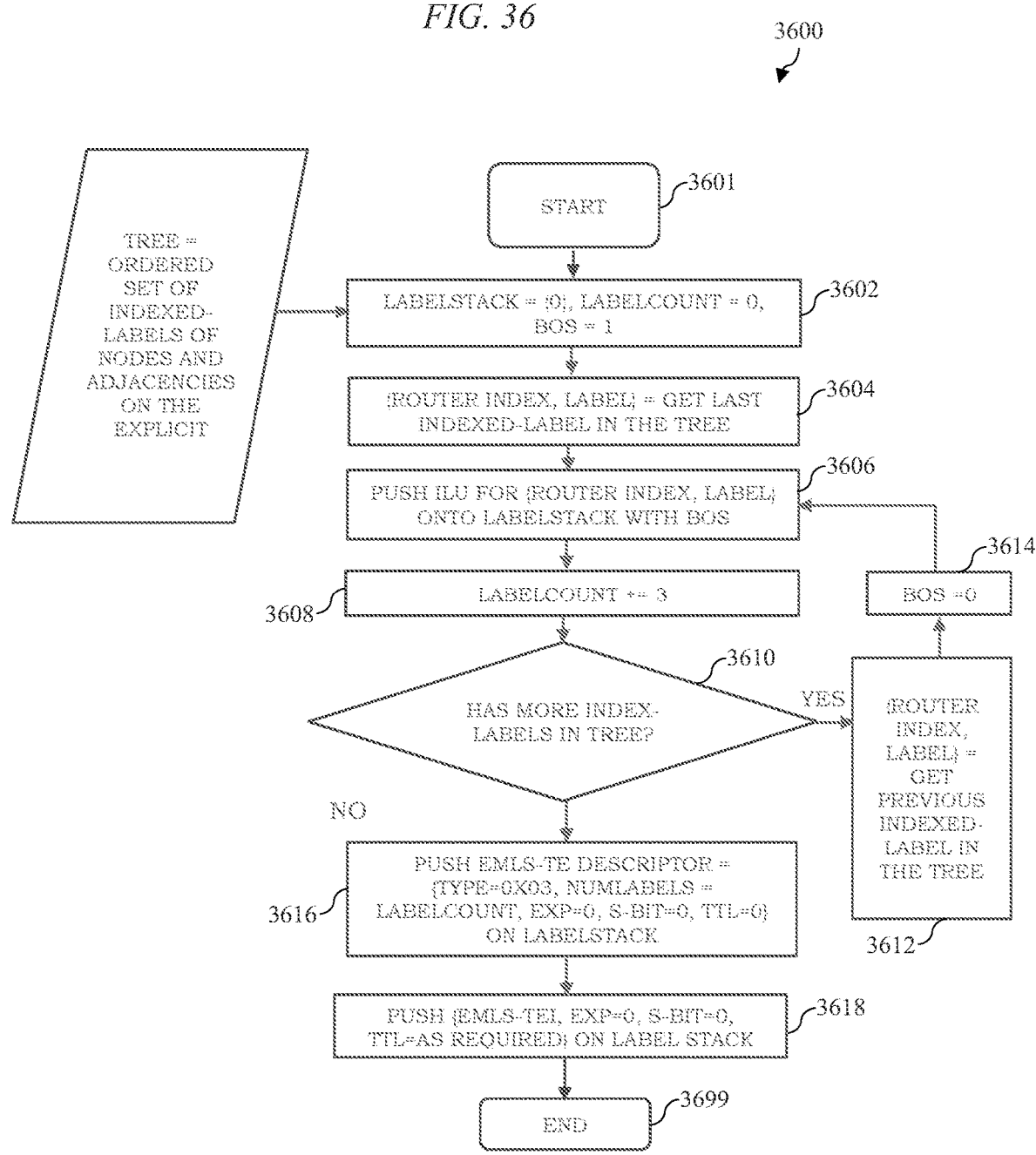
FIG. 36 depicts an example embodiment of a method for use by a router for building an EMLS-TE-3 from the set of indexed labels of the nodes and the adjacencies in an explicit path tree.

FIG. 36 depicts an example embodiment of a method for use by a router for building an EMLS-TE-3 from the set of indexed labels of the nodes and the adjacencies in an explicit path tree. It will be appreciated that, although primarily presented as being performed serially, at least a portion of the functions of method 3600 may be performed contemporaneously or in a different order than as presented with respect to FIG. 36. The input to the method 3600 is the ordered set of indexed-labels of nodes and adjacencies in an explicit path tree. The method 3600 begins at block 3601 and then proceeds to block 3602. Block 3602 initializes an empty Label Stack wherein the EMLS-TE-3 would be built, a variable LabelCount (which tracks the number of labels pushed onto the label stack of EMLS-TE-3) to 0, and a variable BOS (which tracks the S-bit of labels pushed onto the label stack) to 1. It is noted that the BOS is initialized to 1 because the first label to be pushed would be at the bottom of the label stack. Block 3602 proceeds to block 3604. Block 3604 retrieves the last indexed-label in the tree. Since the indexed labels are to be pushed in the same order as their occurrences in the tree, the indexed-labels are retrieved in the reverse order. Block 3604 proceeds to block 3606. Block 3606 encodes an ILU for the indexed-label and pushes the ILU onto the Label Stack, and then proceeds to block 3608. Block 3608 increments the LabelCount by 3, to account for the number of labels in the ILU pushed in block 3606. The block 3608 then proceeds to block 3610. Block 3610 checks if there are more indexed-labels in the tree. If there are more labels, then block 3610 proceeds to block 3612, otherwise block 3610 proceeds to block 3616. Block 3612 retrieves the previous indexed-label (of the recently processed indexed-label as the indexed labels are retrieved in reverse order) in the tree, and then proceeds to block 3614. Block 3614 sets the value of BOS to 0, since the subsequent labels are not the bottom of the label stack. Block 3614 returns to block 3606 to repeat subsequent blocks for this indexed-label. Block 3616 is reached, which means that ILUs for all nodes and adjacencies have been pushed onto the Label Stack. So, block 3616 pushes the EMLS-TE Descriptor onto the label stack as {Type=0x3, NumLabels=LabelCount, EXP=0, S-bit=0, TTL=0}. Block 3616 proceeds to block 3618. Block 3618 pushes the EMLS-TEI as {Label=EMLS-TEI, EXP=0, S-bit=0, TTL as required} onto the Label Stack. The TTL value may be chosen by an implementation to the number of levels in the tree or to the maximum value 255. It will be appreciated that an implementation may use other methods to set an appropriate TTL value. After block 3618, the method 3600 proceeds to block 3699 where the method 3600 ends.

Figure 37:
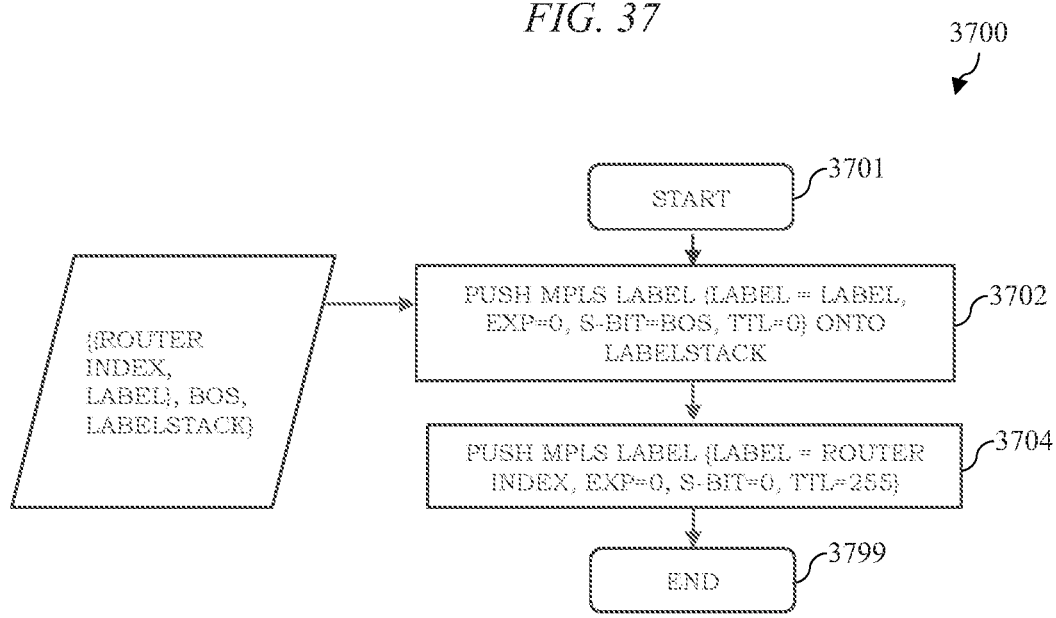
FIG. 37 depicts an example embodiment of a method for use by a router for pushing an ILU onto a label stack.

FIG. 37 depicts an example embodiment of a method for use by a router for pushing an ILU onto a label stack. It will be appreciated that the method 3700 of FIG. 37 may be used as block 3606 of FIG. 36. It will be appreciated that, although primarily presented as being performed serially, at least a portion of the functions of method 3700 may be performed contemporaneously or in a different order than as presented with respect to FIG. 37. The inputs to the method 3700 are the indexed-label, the BOS that indicates whether this is the first indexed-label being pushed, and the Label-Stack onto which to push the indexed-label. The method 3700 starts with block 3702. Block 3702 pushes an MPLS Label for the label in the index-label with EXP=0, S-bit=BOS, and TTL=0. Then the block 3702 proceeds to block 3704. Block 3704 pushes an MPLS Label for the router index in the indexed-label with EXP=0, 5-bit=0, and TTL=255. An implementation may choose to set the TTL in this label to any non-zero value to indicate the validity of the ILU. In this example, the TTL is set to 255 (maximum). After block 3704, the method 3700 proceeds to block 3799 where the method 3700 ends.

Figure 38:
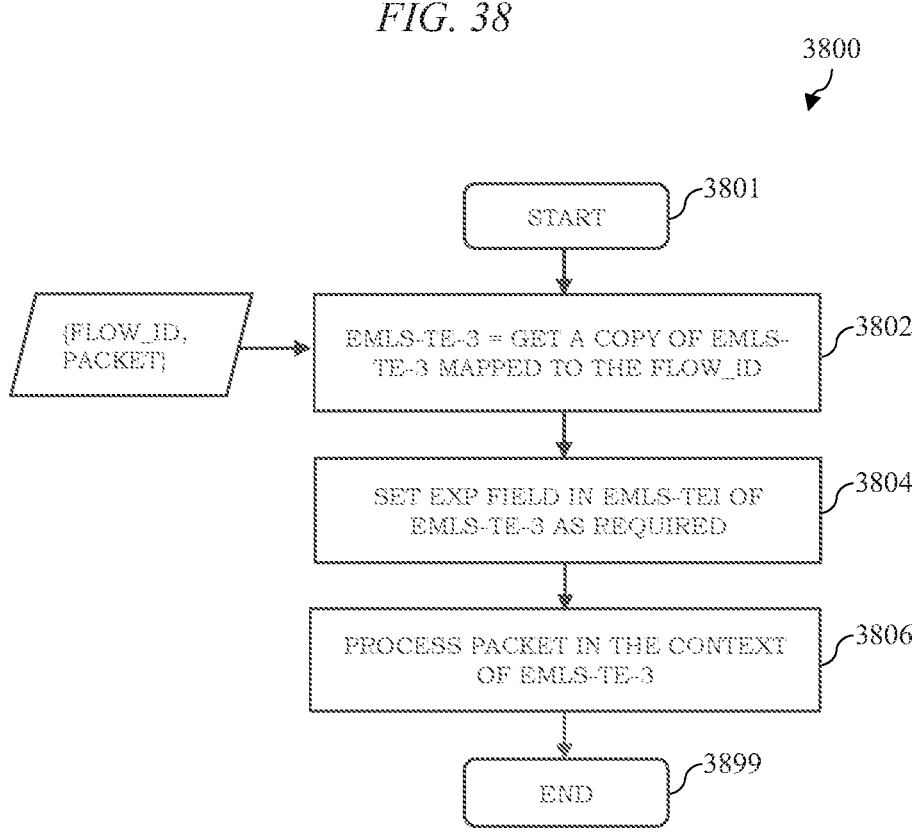
FIG. 38 depicts an example embodiment of a method for use by an ingress router to send a packet for a multicast flow as an EMLS-TE-3 packet across a stateless MPLS TE multicast domain.

FIG. 38 depicts an example embodiment of a method for use by an ingress router to send a packet for a multicast flow as an EMLS-TE-3 packet across a stateless MPLS TE multicast domain. It will be appreciated that, although primarily presented as being performed serially, at least a portion of the functions of method 3800 may be performed contemporaneously or in a different order than as presented with respect to FIG. 38. The inputs to the method 3800 are the locally assigned identifier of the multicast flow and a packet of the flow. The method 3800 begins at block 3801 and then proceeds to block 3802. Block 3802 looks up the EMLS-TE-3 mapped to the multicast flow by its identifier and makes a copy of the EMLS-TE-3. The block 3802 then proceeds to block 3804. Block 3804 sets the EXP field in EMLS-TEI as required. For example, an implementation may determine the EXP based on the QoS policy associated with the multicast flow. Block 3804 proceeds to block 3806. Block 3806 sends the packet to stateless MPLS TE multicast domain in the context of the EMLS-TE-3. After block 3806, the method 3800 proceeds to block 3899 where the method 3800 ends.

Figure 39:
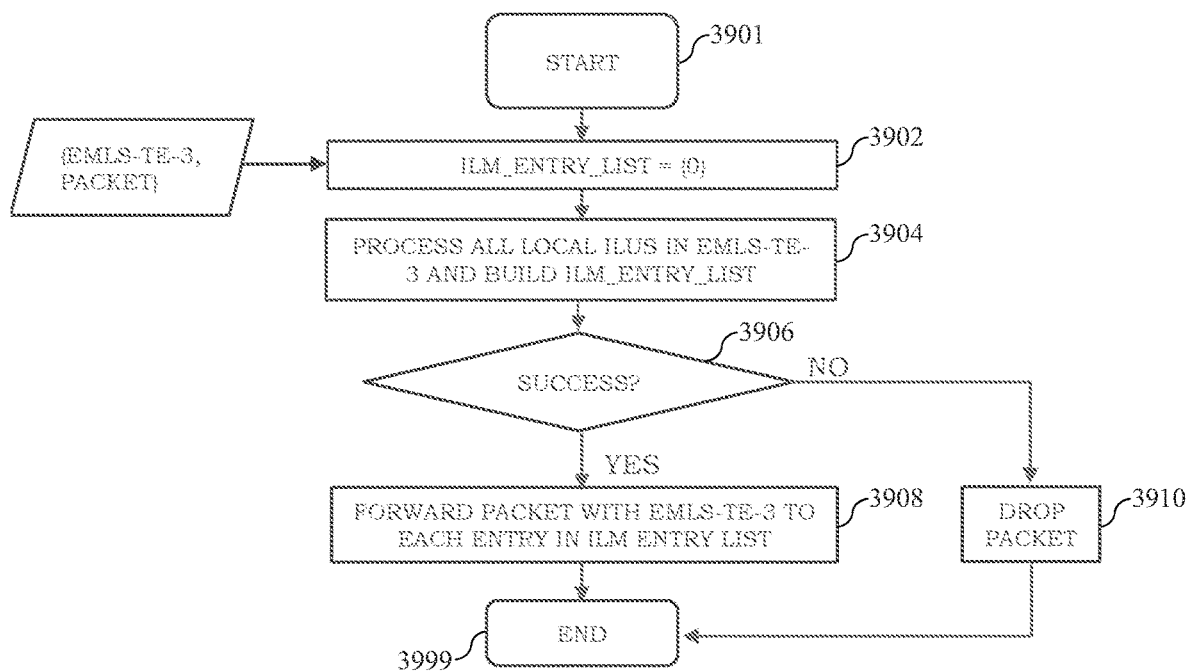
FIG. 39 depicts an example embodiment of a method for use by a router for processing a packet in the context of an EMLS-TE-3.

FIG. 39 depicts an example embodiment of a method for use by a router for processing a packet in the context of an EMLS-TE-3. It will be appreciated that the method 3900 of FIG. 39 may be executed by all types of routers within a stateless MPLS TE multicast domain (e.g., ingress, transit, leaf, and bud routers). It will be appreciated that the method 3900 of FIG. 39 may be used as block 3806 of FIG. 38. It will be appreciated that, although primarily presented as being performed serially, at least a portion of the functions of method 3900 may be performed contemporaneously or in a different order than as presented with respect to FIG. 39. The inputs to the method 3900 are EMLS-TE-3 and the packet. The method begins at block 3901 and proceeds to block 3902. Block 3902 initializes an empty temporal list of ILM entries. This list would include the ILM entries against the labels in ILUs that are local to this router. Block 3902 proceeds to block 3904. Block 3904 processes all local ILUs in the EMLS-TE-3 and builds the list of ILM entries containing ILM entries of forward connected adjacencies found among local ILUs. The block 3904 then proceeds to block 3906. Block 3906 checks if block 3904 was a success or failure. If it was failure, then block 3906 proceeds to block 3910, otherwise block 3906 proceeds to block 3908. Block 3910 drops the packet. After block 3910, the method 3900 proceeds to block 3999 where the method 3900 ends. Block 3908 walks through the entries in the list of ILM entries and, for each entry, it makes a copy of the packet, pushes the EMLS-TE-3 onto the packet copy, and forwards the resultant EMLS-TE-3 packet on the adjacency of that entry. After block 3908, the method proceeds to block 3900 where the method 3900 ends.

Figure 40:
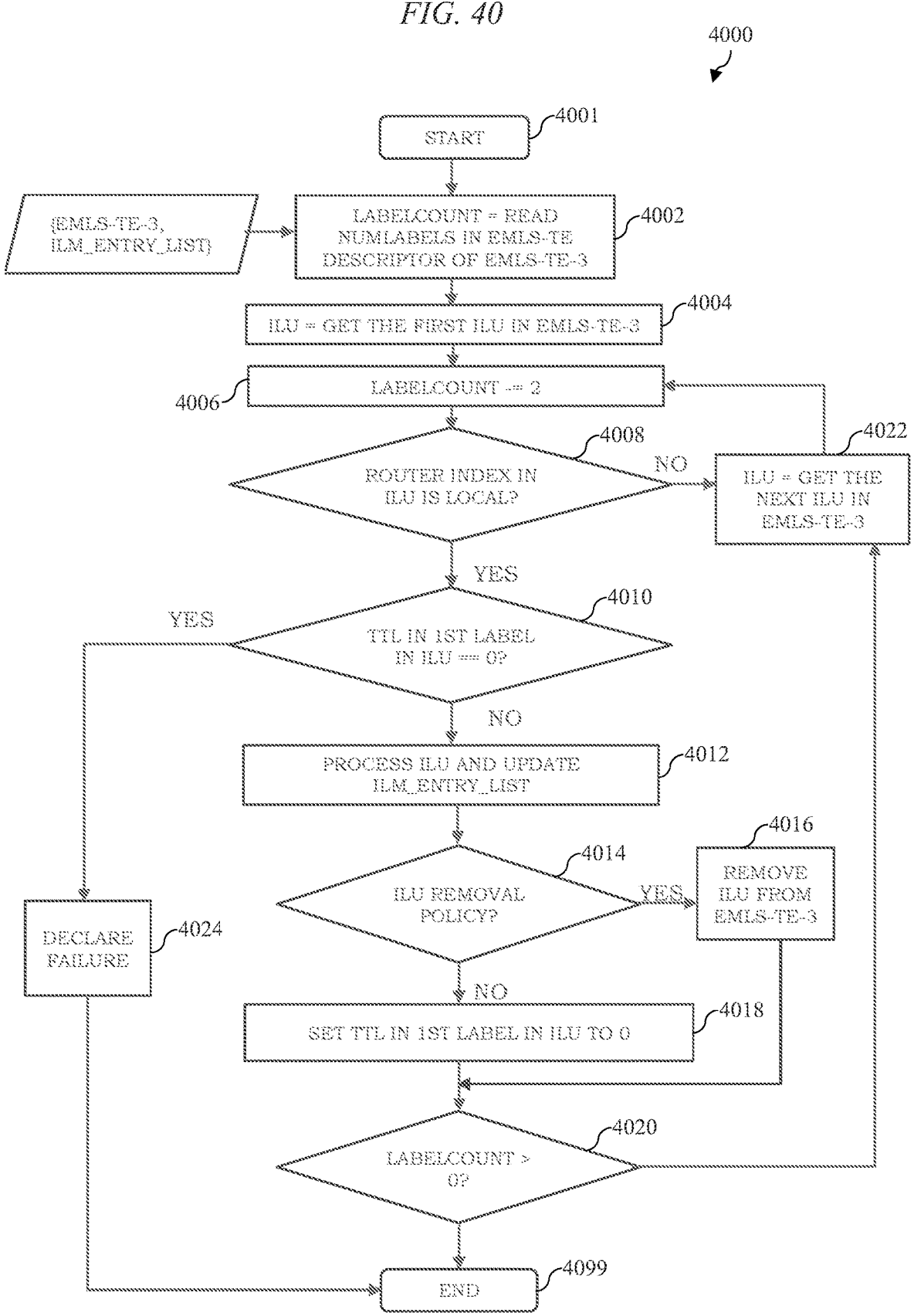
FIG. 40 depicts an example embodiment of a method for use by a router for processing of local ILUs in an EMLS-TE-3.

FIG. 40 depicts an example embodiment of a method for use by a router for processing of local ILUs in an EMLS-TE-3. It will be appreciated that the method 4000 of FIG. 40 may be used as block 3904 of FIG. 39. It will be appreciated that, although primarily presented as being performed serially, at least a portion of the functions of method 4000 may be performed contemporaneously or in a different order than as presented with respect to FIG. 40. The inputs to the method 4000 are EMLS-TE-3 and the list of ILM entries to be built. The method 4000 starts at block 4001 and proceeds to block 4002. Block 4002 reads the NumLabels field in the EMLS-TE Descriptor of EMLS-TE-3 to a local variable LabelCount, and then proceeds to block 4004. Block 4004 gets the first ILU in the EMLS-TE-3 (i.e., the third label in the EMLS-TE-3 is the first label of first ILU). Block 4004 then proceeds to block 4006. Block 4006 decrements the LabelCount by 2 to account for the ILU that was read in block 4004. Block 4006 proceeds to block 4008. Block 4008 checks if router index of the ILU is the router index configured in the router, i.e., if the ILU is local. If the ILU is local, then block 4008 proceeds to block 4010 for processing the ILU. If the ILU is not local, then block 4008 proceeds to block 4022. Block 4010 checks if the TTL in the first label in ILU is 0. TTL 0 means the EMLS-TE-3 packet traversed this router before and there must be a loop somewhere in the domain. If TTL is 0, then block 4010 proceeds to block 4024, otherwise block 4010 proceeds to block 4012. Block 4024 declares failure to process further. After block 4024, the method 4000 proceeds to block 4099 where the method 4000 ends. Block 4012 processes the local ILU and updates the list of ILM entries if required. Block 4012 proceeds to block 4014. Block 4014 checks if the router implements the policy of removal of a local ILU from the packet. If the policy is for removal of the local ILU, then block 4014 proceeds to block 4016, otherwise block 4014 proceeds to block 4018. Block 4016 removes the ILU from the EMLS-TE-3, and then proceeds to block 4020. Block 4018 sets the TTL in the first label in the ILU to 0 to indicate that the ILU has been processed by the router. Block 4018 proceeds to block 4020. Block 4020 checks if there are more ILUs to process in the EMLS-TE-3, i.e., if LabelCount is greater than 0. If there are no more ILUs to process then block 4020 proceeds to block 4099 where the method 4000 ends, otherwise block 4020 proceeds to block 4022. Block 4022 retrieves the next ILU in the EMLS-TE-3. The next ILU is retrieved by incrementing the pointer to the current ILU by 2 MPLS Labels.

Figure 41:
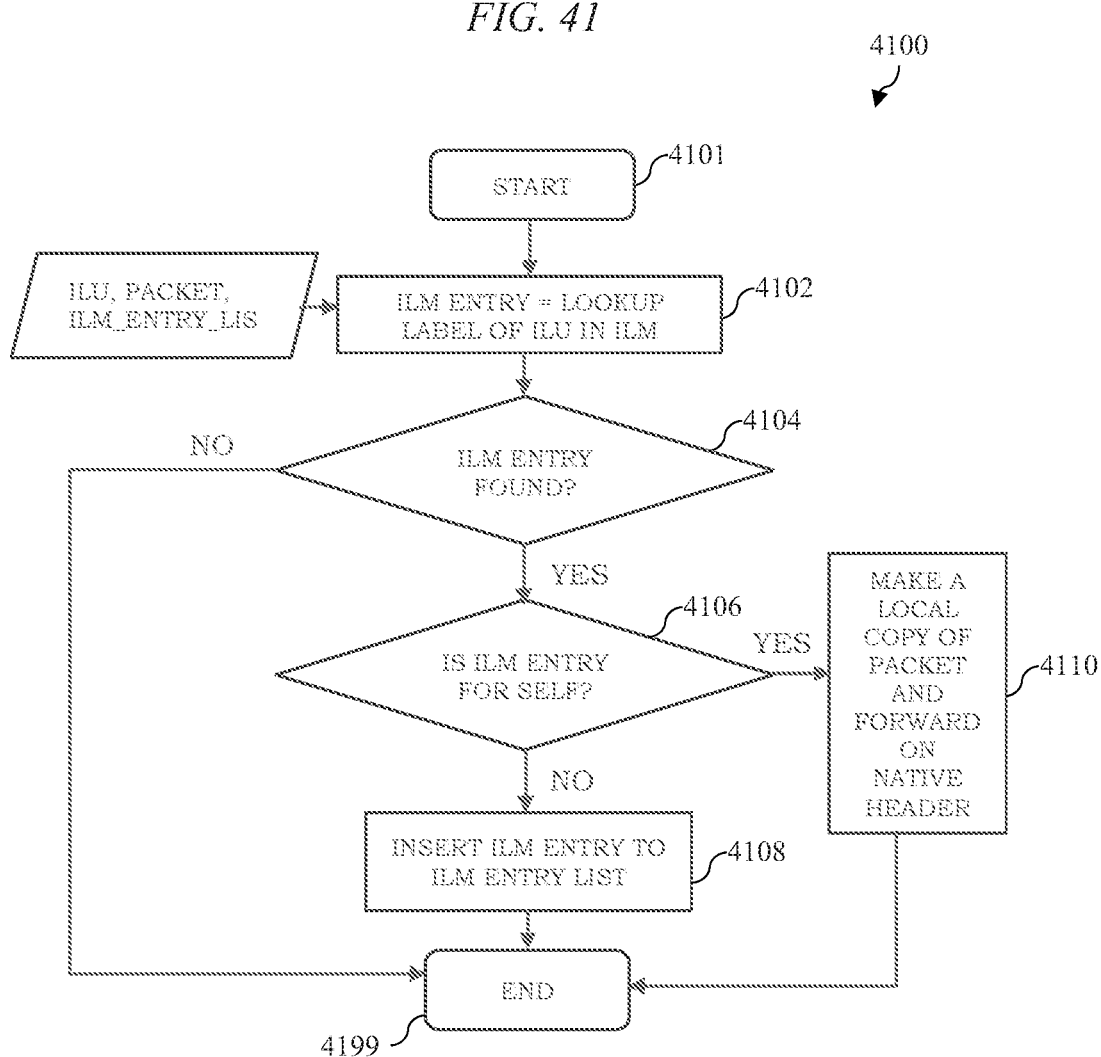
FIG. 41 depicts an example embodiment of a method for use by a router for processing a local ILU.

FIG. 41 depicts an example embodiment of a method for use by a router for processing a local ILU. It will be appreciated that the method 4100 of FIG. 41 may be used as block 4012 of FIG. 40. It will be appreciated that, although primarily presented as being performed serially, at least a portion of the functions of method 4100 may be performed contemporaneously or in a different order than as presented with respect to FIG. 41. The inputs to the method 4100 are the local ILU, the packet associated with the ILU, and the list of ILM entries to be updated by. The method starts at block 4102. Block 4102 looks up the label in the ILU (i.e., the label value of the second MPLS label in the ILU) into the ILM Table, and then proceeds to block 4104. Block 4104 checks if the ILM entry is found from the lookup in block 4102. If the ILM entry is not found, then the block 4104 proceeds to block 4199 where the method 4100 ends, otherwise the block 4104 proceeds to block 4106. Block 4106 checks if the forwarding context of the ILM entry is "self" (i.e., this router is the egress router for the label). If it is an egress router, then block 4106 proceeds to block 4110, otherwise block 4106 proceeds to block 4108. Block 4110 makes a copy of the input packet and forwards the copy based on the native header in the packet copy. The precise implementation of this block depends on the multicast overlay bound to the multicast flow. After block 4110, the method 4100 proceeds to block 4199 where the method 4100 ends. Block 4108 inserts the ILM entry into the list of ILM entries. After block 4108, the method 4100 proceeds to block 4199, where the method 4100 ends.

Figure 42:
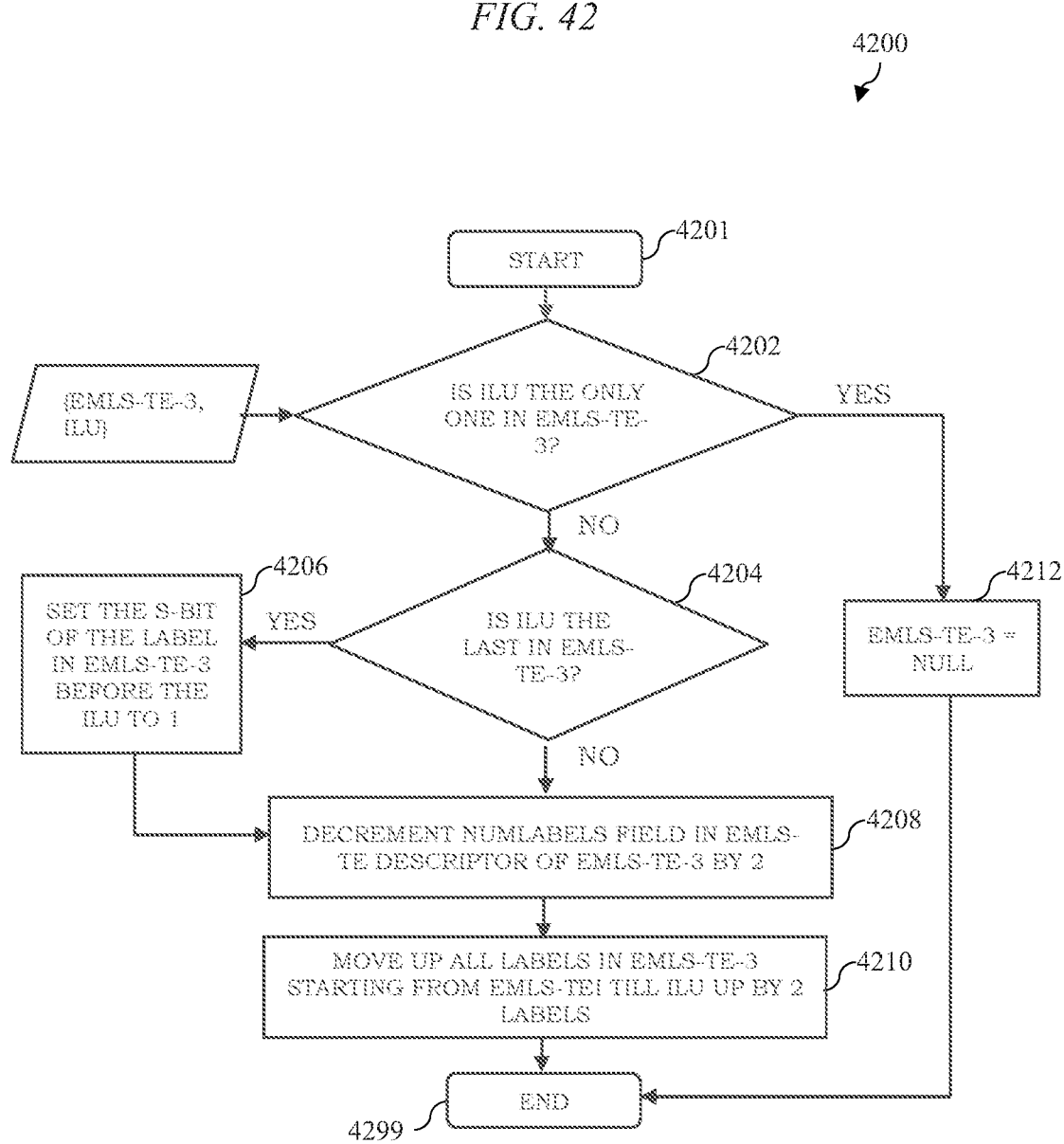
FIG. 42 depicts an example embodiment of a method for use by a router for removing an ILU from an EMLS-TE-3.

FIG. 42 depicts an example embodiment of a method for use by a router for removing an ILU from an EMLS-TE-3. It will be appreciated that the method 4200 of FIG. 42 may be used as block 4016 of FIG. 40. It will be appreciated that, although primarily presented as being performed serially, at least a portion of the functions of method 4200 may be performed contemporaneously or in a different order than as presented with respect to FIG. 42. The inputs to the method 4200 are EMLS-TE-3 and the ILU to be removed from the EMLS-TE-3. The method 4200 starts at block 4202. Block 4202 checks if the input ILU is the only ILU in the EMLS-TE-3. If it is the only ILU, then block 4202 proceeds to block 4212, otherwise block 4202 proceeds to block 4204. Block 4212 sets the EMLS-TE-3 to void as its only ILU is removed, and then block 4212 proceeds to block 4299 where the method 4200 ends. Block 4204 checks if the ILU is the last of the existing ILUs in EMLS-TE-3. If the ILU is the last of the existing ILUs, then block 4204 proceeds to block 4206, otherwise block 4204 proceeds to block 4208. Block 4206 sets S-bit in the MPLS label in EMLS-TE-3 that comes before the ILU to 1, because the MPLS label is now the bottom-most in EMLS-TE-3. The block 4206 then proceeds to block 4208. Block 4208 decrements the NumLabels field in the EMLS-TE Descriptor of EMLS-TE-3 by 2, since the ILU being removed consists of 2 MPLS labels. Block 4208 then proceeds to block 4210. Block 4210 moves the labels in EMLS-TE-3, that range from EMLS-TEI until the MPLS label before the ILU, up by 2 MPLS Labels and, as a result, the ILU is wiped out of EMLS-TE-3. After block 4210, the method 4200 proceeds to block 4299 where the method 4200 ends.

Figure 43:
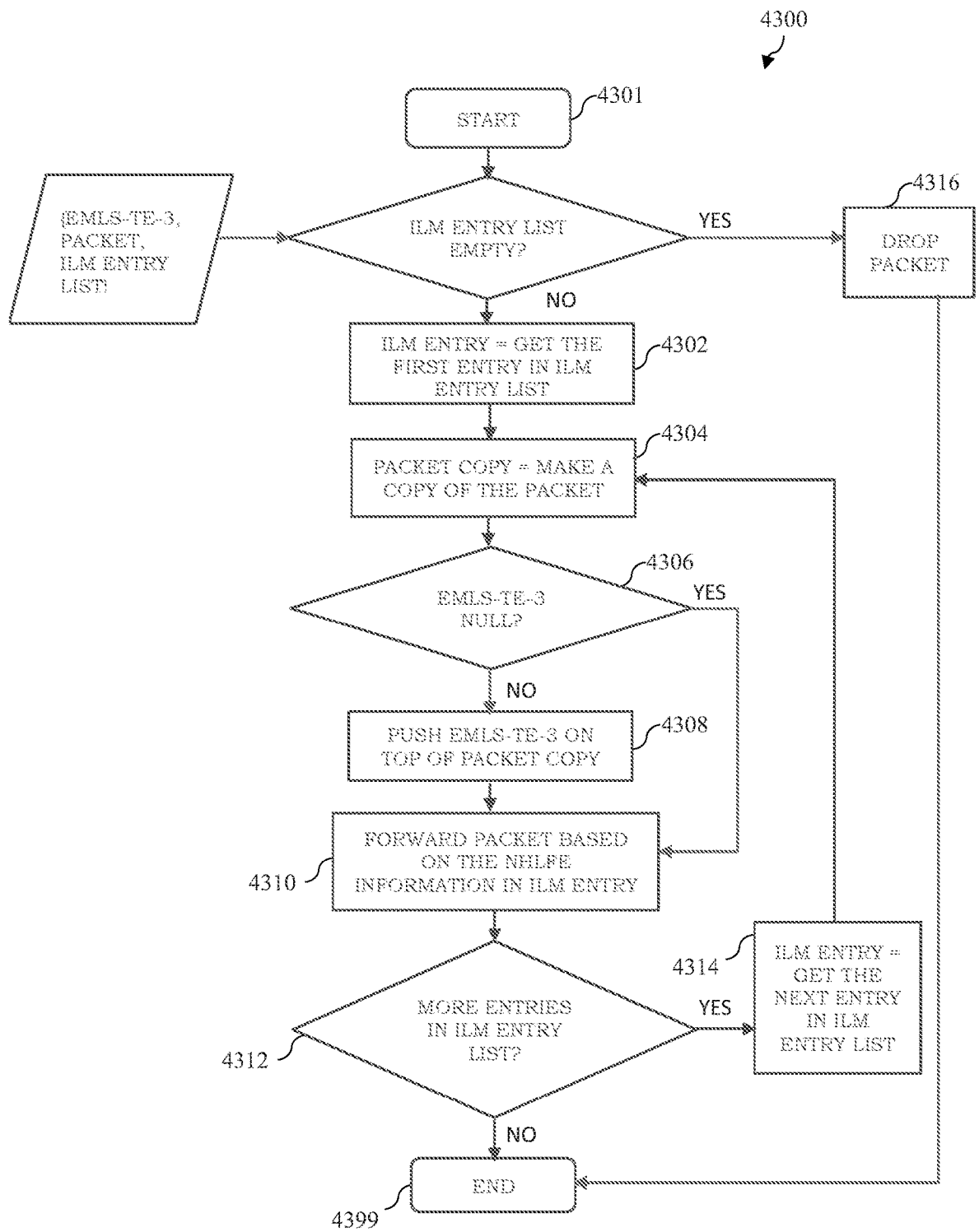
FIG. 43 depicts an example embodiment of a method for use by a router for forwarding an EMLS-TE-3 Packet.

FIG. 43 depicts an example embodiment of a method for use by a router for forwarding an EMLS-TE-3 Packet. It will be appreciated that the method 4300 of FIG. 43 may be used as block 3908 of FIG. 39. It will be appreciated that, although primarily presented as being performed serially, at least a portion of the functions of method 4300 may be performed contemporaneously or in a different order than as presented with respect to FIG. 43. The inputs to the method 4300 are the Packet, the EMLS-TE-3 to be pushed onto the packet, and the list of LM entries on which to forward a copy of the EMLS-TE-3 packet. The method begins at block 4301 and proceeds to block 4302. Block 4302 checks if the list of ILM entries is empty. If the list is empty, then block 4302 proceeds to block 4318, otherwise block 4302 proceeds to block 4304. Block 4304 retrieves the first ILM entry from the input list of ILM entries, and then proceeds to block 4306. Block 4306 makes a copy of the input packet, and then proceeds to block 4308. Block 4308 checks if the EMLS-TE-3 is valid. The EMLS-TE-3 may be invalid if block 4016 in the method 40000 of FIG. 40 had removed the local ILU and that was the only ILU in the EMLS-TE-3, which caused removal of the EMLS-TE-3 itself. If EMLS-TE-3 is invalid, then block 4308 proceeds to block 4310, otherwise block 4308 proceeds to block 4312. Block 4310 pushes a copy of input EMLS-TE-3 on top of the packet copy, which results in an EMLS-TE-3 packet. Block 4310 proceeds to block 4312. Block 4312 forwards the EMLS-TE-3 to adjacency associated with the ILM entry, based on the NHLFE of the ILM entry, and then proceeds to block 4314. Block 4314 checks if there are more ILM entries in the list. If none are left, then block 4314 proceeds to block 4399 where the method 4300 ends, otherwise block 4314 proceeds to block 4316. Block 4316 retrieves the next ILM entry in the list of ILM entries, and then returns to block 4306, to repeat the subsequent blocks for the next ILM entry. It is noted that performing blocks to 3902 to 3910 in FIG. 39 by ingress router on each packet for a multicast flow may be suboptimal, as the operations therein are not specific to a packet, but for the multicast flow in general. So, an implementation at the ingress router can perform the blocks 3902 to 3910 in continuation to the method in FIG. 36, to prebuild the list of ILM entries and the EMLS-TE-3 to be sent on forwarded packets. For example, block 2610 can perform the blocks 3902-3910 and then the multicast flow identifier can be mapped to the tuple {EMLS-TE-3, list of ILM entries}. Then, for every packet on the multicast flow, the ingress router will look up the {EMLS-TE-3, list of ILM entries} mapped to the flow identifier and execute the method 4300 to forward/replicate the packet.

Figure 44:
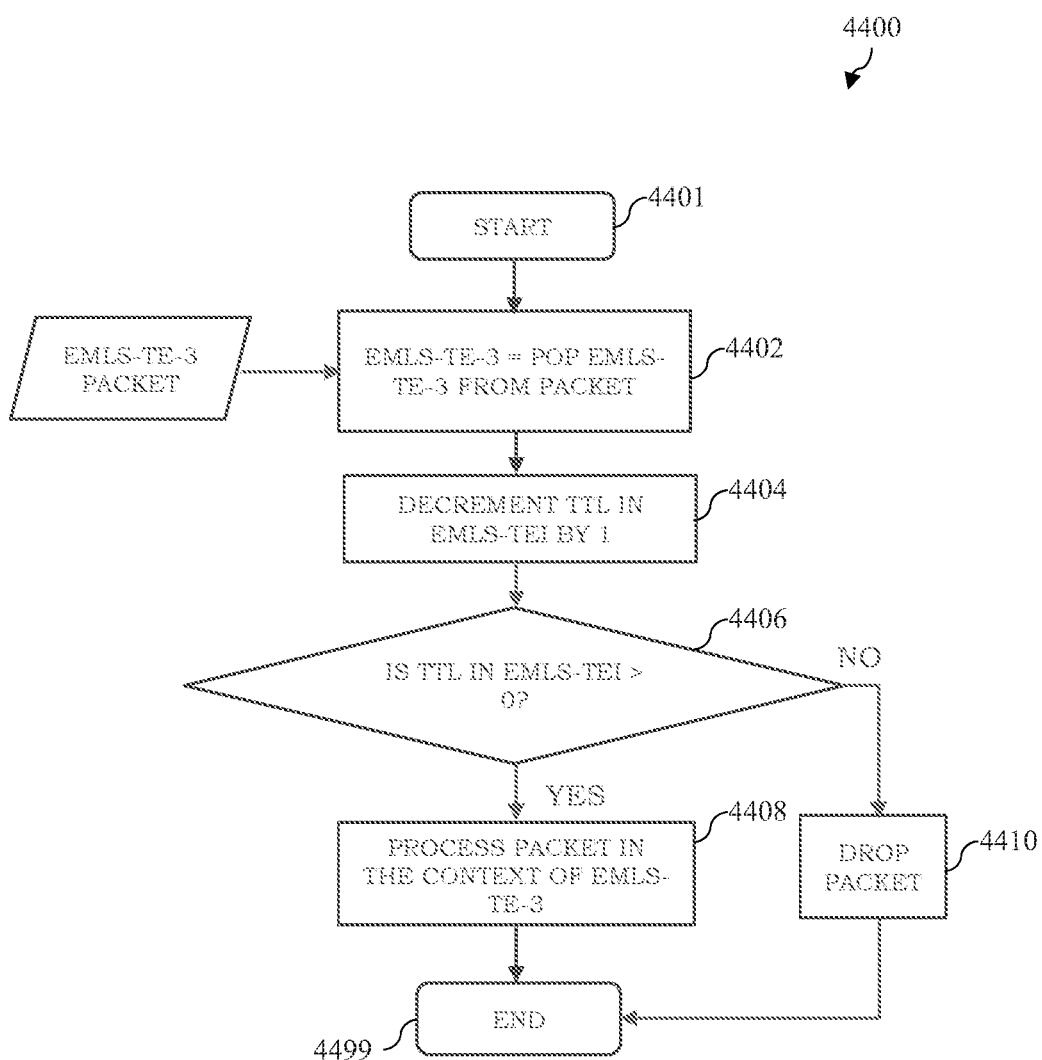
FIG. 44 depicts an example embodiment of a method for use by a router for processing an EMLS-TE-3 Packet.

FIG. 44 depicts an example embodiment of a method for use by a router for processing an EMLS-TE-3 Packet. It will be appreciated that the method 4400 of FIG. 44 may be executed by transit, bud, or egress routers within a stateless MPLS TE multicast domain. It will be appreciated that, although primarily presented as being performed serially, at least a portion of the functions of method 4400 may be performed contemporaneously or in a different order than as presented with respect to FIG. 44. The input to the method 4400 is an EMLS-TE-3 packet. The method 4400 begins at block 4401 and proceeds to block 4402. Block 4402 pops the EMLS-TE-3 from the packet, and then proceeds to block 4404. Block 4404 decrements the TTL in EMLS-TEI (of EMLS-TE-3) by one, and then proceeds to block 4406. Block 4406 checks if the TTL in EMLS-TEI is greater than zero. If the TTL in EMLS-TEI is greater than zero, then block 4406 proceeds to block 4408, otherwise block 4406 proceeds to block 4410. Block 4408 processes the packet in the context of the EMLS-TE-3. Block 4408 may be implemented by the method in FIG. 39, which implements the common processing part for any router in the stateless MPLS TE multicast domain. After block 4408, the method 4400 proceeds to block 4499, where the method 4400 ends. Block 4410 drops the packet, as TTL has become zero. After block 4410, the method 4400 proceeds to block 4499, where the method 4400 ends.

Figure 45:
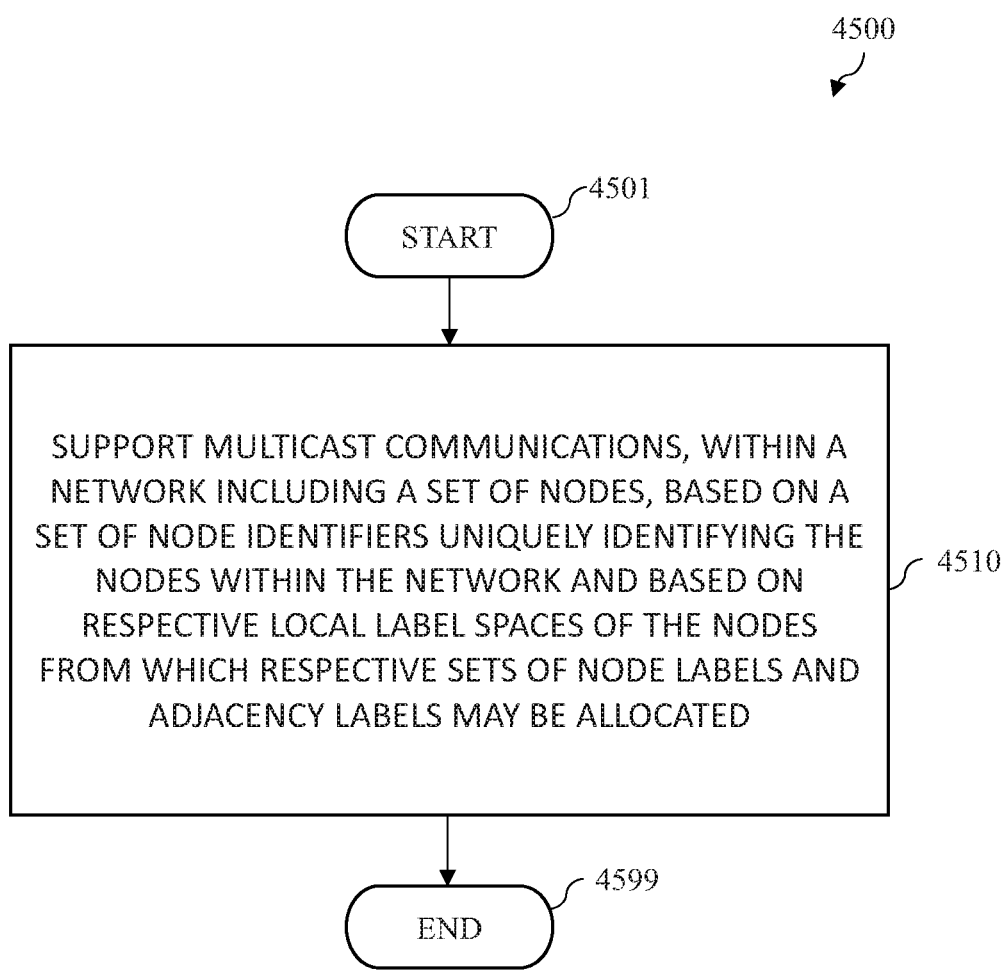
FIG. 45 depicts an example embodiment of a method for use by a network controller to support multicast communications within a network based on use of local label spaces of nodes of the label switching network.

FIG. 45 depicts an example embodiment of a method for use by a network controller to support multicast communications within a network based on use of local label spaces of nodes of the label switching network. It will be appreciated that, although primarily presented as being performed serially, at least a portion of the functions of method 4500 may be performed contemporaneously or in a different order than as presented with respect to FIG. 45. At block 4501, method 4500 begins. At block 4510, support multicast communications, within a network including a set of nodes, based on a set of node identifiers uniquely identifying the nodes within the network and based on respective local label spaces of the nodes from which respective sets of node labels and adjacency labels may be allocated. At block 4599, method 4500 ends. It will be appreciated that various packet communication support functions presented herein with respect to FIGS. 1-44 may be incorporated within the context of method 4500 of FIG. 45.

Figure 46:
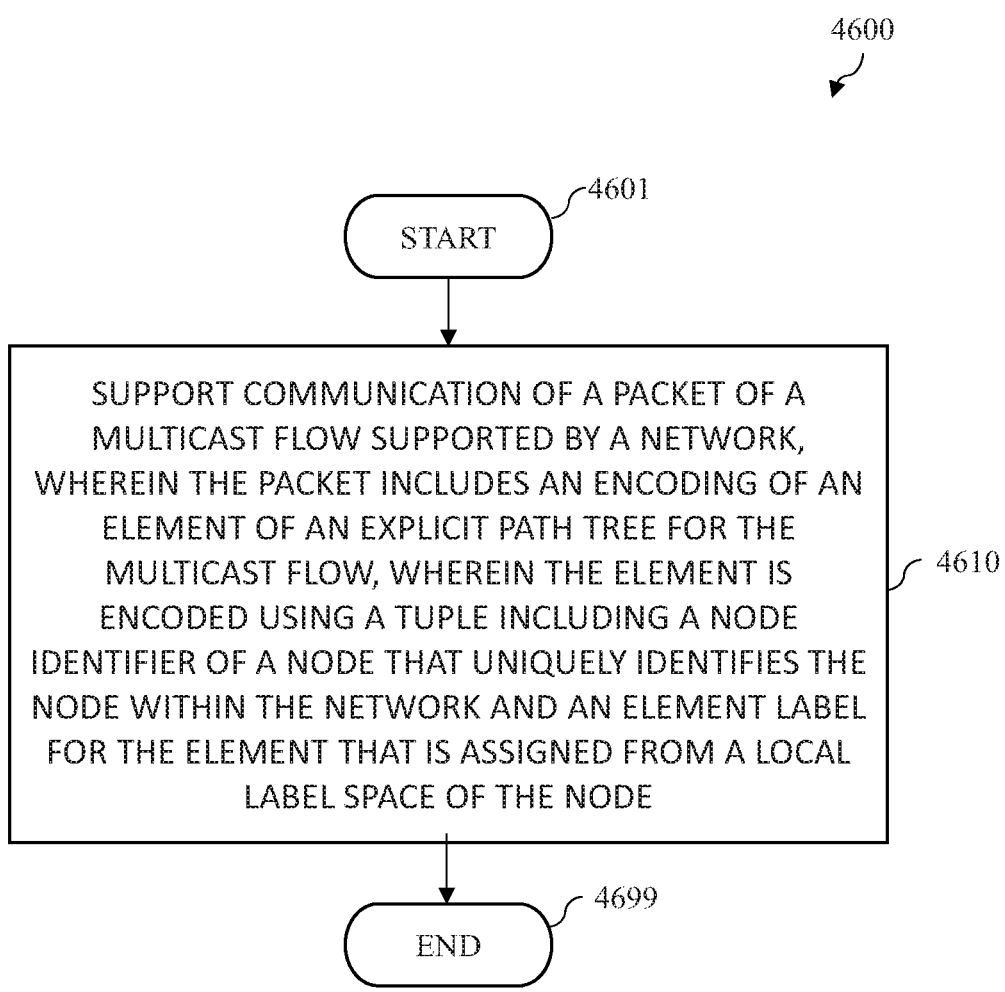
FIG. 46 depicts an example embodiment of a method for use by a network device to support multicast communications within a network based on use of local label spaces of nodes of the label switching network.

FIG. 46 depicts an example embodiment of a method for use by a network node to support multicast communications within a network based on use of local label spaces of nodes of the label switching network. It will be appreciated that, although primarily presented as being performed serially, at least a portion of the functions of method 4600 may be performed contemporaneously or in a different order than as presented with respect to FIG. 46. At block 4601, method 4600 begins. At block 4610, support communication of a packet of a multicast flow supported by a network, wherein the packet includes an encoding of an element of an explicit path tree for the multicast flow, wherein the element is encoded using a tuple including a node identifier of a node that uniquely identifies the node within the network and an element label for the element that is assigned from a local label space of the node. At block 4699, method 4600 ends. It will be appreciated that various packet communication support functions presented herein with respect to FIGS. 1-44 may be incorporated within the context of method 4600 of FIG. 46.

Various example embodiments for supporting stateless multicast communications may provide various advantages or potential advantages. For example, various example embodiments for supporting stateless multicast communications may be configured to support stateless multicast communications in a label switching network (e.g., a Multiprotocol Label Switching (MPLS) network, an MPLS—Traffic Engineered (TE) network, or the like) based on use of local label spaces of nodes of the label switching network for encoding of an explicit path tree for the multicast communications within the multicast communications. For example, various example embodiments for supporting stateless multicast communications may be configured to support stateless multicast communications in a label switching network based on use of local label spaces of nodes of the label switching network may be configured to support use of local label spaces of nodes of the label switching network by using network-wide unique node identifiers to uniquely identify nodes with which the node and adjacency labels of the explicit path tree are associated. Various example embodiments for supporting stateless multicast communications may provide various other advantages or potential advantages.

Figure 47:
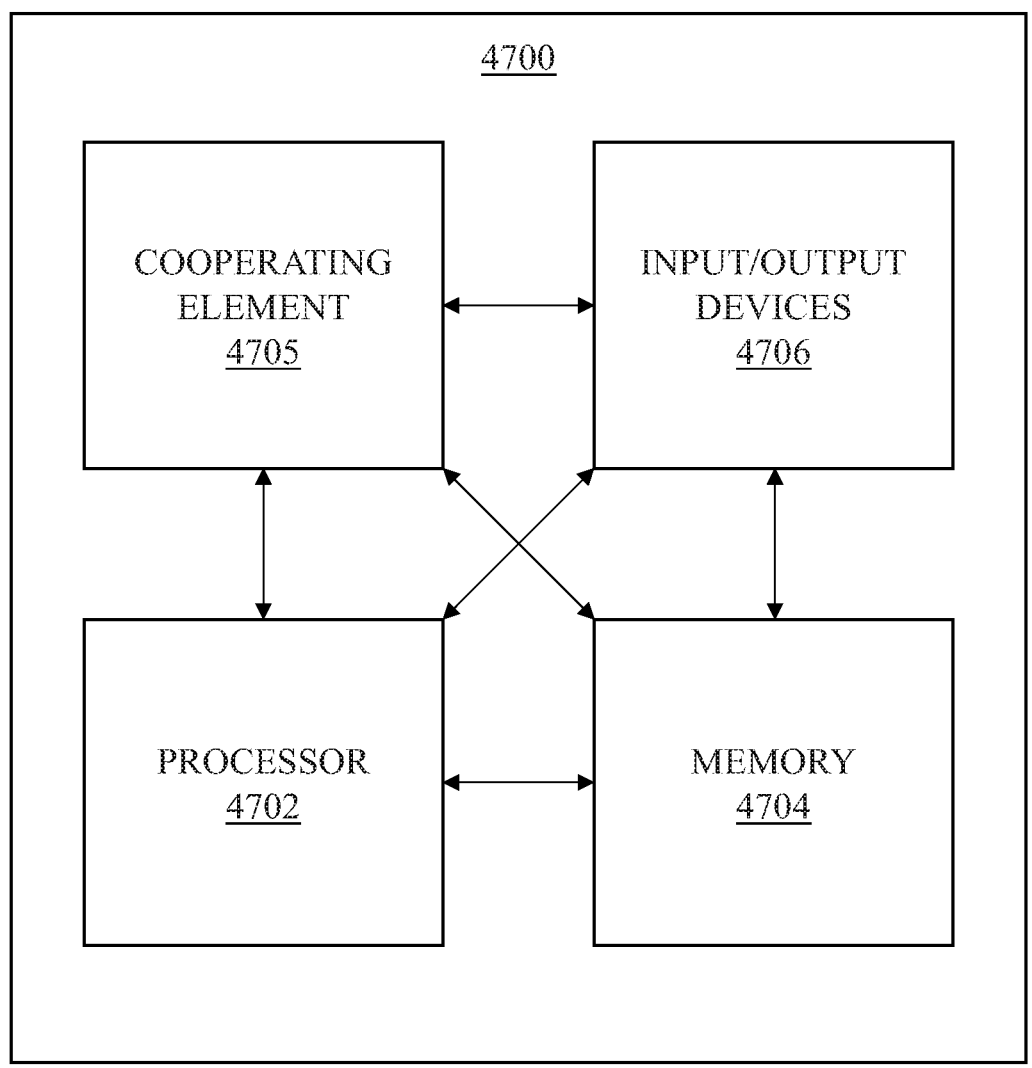
FIG. 47 depicts an example embodiment of a computer suitable for use in performing various functions presented herein.

FIG. 47 depicts an example embodiment of a computer suitable for use in performing various functions presented herein.

The computer 4700 includes a processor 4702 (e.g., a central processing unit (CPU), a processor, a processor having a set of processor cores, a processor core of a processor, or the like) and a memory 4704 (e.g., a random access memory, a read only memory, or the like). The processor 4702 and the memory 4704 may be communicatively connected. In at least some example embodiments, the computer 4700 may include at least one processor and at least one memory including computer program code, wherein the at least one memory and the computer program code are configured to, with the at least one processor, cause the computer to perform various functions presented herein.

The computer 4700 also may include a cooperating element 4705. The cooperating element 4705 may be a hardware device. The cooperating element 4705 may be a process that can be loaded into the memory 4704 and executed by the processor 4702 to implement various functions presented herein (in which case, for example, the cooperating element 4705 (including associated data structures) can be stored on a non-transitory computer-readable storage medium, such as a storage device or other suitable type of storage element (e.g., a magnetic drive, an optical drive, or the like)).

The computer 4700 also may include one or more input/output devices 4706. The input/output devices 4706 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 4700 may represent a general architecture and functionality suitable for implementing functional elements described herein, portions of functional elements described herein, or the like, as well as various combinations thereof. For example, computer 4700 may provide a general architecture and functionality that is suitable for implementing one or more elements presented herein, such as a network devices (e.g., routers or the like), network controllers, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including computer program code;
   wherein the at least one memory and the computer program code are configured to, with the at least one processor, cause the apparatus to:
      support communication of a source routed packet of a multicast flow supported by a network including a node, wherein the source routed packet includes an encoding of an element of an explicit path tree for the multicast flow, wherein the element is associated with the node, wherein the encoding of the element is included within a header of the source routed packet, wherein the encoding of the element includes a node identifier of the node that uniquely identifies the node within the network and an element label for the element that is assigned to the element from a local label space specific to the node.

2. The apparatus of claim 1, wherein the element comprises the node, wherein the element label comprises a node label.

3. The apparatus of claim 1, wherein the element comprises an adjacency of the node, wherein the element label comprises an adjacency label.

4. The apparatus of claim 1, wherein the source routed packet includes an encoding of a second element of the explicit path tree for the multicast flow.

5. The apparatus of claim 4, wherein the second element is associated with the node.

6. The apparatus of claim 5, wherein the second element is encoded within the header of the source routed packet, wherein the encoding of the second element includes a second element label for the second element that is assigned to the second element from the local label space specific to the node.

7. The apparatus of claim 5, wherein the second element is encoded within the header of the source routed packet, wherein the encoding of the second element includes the node identifier of the node that uniquely identifies the node within the network and a second element label for the second element that is assigned to the second element from the local label space specific to the node.

8. The apparatus of claim 4, wherein the second element is associated with a second node.

9. The apparatus of claim 8, wherein the second element is encoded within the header of the source routed packet, wherein the encoding of the second element includes a node identifier of the second node that uniquely identifies the second node within the network and an element label for the second element that is assigned to the second element from a local label space specific to the second node.

10. The apparatus of claim 1, wherein, to support communication of the source routed packet, the at least one memory and the computer program code are configured to, with the at least one processor, cause the apparatus to:
   receive, by an ingress node of the multicast flow, a native packet;
   create, by the ingress node based on the native packet, the source routed packet; and
   forward, by the ingress node toward at least one next-hop node, the source routed packet.

11. The apparatus of claim 1, wherein, to support communication of the source routed packet, the at least one memory and the computer program code are configured to, with the at least one processor, cause the apparatus to:
   receive, by the node, the source routed packet;
   determine, by the node based on the node identifier of the node from the encoding of the element, that the element label of the element is to be processed by the node; and
   handle, by the node based on processing of the element label based on the local label space specific to the node, the source routed packet.

12. The apparatus of claim 11, wherein, to handle the source routed packet, the at least one memory and the computer program code are configured to, with the at least one processor, cause the apparatus to:
   determine, based on the element label and the local label space specific to the node, that the element label identifies an adjacency of the node;
   determine whether the adjacency of the node is a forward connected adjacency of the node; and
   forward the source routed packet toward a next-hop node of the adjacency of the node based on a determination that the adjacency is a forward connected adjacency of the node.

13. The apparatus of claim 12, wherein, to forward the source routed packet, the at least one memory and the computer program code are configured to, with the at least one processor, cause the apparatus to:
   remove the encoding of the element from the source routed packet to form a new source routed packet;
   create a copy of the new source routed packet; and
   forward the copy of the new source routed packet toward the next-hop node.

14. The apparatus of claim 12, wherein the node is an ingress node of the explicit path tree, a transit node of the explicit path tree, or a bud node of the explicit path tree.

15. The apparatus of claim 11, wherein, to handle the source routed packet, the at least one memory and the computer program code are configured to, with the at least one processor, cause the apparatus to:
   determine, based on the element label and the local label space specific to the node, that the element label identifies the node; and
   forward the source routed packet to a multicast flow overlay based on a determination that the element label identifies the node.

16. The apparatus of claim 15, wherein, to forward the source routed packet to the multicast flow overlay, the at least one memory and the computer program code are configured to, with the at least one processor, cause the apparatus to:
   create a local copy of the source routed packet;
   remove, from the local copy of the source routed packet, the header including the encoding of the element to form thereby a new packet; and forward, based on a native header of the new packet, the new packet to the multicast flow overlay.

17. The apparatus of claim 15, wherein the node is a transit node of the explicit path tree, a bud node of the explicit path tree, or a leaf node of the explicit path tree.

18. The apparatus of claim 1, wherein the node comprises an ingress node of the explicit path tree, wherein the at least one memory and the computer program code are configured to, with the at least one processor, cause the apparatus to:
send, from the node toward a network controller, a request for the explicit path tree; and
receive, by the node from the network controller, a response including a description of the explicit path tree.

19. A non-transitory computer-readable medium storing computer program code configured to cause an apparatus to:
support communication of a source routed packet of a multicast flow supported by a network including a node, wherein the source routed packet includes an encoding of an element of an explicit path tree for the multicast flow, wherein the element is associated with the node, wherein the encoding of the element is included within a header of the source routed packet, wherein the encoding of the element includes a node identifier of the node that uniquely identifies the node within the network and an element label for the element that is assigned to the element from a local label space specific to the node.

20. A method, comprising:
supporting communication of a source routed packet of a multicast flow supported by a network including a node, wherein the source routed packet includes an encoding of an element of an explicit path tree for the multicast flow, wherein the element is associated with the node, wherein the encoding of the element is included within a header of the source routed packet, wherein the encoding of the element includes a node identifier of the node that uniquely identifies the node within the network and an element label for the element that is assigned to the element from a local label space specific to the node.

* * * * *